United States Patent [19]

Katayama et al.

[11] Patent Number: 5,668,595

[45] Date of Patent: Sep. 16, 1997

[54] MULTI-LENS IMAGING APPARATUS HAVING A MECHANISM FOR COMBINING A PLURALITY OF IMAGES WITHOUT DISPLACEMENT OF REGISTRATION

[75] Inventors: Tatsushi Katayama, Kawasaki; Yukichi Niwa, Narashino; Shigeyuki Suda, Yokohama, all of Japan

[73] Assignee: Canon Kabushiki Kaisha, Tokyo, Japan

[21] Appl. No.: 36,079

[22] Filed: Mar. 23, 1993

[30] Foreign Application Priority Data

| Mar. 23, 1992 | [JP] | Japan | 4-065170 |
| Jun. 11, 1992 | [JP] | Japan | 4-152214 |
| Jun. 17, 1992 | [JP] | Japan | 4-158118 |

[51] Int. Cl.$^6$ .......................... H04N 5/225; H04N 5/262; H04N 13/02
[52] U.S. Cl. .............. 348/218; 348/43; 348/47; 348/139; 348/239; 352/60; 396/325; 396/334
[58] Field of Search .............. 348/42–44, 46–48, 348/263, 218, 239, 139, 36–38; 354/112, 113; 352/57, 60, 62; 359/462, 470, 471, 472; 396/325, 334

[56] References Cited

U.S. PATENT DOCUMENTS

| 3,627,918 | 12/1971 | Redpath | 178/6.8 |
| 4,667,236 | 5/1987 | Dresdner | 358/160 |
| 4,825,393 | 4/1989 | Nishiya | 364/560 |
| 5,101,268 | 3/1992 | Ohba | 358/88 |
| 5,142,642 | 8/1992 | Sudo | 358/88 |
| 5,179,441 | 1/1993 | Anderson | 358/88 |
| 5,212,547 | 5/1993 | Otsuki | 358/105 |

FOREIGN PATENT DOCUMENTS

| 0231654 | 8/1987 | European Pat. Off. | G02B 27/00 |
| 0248730 | 12/1987 | European Pat. Off. | H04N 5/225 |
| 0332403 | 9/1989 | European Pat. Off. | H04N 13/02 |
| 0335004 | 10/1989 | European Pat. Off. | H04N 13/02 |
| 55-004192 | 1/1980 | Japan | H04N 5/74 |
| 56-169968 | 12/1981 | Japan | H04N 3/22 |
| 58-51682 | 3/1983 | Japan | H04N 9/09 |
| 2226923 | 7/1990 | United Kingdom | G01S 11/00 |
| 2250604 | 6/1992 | United Kingdom | G03B 35/00 |

OTHER PUBLICATIONS

Takahashi et al., "Self–Calibration of Stereo Cameras," Second Industrial Conference on Computer Vision, Dec. 5–8, 1988, IEEE Computer Society, title page, pp. 123–128.
European Patent Office Communication, Application No. 93104677.5, Date Aug. 17, 1993, p. 1.
European Search Report, Application No. EP 93 10 4677, Date of completion of the search Aug. 6, 1993, pp. 1, 2.
Annex to the European Search Report on European Patent Application No. EP 93 10 4677, Aug. 6, 1993, p. 1.
"Acquisition of Super High Definition Pictures by Processing Stereoscopic Images", Institute of Image Electronic Engineering of Japan, Mar. 4, 1990.

*Primary Examiner*—Andrew Faile
*Assistant Examiner*—Ngoc-Yen Vu
*Attorney, Agent, or Firm*—Morgan & Finnegan

[57] ABSTRACT

This invention relates to a multi-lens imaging apparatus and, more particularly, to a multi-lens imaging apparatus for obtaining a single high-fine image by synthesizing a plurality of images obtained by picking up an image of a common object using a plurality of imaging systems and to an apparatus which can provide an image having an aspect ratio different from that of an image obtained by a single imaging apparatus, especially, a panoramic image, by synthesizing a plurality of images using a plurality of imaging systems. This invention has as its object to obtain a high-fine image by synthesizing images from a plurality of imaging systems and, more specifically, to correct mis-registration such as keystone distortions generated in the images.

23 Claims, 47 Drawing Sheets

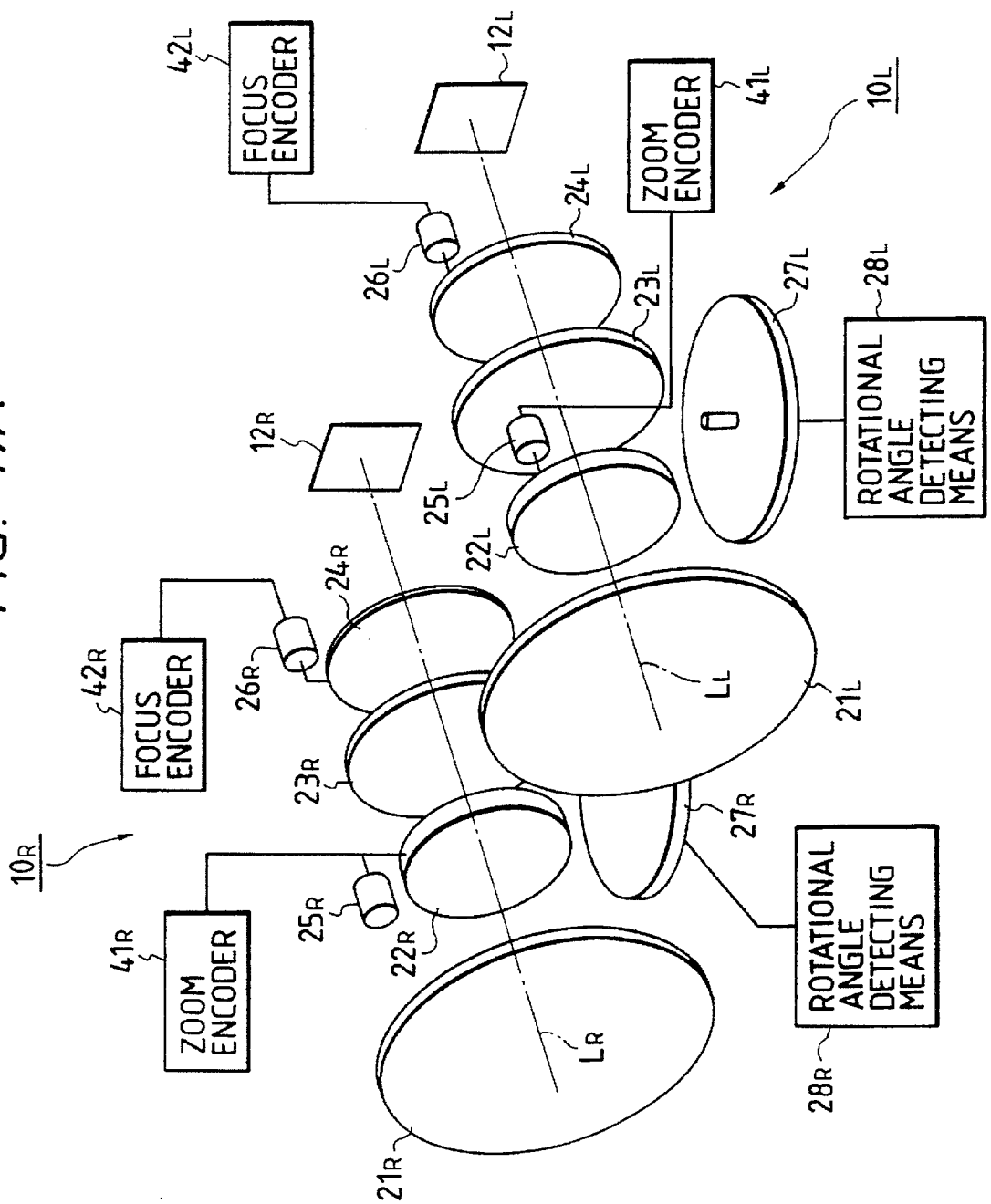

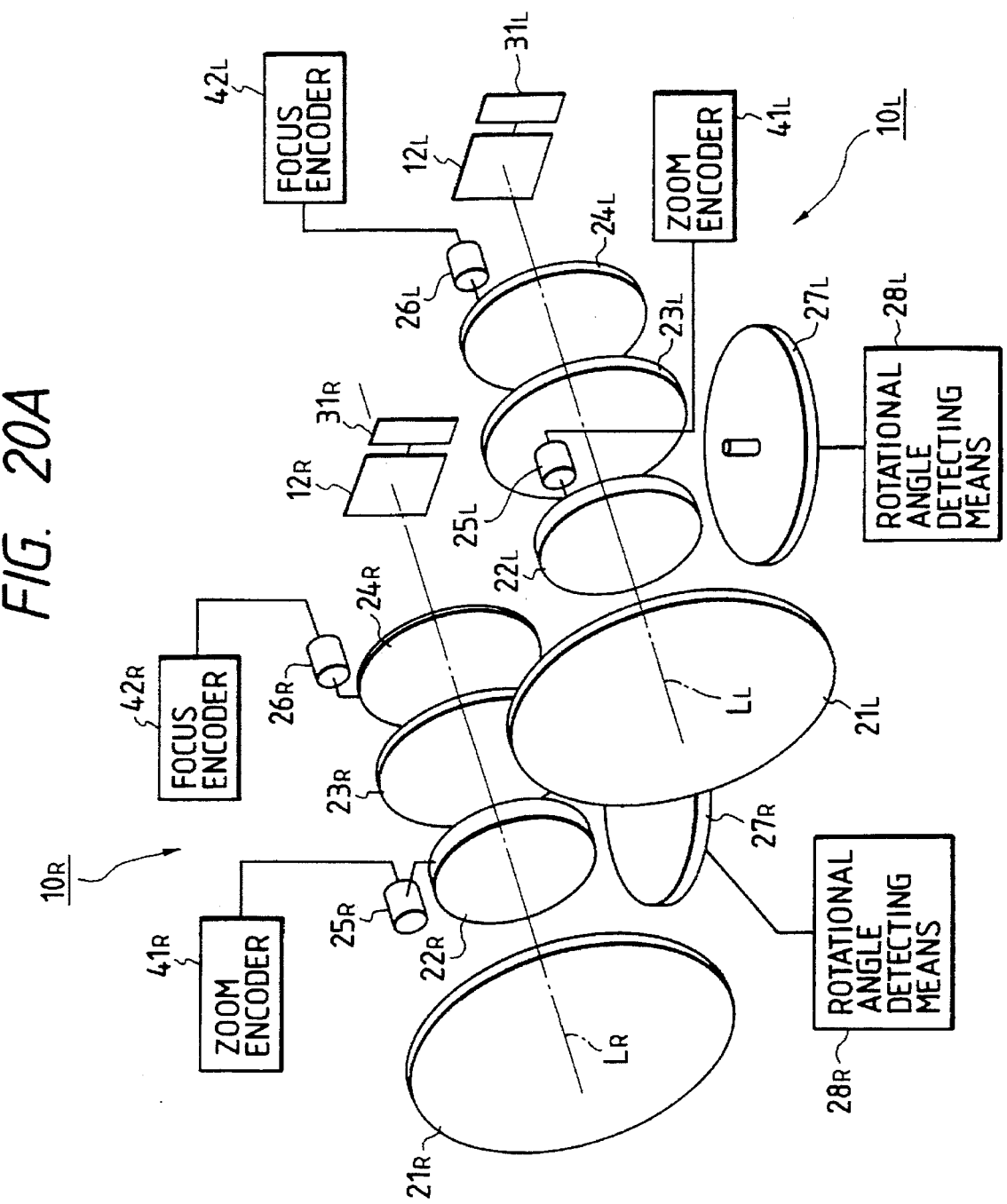

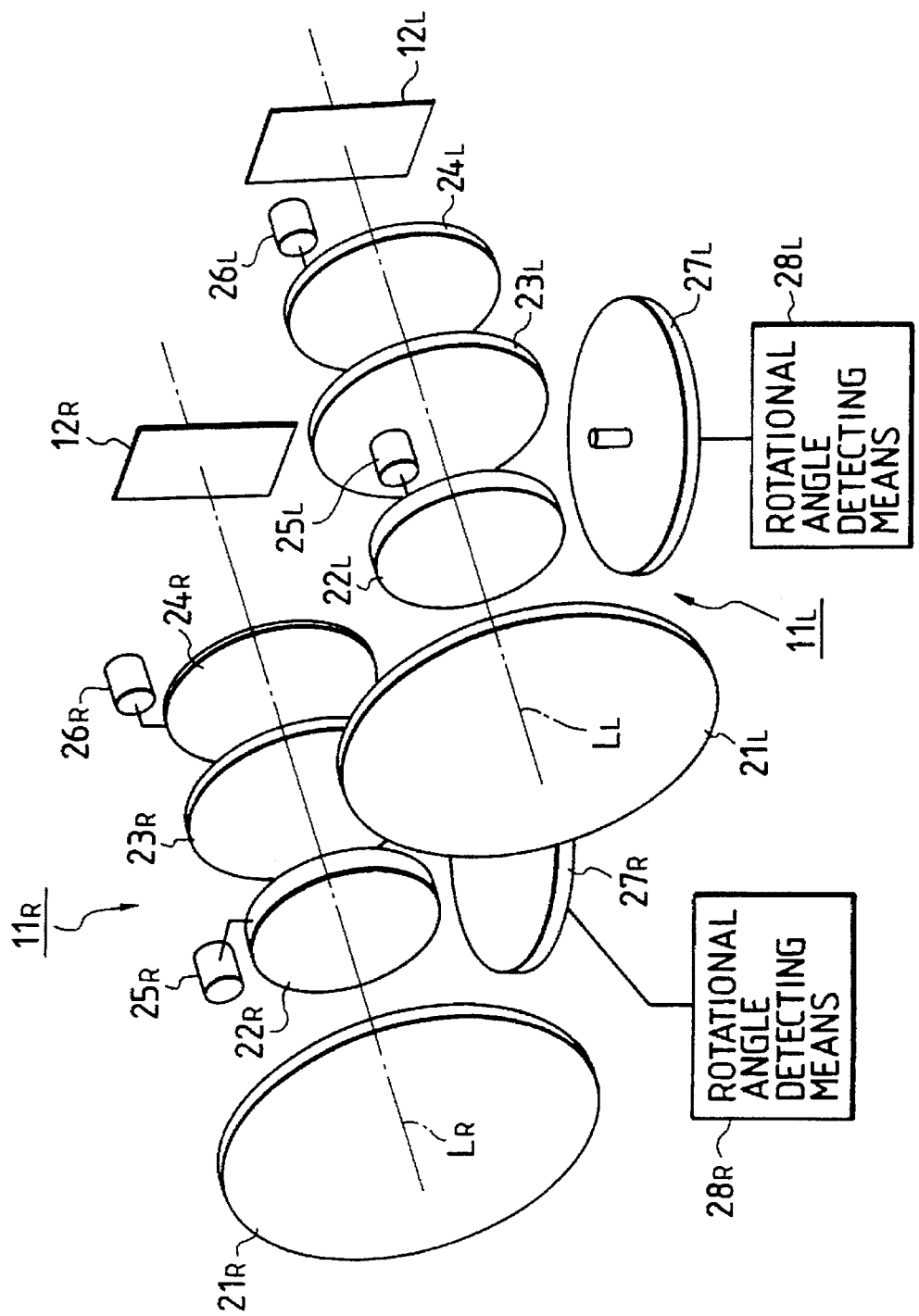

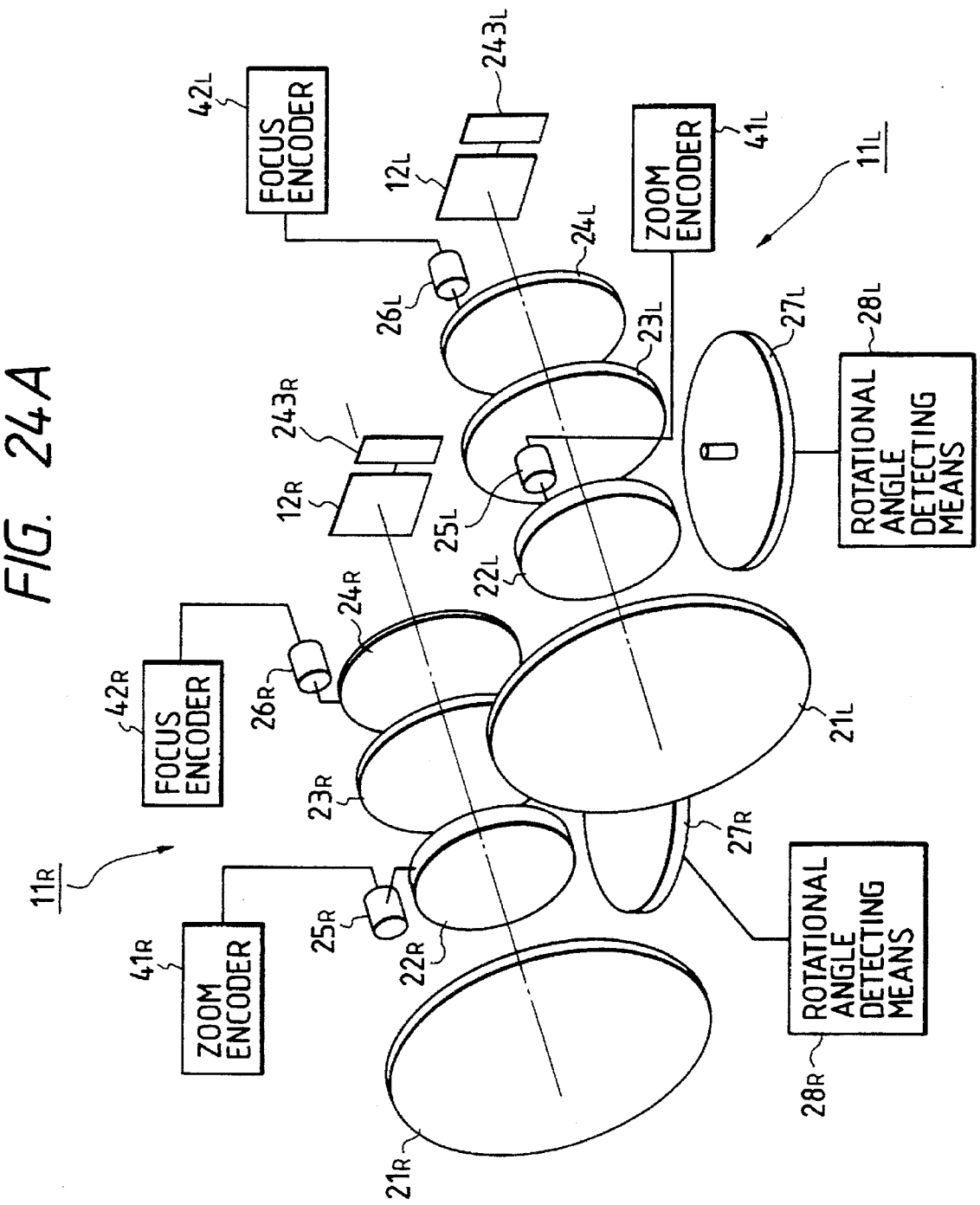

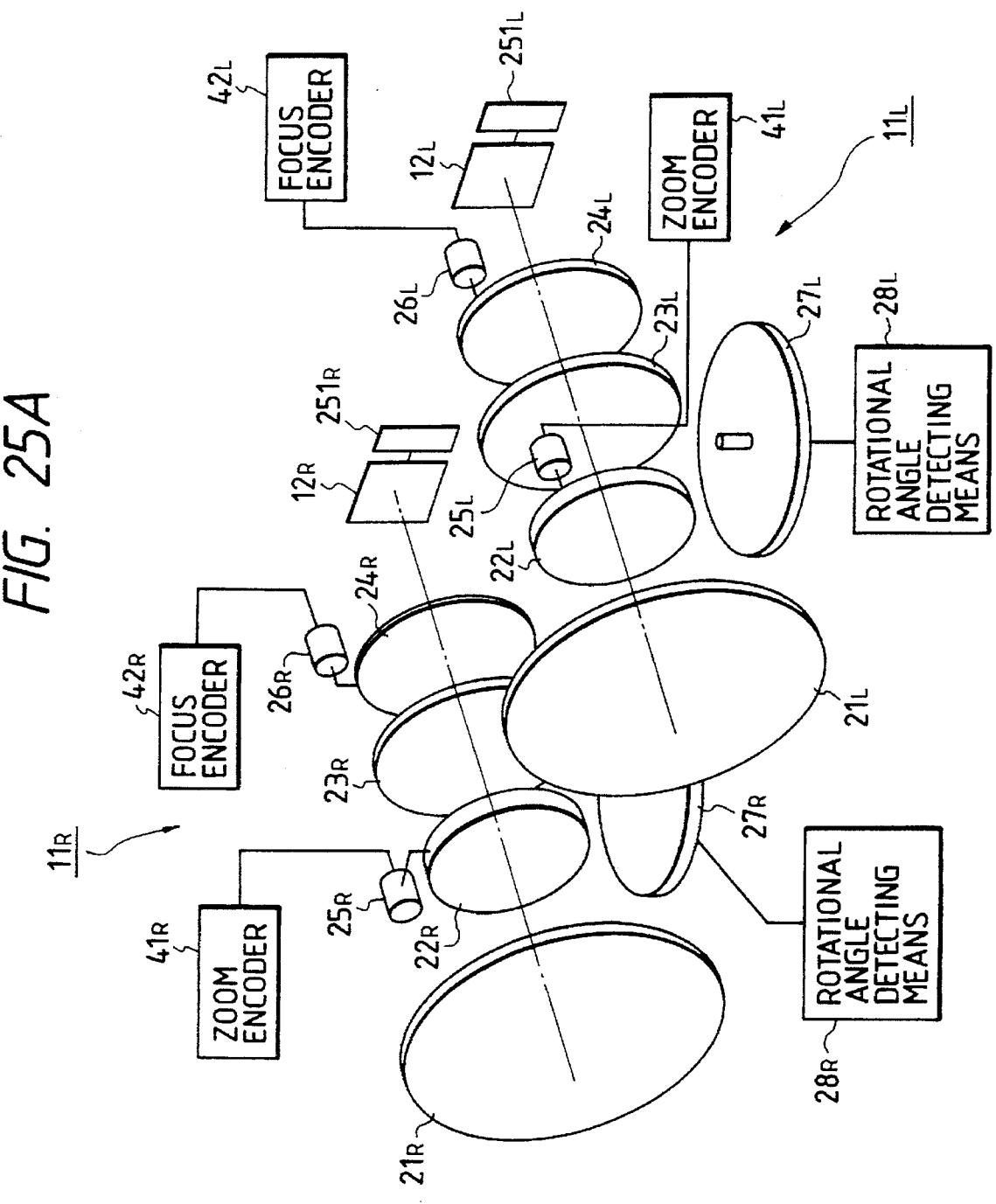

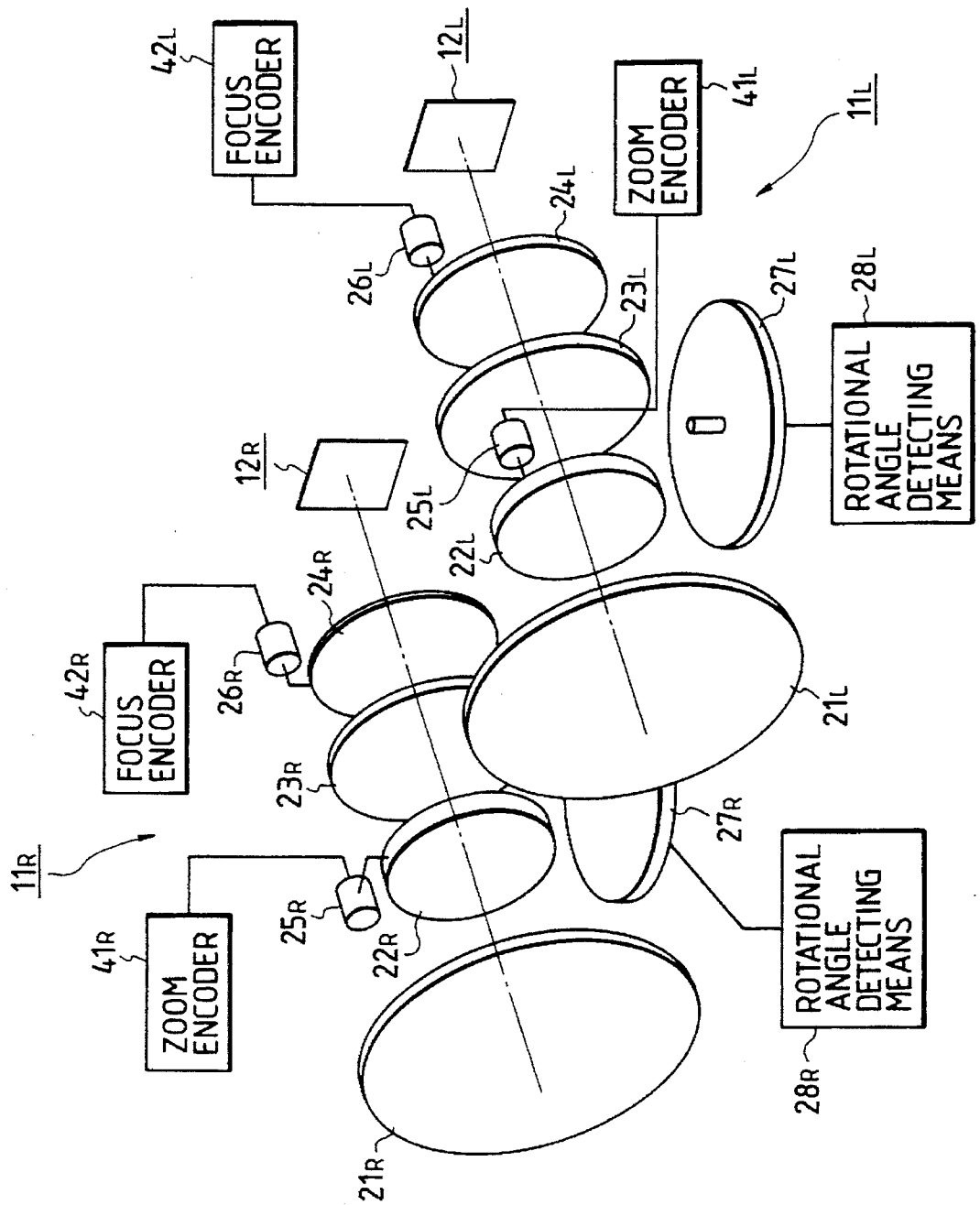

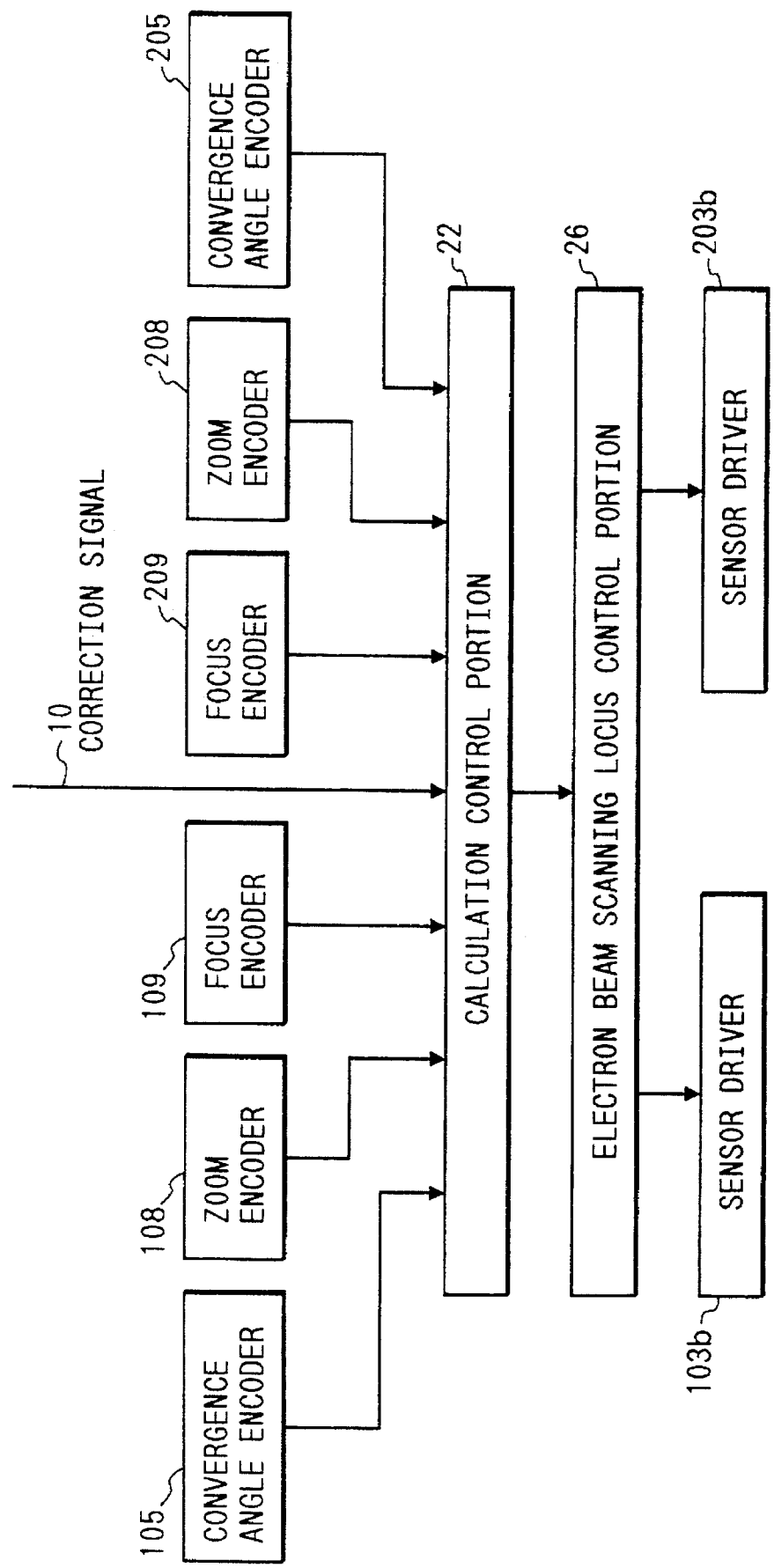

MULTI-LENS IMAGING APPARATUS HAVING A MECHANISM FOR COMBINING A PLURALITY OF IMAGES WITHOUT DISPLACEMENT OF REGISTRATION

BACKGROUND OF THE INVENTION

1. Field of the Invention

The present invention relates to a multi-lens imaging apparatus and, more particularly, to a multi-lens imaging apparatus which obtains a single high-fine image by synthesizing a plurality of images obtained by picking up a common object image using a plurality of imaging systems and to an apparatus which can provide a image having a different aspect ratio from that of a image obtained by a single imaging apparatus, for example, a panoramic image, by synthesizing a plurality of images obtained using a plurality of imaging optical systems.

2. Related Art

When an ultra high-fine image consisting of 4,000×4,000 pixels is picked up by an imaging system, and the picked-up image is displayed on an ultra high-fine monitor, problems associated with techniques for achieving a high density and a high sensitivity in the imaging system are posed. As a method of solving such problems in the imaging system, the principle of a multi-lens imaging apparatus for picking up an image of a common object using two imaging systems each having a small number of pixels, and obtaining a single high-fine image by synthesizing the two images obtained by the two imaging systems has been proposed. In the multi-lens imaging apparatus based on this principle, as shown in FIG. 1, right and left side imaging systems $110_R$ and $110_L$ are prepared, and pick up an image of an object 101 by shifting their sampling points by a ½ spatial phase pitch. A right side image $I_R$ obtained by the right side imaging system $110_R$ and a left side image $I_L$ obtained by the left side imaging system $110_L$ are synthesized by a microprocessor (to be referred to as a "CPU" hereinafter) 120, thereby obtaining a single high-fine output image $I_{OUT}$ as compared to a image obtained when the image of the object 101 is picked up by a single imaging system.

FIG. 2 is an explanatory view for explaining a basic arrangement of the right and left side imaging systems $110_R$ and $110_L$ shown in FIG. 1.

The left side imaging system $110_L$ is constituted by a left side imaging optical system $111_L$ and a left side image sensor $112_L$, and the right side imaging system $110_R$ is constituted by a right side imaging optical system $111_R$ and a right side image sensor $112_R$. The right and left side imaging optical systems $111_R$ and $111_L$ have equivalent specifications, and each comprises a zoom lens. The right and left side image sensors $112_R$ and $112_L$ have equivalent specifications, and each comprises a camera tube such as a saticon or a solid-state imaging element such as a CCD. Optical axes $L_R$ and $L_L$ of the right and left imaging systems $110_R$ and $110_L$ cross almost at a point O on an object surface 102, and these systems are arranged at positions axially symmetrical about a normal O–O' to the object surface 102. When the angle formed between each of the optical axes $L_R$ and $L_L$ and the normal O–O' to the object surface 102 (to be referred to as an "inclination angle" hereinafter) is represented by θ, 2θ is defined as the convergence angle.

In the multi-lens imaging apparatus, when the object distance is changed, the convergence angle 2θ is changed by rotating each of the right and left side imaging systems $110_R$ and $110_L$ about an X mark shown in FIG. 2 in accordance with the change in object distance, thus performing an imaging operation.

However, in the above-mentioned multi-lens imaging apparatus, only the principle shown in FIG. 1 and the results of principle experiments for demonstrating the principle are presented, and no detailed arrangement of the multi-lens imaging apparatus is presented. Thus, a problem associated with how to arrange the detailed multi-lens imaging apparatus utilizing the above-mentioned principle remains unsolved. Since the optical axes $L_R$ and $L_L$ of the right and left side imaging systems $110_R$ and $110_L$ are inclined with respect to the object surface 102, the right and left side images $I_R$ and $I_L$ obtained by the right and left side image sensors $112_R$ and $112_L$ suffer from trapezoidal distortions (to be referred to as "keystone distortions" hereinafter), as shown in FIG. 3. As a result, when the right and left side images $I_R$ and $I_L$ are merely synthesized, a high-fine image cannot be obtained.

Since the optical systems are arranged to have a convergence angle therebetween in principle, mis-registration between images obtained from the two imaging operation systems may occur. FIG. 4A shows the outline of mis-registration in a multi-lens imaging system. The system shown in FIG. 4A includes imaging optical systems (lenses) 910 and 920, and image sensors 911 and 921. The imaging optical systems 910 and 920 have optical axes 912 and 922, respectively. When an object image is picked up while the optical axes 912 and 922 are inclined through θ in the x-z plane with respect to a central axis O–O', an arbitrary object point on an object surface is represented by P. At this time, if image points of the image sensors 911 and 921 with respect to P are respectively represented by R' and L', since R'≠L', mis-registration occurs, and two images with respect to the object point P are formed on a simply added synthesized image 930, as shown in FIG. 4B. As a result, a high-fine image cannot be provided.

Conventionally, as a panoramic imaging apparatus using a plurality of imaging optical systems and designed for dynamic images, for example, Japanese Laid-Open Patent Application No. 63-8641 is known. In an apparatus of this type, in general, the angle formed between the imaging optical systems is set by mechanical adjustment, so that image fields contact each other. However, it is very difficult to strictly register two adjacent images, and the boundary line between the two images normally becomes conspicuous. For the same reason as described above, since it is difficult to re-focus objects having different object distances or to perform zooming of these objects, the above-mentioned apparatus is limited to a cut photographing use in units of scenes.

As a method of changing the aspect ratio of a frame of a television or video signal (e.g., conversion between 4:3 of the NTSC and 16:9 of the HD or ED2), a method of trimming upper and lower portions or right and left portions of the frame is known. In this method, since a picked-up image is partially used, when an image is picked by an NTSC camera using a 4:3 image sensor, and is output onto a 16:9 HD monitor, a total of 25% upper and lower images are lost in addition to the fact that the number of pixels is originally short, thus considerably deteriorating image quality. Conversely, when an image is picked up by a 16:9 HD camera, and is output onto a 4:3 NTSC monitor, no problem associated with image quality is posed, but the horizontal field angle is decreased by ⅓.

SUMMARY OF THE INVENTION

It is an object of the present invention to obtain a high-fine image by synthesizing images from a plurality of imaging systems and, more specifically, to correct mis-registration such as keystone distortions generated in the images.

In order to achieve the above object, there is provided an apparatus comprising detection means for detecting a mis-registration amount between imaging systems, and means for controlling at least a mechanism system or an image process system, so that the mis-registration amount detected by the detection means becomes equal to or smaller than a predetermined value, whereby images obtained from the imaging systems are synthesized while being registered with each other.

In order to achieve the above object, there is also provided an apparatus comprising means for detecting imaging conditions of a plurality of imaging systems, means for detecting position information of an object from image signals output from the imaging systems, and means for synthesizing images output from the imaging systems on the basis of the imaging conditions and the position information.

According to the present invention, an image having a desired aspect ratio and almost free from image deterioration can be obtained, and a panoramic image in which a boundary line is not conspicuous can also be obtained.

According to the present invention, when a plurality of images are synthesized, the mis-registration amount of overlapping images may be partially detected.

According to the present invention, means for setting a convergence angle of imaging systems to be a predetermined value may be arranged so as to change the aspect ratio of an image.

BRIEF DESCRIPTION OF THE DRAWINGS

FIGS. 5A and 5B show a multi-lens imaging apparatus according to an embodiment of the present invention, in which FIG. 5A is a perspective view showing the arrangement of right and left imaging systems, and FIG. 5B is a block diagram for explaining operations of keystone distortion correction signal generation portions;

FIGS. 17A and 17B show a multi-lens imaging apparatus according to still another embodiment of the present invention, in which FIG. 17A is a perspective view showing the arrangement of right and left side imaging systems, and FIG. 17B is a block diagram for explaining a correction method of keystone distortions;

FIGS. 20A and 20B show a multi-lens imaging apparatus according to still another embodiment of the present invention, in which FIG. 20A is a perspective view showing the arrangement of right and left side imaging systems, and FIG. 20B is a block diagram for explaining a correction method of keystone distortions;

FIGS. 21A to 21C show a multi-lens imaging apparatus according to still another embodiment of the present invention, in which FIG. 21A is a perspective view showing the arrangement of right and left side imaging systems, FIG. 21B is a block diagram for explaining an operation of a control portion, and FIG. 21C is a block diagram for explaining an image synthesizing operation;

FIGS. 24A and 24B show a multi-lens imaging apparatus according to still another embodiment of the present invention, in which FIG. 24A is a perspective view showing the arrangement of right and left side imaging systems, and FIG. 24B is a block diagram for explaining an operation of a calculation control portion;

FIGS. 25A and 25B show a multi-lens imaging apparatus according to still another embodiment of the present invention, in which FIG. 25A is a perspective view showing the arrangement of right and left side imaging systems, and FIG. 25B is a block diagram for explaining an operation of a calculation control portion;

FIGS. 26A and 26B show a multi-lens imaging apparatus according to still another embodiment of the present invention, in which FIG. 26A is a perspective view showing the arrangement of right and left side imaging systems, and FIG. 26B is a block diagram for explaining an operation of a calculation control portion;

FIG. 40 is a diagram showing the flow of a compensation signal process in the embodiment shown in FIG. 39;

DETAILED DESCRIPTION OF THE PREFERRED EMBODIMENTS

Figure 1:
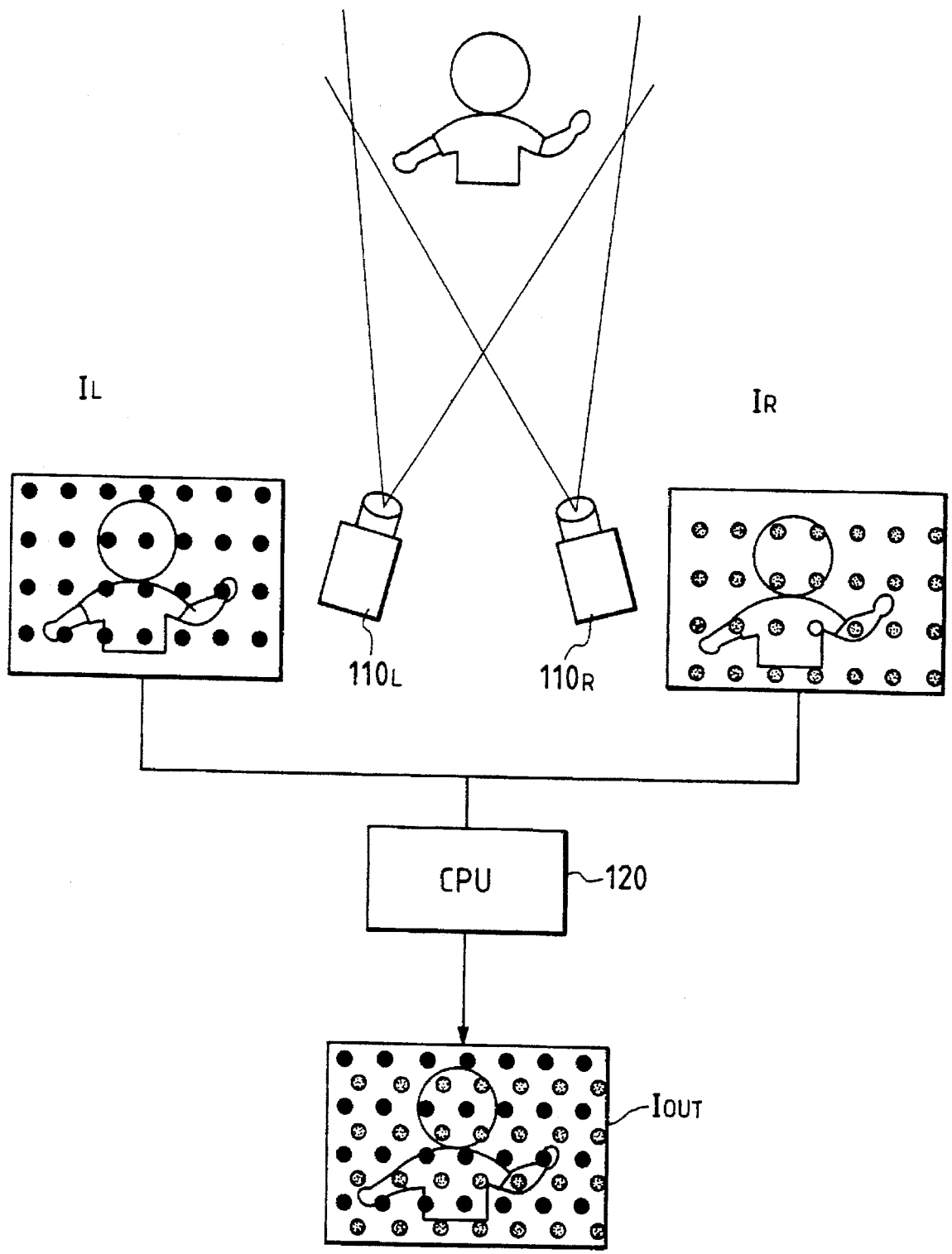
FIG. 1 is a view for explaining the principle of a multi-lens imaging apparatus for obtaining a single high-fine image by synthesizing two images obtained by picking up an image of a common object using two imaging systems.
Figure 2:
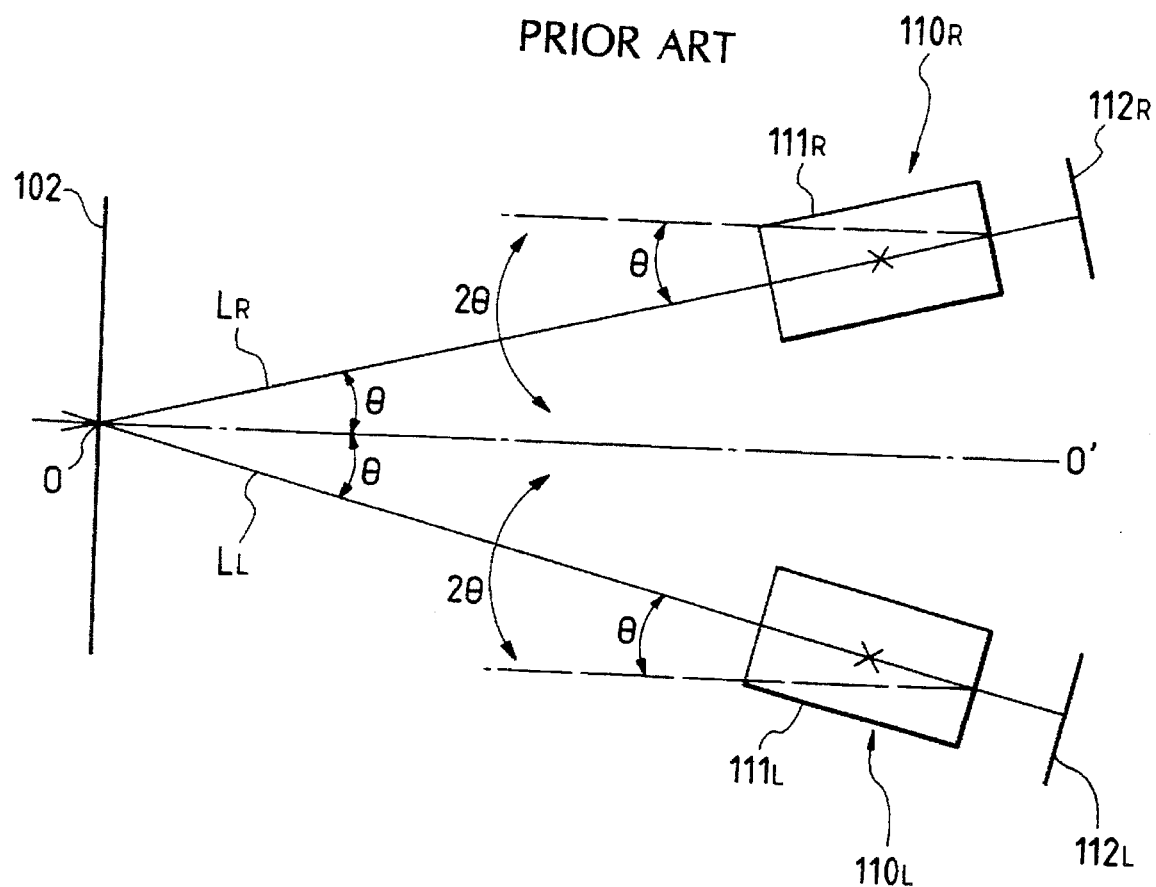
FIG. 2 is an explanatory view for explaining a basic arrangement of right and left side imaging systems shown in FIG. 1.
Figure 3:
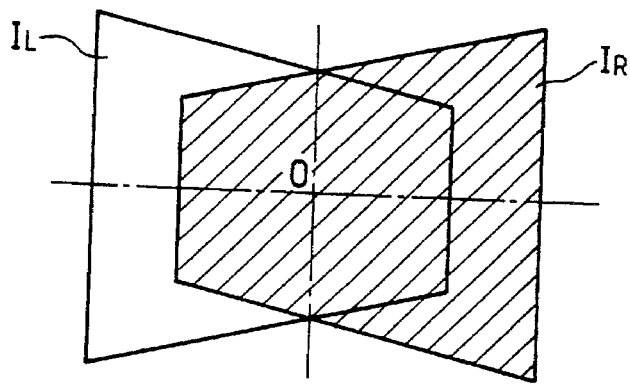
FIG. 3 is an explanatory view for explaining keystone distortions generated in images obtained by right and left side image sensors shown in FIG. 1.
Figure 4A:
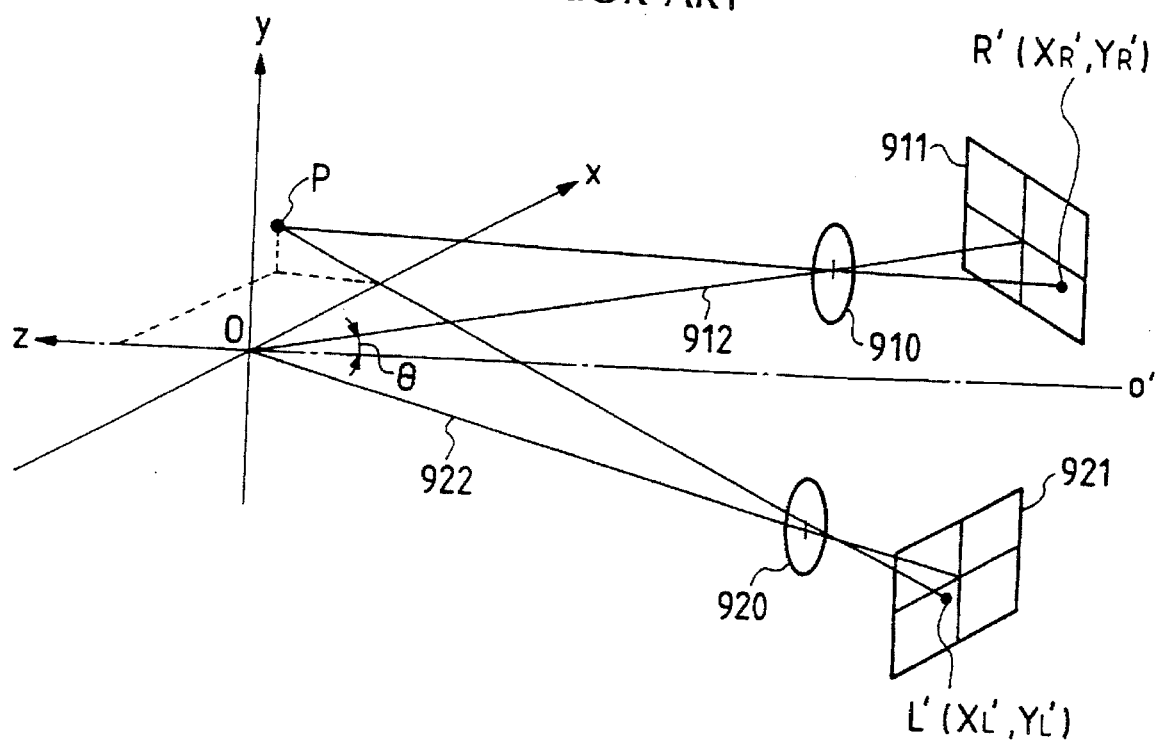
FIGS. 4A and 4B are explanatory views of mis-registration occurring in the prior art.
Figure 4B:
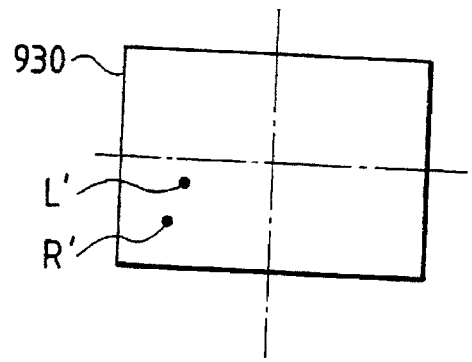
Figure 5A:
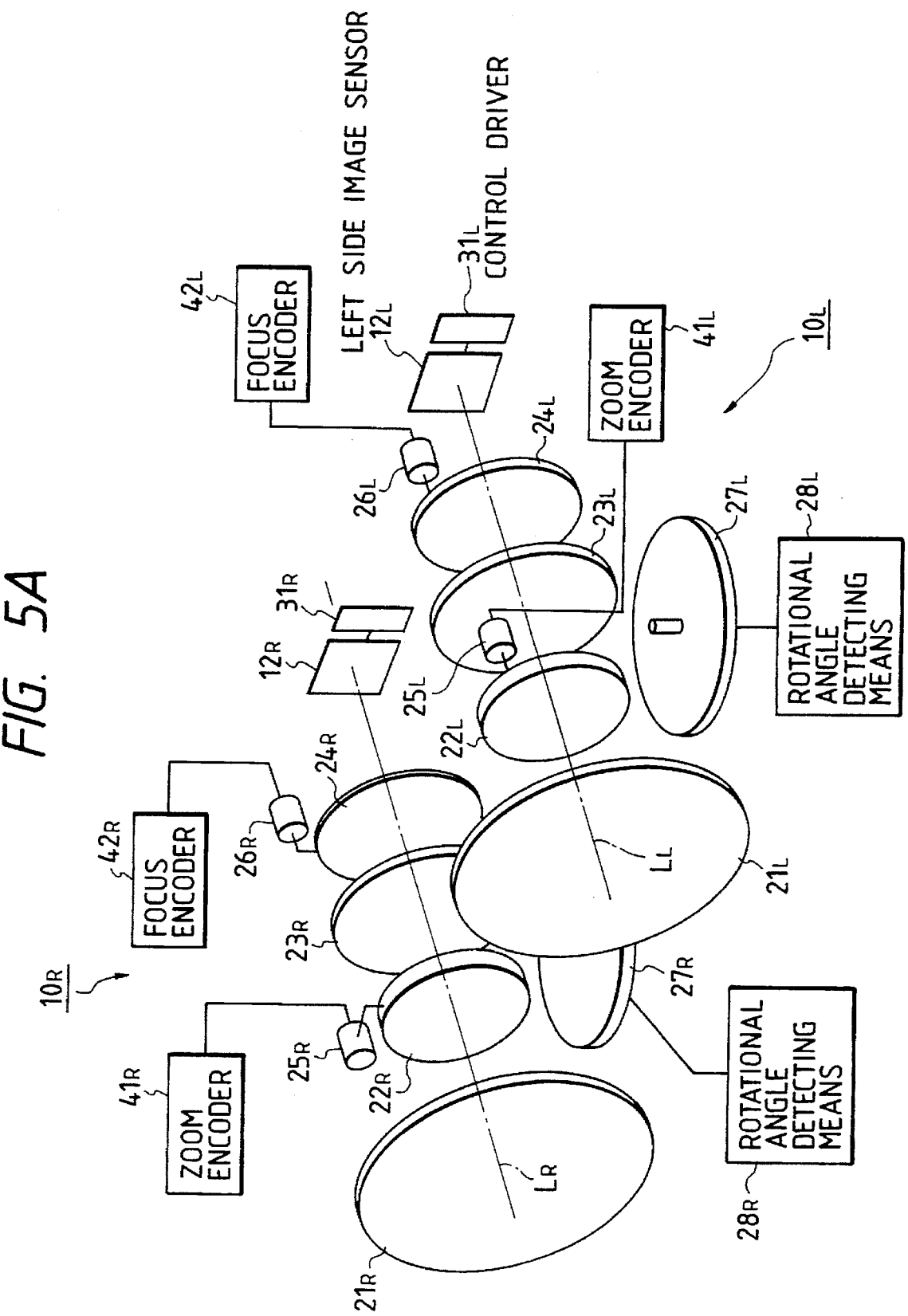
Figure 5B:
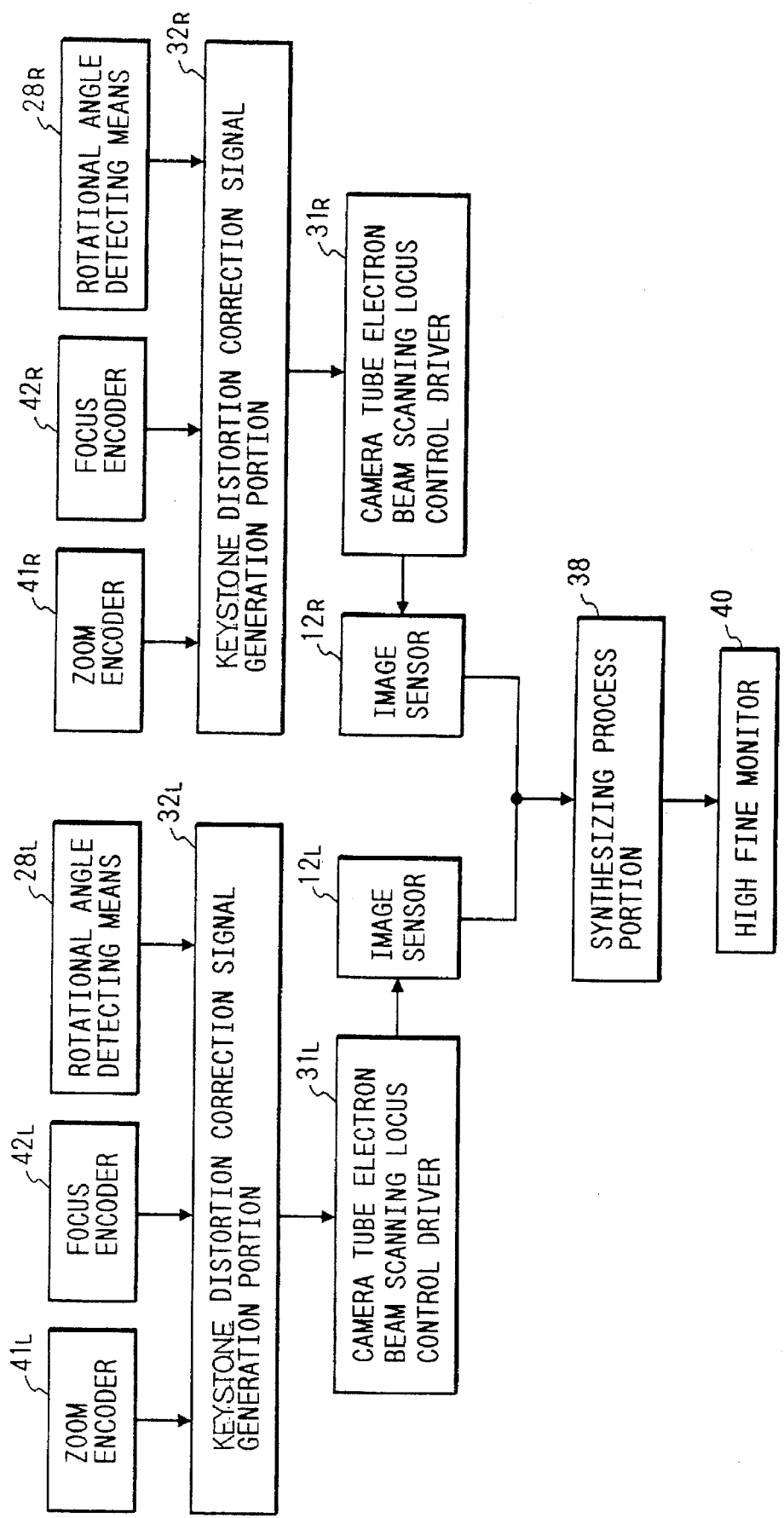

FIGS. 5A and 5B show an arrangement of a multi-lens imaging apparatus according to an embodiment of the present invention.

The multi-lens imaging apparatus of this embodiment obtains a single high-fine image by synthesizing two images obtained by picking up an image of a common object using two imaging systems (right and left side imaging systems $10_R$ and $10_L$).

The arrangement of the right and left side imaging systems $10_R$ and $10_L$ will be described in detail below with reference to FIG. 5A.

The left side imaging system $10_L$ includes a left side imaging optical system $11_L$ (see FIG. 8), a left side image sensor $12_L$ comprising a camera tube, and a camera tube electron beam scanning locus control driver $31_L$ for controlling the locus of scanning of the electron beam emitted from the camera tube constituting the left side image sensor $12_L$. The left side imaging optical system $11_L$ includes lens groups $21_L$ to $24_L$ including a zoom lens group $22_L$ and a focus lens group $24_L$, a zoom motor $25_L$ as a driving system for driving the zoom lens group $22_L$, a focus motor $26_L$ as a driving system for driving the focus lens group $24_L$, a mechanism system (not shown) and a driving system (convergence angle motor $27_L$) for integrally rotating the left side imaging optical system $11_L$ and the left side image sensor $12_L$ in a plane including an optical axis $L_L$, and a rotational angle detecting means $28_L$ for detecting the rotational angle of the convergence angle motor $27_L$. As the rotational angle detecting means $28_L$, for example, an externally attached member such as a rotary encoder may be used, or a means such as a pulse motor for detecting the rotational angle by the driving system itself according to a driving method may be used. The right side imaging system $10_R$ has the same arrangement as that of the left side imaging system $10_L$.

Assume that when the focus motor $26_L$ and the zoom motor $25_L$ of the left side imaging optical system $11_L$ are independently controlled by signals from a focus encoder $42_L$ and a zoom encoder $41_L$, and a focus motor $26_R$ and a zoom motor $25_R$ of a right side imaging optical system $11_R$ are independently controlled by signals from a focus encoder $42_R$ and a zoom encoder $41_R$, a focal length f of the left side imaging optical system $11_L$ always coincides with a focal length f of the right side imaging optical system $11_R$, and an image formation magnification β of the left side imaging optical system $11_L$ always coincides with an image formation magnification β of the right side imaging optical system $11_R$.

At this time, a keystone distortion correction signal generation portion $32_L$ shown at the left side in FIG. 5B can calculate the focal length f of the left side imaging optical system $11_L$ on the basis of a signal from the zoom encoder $41_L$, and a keystone distortion correction signal generation portion $32_R$ shown at the right side in FIG. 5B can calculate the focal length f of the right side imaging optical system $11_R$ on the basis of a signal from the zoom encoder $41_R$. Also, since the keystone distortion correction signal generation portion $32_L$ can calculate an object distance to the left side imaging optical system $11_L$ on the basis of a signal from the focus encoder $42_L$, it can calculate the image formation magnification β of the left side imaging optical system $11_L$. Similarly, the keystone distortion correction signal generation portion $32_R$ can calculate the image formation magnification β of the right side imaging optical system $11_L$ on the basis of a signal from the focus encoder $42_R$. Furthermore, the keystone distortion correction signal generation portions $32_R$ and $32_L$ can calculate inclination angles θ on the basis of signals from the corresponding rotational angle detecting means $28_R$ and $28_L$.

As shown in FIG. 5B, the multi-lens imaging apparatus of this embodiment further includes the keystone distortion correction signal generation portion $32_L$ for generating a keystone distortion correction signal on the basis of the output signals from the rotational angle detecting means $28_L$, the zoom encoder $41_L$, and the focus encoder $42_L$ of the left side imaging optical system $11_L$, and outputting the keystone distortion correction signal to the camera tube electron beam scanning locus control driver $31_L$, the keystone distortion correction signal generation portion $32_R$ for generating a keystone distortion correction signal on the basis of the output signals from the rotational angle detecting means $28_R$, the zoom encoder $41_R$, and the focus encoder $42_R$ of the right side imaging optical system $11_R$, and outputting the keystone distortion correction signal to a camera tube electron beam scanning locus control driver $31_R$, and a synthesizing process portion 38 for forming a single high-fine image by synthesizing a right side image $I_R$ sent from a right side image sensor $12_R$ and a left side image $I_L$ sent from the left side image sensor $12_L$. Note that the high-fine image formed by the synthesizing process portion 38 is output to a high fine monitor 40, and is displayed thereon.

The principle of correcting keystone distortions in the keystone distortion correction signal generation portions $32_R$ and $32_L$ will be described below with reference to FIGS. 6 to 8.

Figure 6:
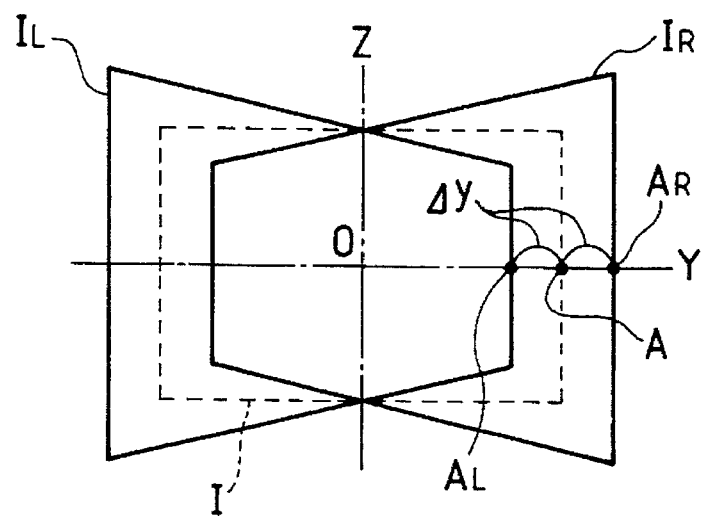
FIG. 6 is an explanatory view for explaining the principle of correcting keystone distortions in the keystone distortion correction signal generation portions shown in FIG. 5B.

When keystone distortions are respectively generated in the left side image $I_L$ obtained by the left side image sensor $12_L$ constituting the left side imaging system $10_L$ and in the right side image $I_R$ obtained by the right side image sensor $12_R$ constituting the right side imaging system $10_R$, if a point A on the Y-axis of a required image I indicated by a broken line in FIG. 6 is defined as a reference point, a point $A_L$ on the left side image $I_L$ corresponding to the point A is deviated leftward in FIG. 6 by a horizontal deviation amount Δy, and a point $A_R$ on the left side image $I_R$ corresponding to the point A is deviated rightward in FIG. 6 by a horizontal deviation amount Δy.

Figure 7:
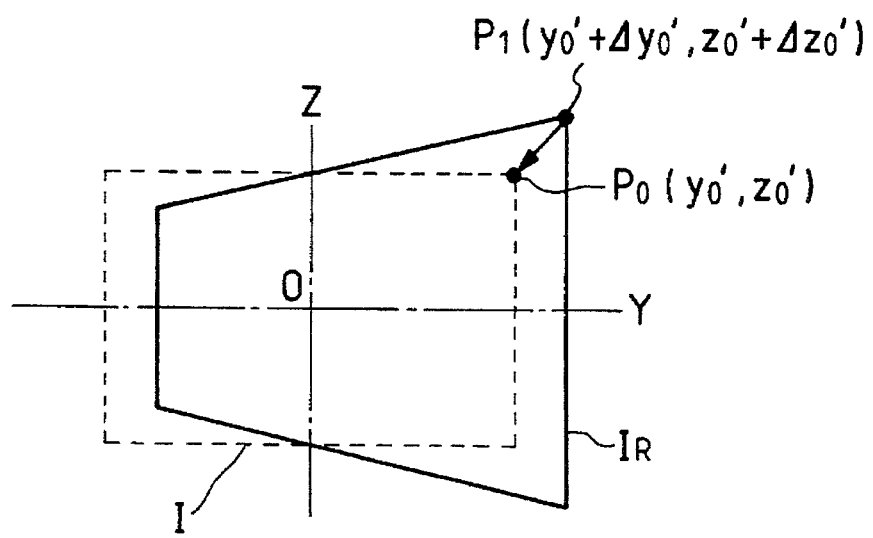
FIG. 7 is an explanatory view for explaining the principle of correcting keystone distortions in the keystone distortion correction signal generation portions shown in FIG. 5B.

If an arbitrary point $P_0$ on the required image I indicated by a broken line in FIG. 7 is defined as a reference point, a point $P_1$ on the left side image corresponding to the point $P_0$ is deviated rightward in FIG. 7 by a horizontal deviation amount $Δy_0'$ and is deviated upward in FIG. 7 by a vertical deviation amount $Δz_0'$ if the coordinates of the point $P_0$ are represented by ($y_0'$, $z_0'$), and the coordinates of the point $P_1$ are represented by ($y_0'+Δy_0'$, $z_0'+Δz_0'$). However, the horizontal and vertical deviation amounts $Δy_0'$ and $Δz_0'$ can be calculated from the focal length f and the image formation magnification β of the right side imaging optical system $11_R$ and the inclination angle θ of the right side imaging system $10_R$. This principle will be described in more detail below with reference to FIG. 8.

Figure 8:
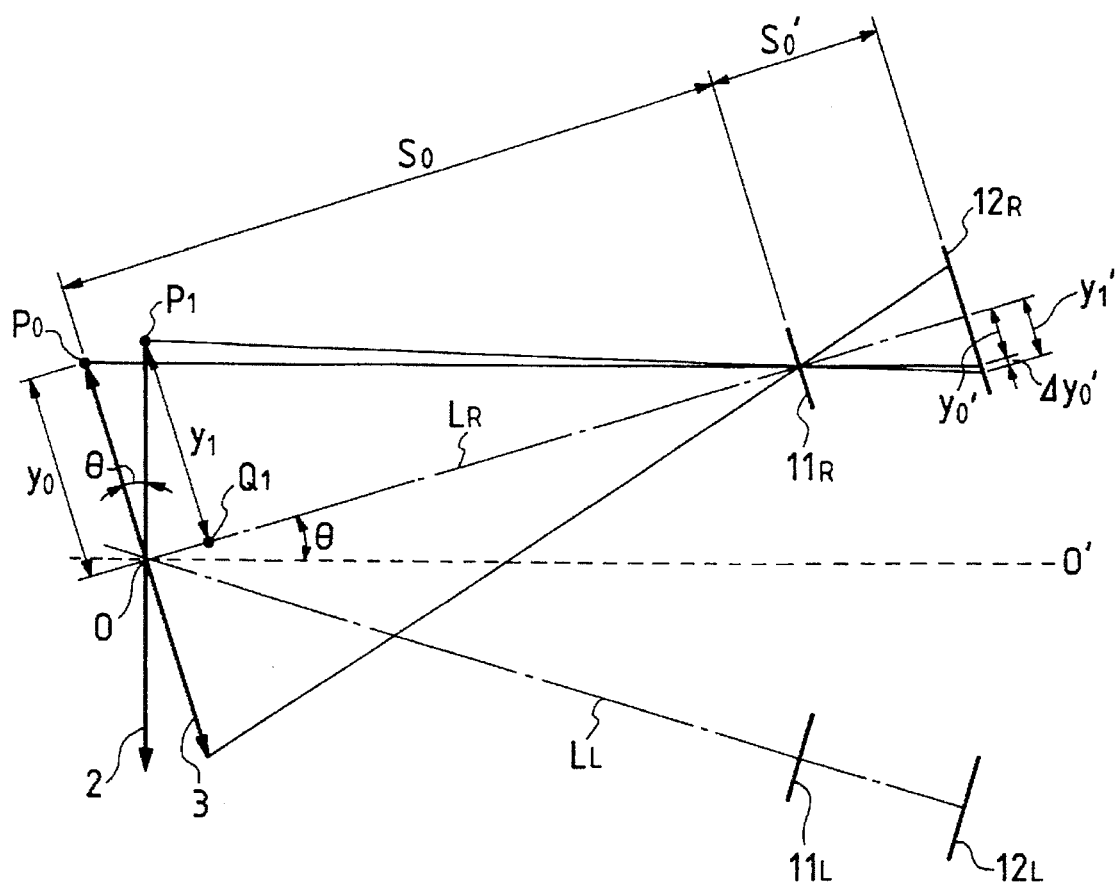
FIG. 8 is an explanatory view for explaining the principle of correcting keystone distortions in the keystone distortion correction signal generation portions shown in FIG. 5B.

As shown in FIG. 8, when the right and left imaging systems $10_R$ and $10_L$ respectively perform imaging operations of an object surface 2, so that their optical axes $L_R$ and $L_L$ cross at a point O on the object surface 2, a conjugate object surface 3 passing through the point O on the object surface 2 and conjugate with the right side image sensor $12_R$ is assumed.

A point $P_0$ on the object surface 2 and a point $P_1$ on the conjugate object surface 3, which satisfy $OP_0=OP_1$, will be examined below. In this case, an object height $y_0$ of the point $P_0$ with respect to the right side imaging optical system $11_R$ and an object height $y_1$ of the point $P_1$ with respect to the right side imaging optical system $11_R$ satisfy:

$$y_1 = y_0 \times \cos(θ) \quad (1)$$

A length $OQ_1$ between an intersection $Q_1$ of a perpendicular drawn from the point $P_1$ to the optical axis $L_R$, and point O is expressed by:

$$OQ_1 = y_0 \times \sin(θ) \quad (2)$$

Furthermore, if image heights on the right side image sensor $12_R$ with respect to the object heights $y_0$ and $y_1$ are respectively represented by $y_0'$ and $y_1'$, the horizontal deviation amount $Δy_0'$ is given by:

$$Δy_0' = y_1' - y_0' \quad (3)$$

If the distance (object distance) from the front-side principal point of the right side imaging optical system $11_R$ to the object surface 2 is represented by $S_0$, and the distance from the rear-side principal point of the right side imaging optical system $11_R$ to the image surface of the right side image sensor $12_R$ is represented by $S_0'$, the image height $y_1'$ is expressed by:

$$y_1' = y_1 \times S_0'/(S_0 - OQ_1) \quad (4)$$

Thus, from equations (1), (2), and (4), the image height $y_1'$ can be expressed by:

$$y_1' = S_0' \times y_0 \times \cos(θ)/(S_0 - y_0 \times \sin(θ)) \quad (5)$$

Also, the image height $y_0'$ is expressed by:

$$y_0' = y_0 \times S_0'/S_0 \quad (6)$$

For this reason, from equations (3), (5), and (6), the horizontal deviation amount $Δy_0'$ can be expressed by:

$$Δy_0' = \{S_0' \times \cos(θ)/(S_0' - y_0' \times \sin(θ)) - 1\} \times y_0' \quad (7)$$

Similarly, the vertical deviation amount $Δz_0'$ can be expressed by:

$$\begin{aligned} Δz_0' &= z_1' - z_0' \\ &= \{S_0'/(S_0' - y_0' \times \sin(θ)) - 1\} \times z_0' \end{aligned} \quad (8)$$

In this case, the distance $S_0'$ from the rear-side principal point of the right side imaging optical system $11_R$ to the image surface of the right side image sensor $12_R$ is expressed as follows using the focal length f and the image formation magnification β of the right side imaging optical system $11_R$:

$$S_0' = f \times (1-β) \quad (9)$$

Therefore, the horizontal and vertical deviation amounts $Δy_0'$ and $Δz_0'$ can be respectively calculated from the focal length f and the image formation magnification $\beta$ of the right side imaging optical system $11_R$ and the inclination angle $\theta$ of the right side imaging system $10_R$. The same applies to the left side imaging system $10_L$.

The operation of the multi-lens imaging apparatus of this embodiment will be described below.

When the object surface 2 is located at an infinity distance position, no keystone distortions are generated in the right and left side images $I_R$ and $I_L$ obtained by the right and left side image sensors $12_R$ and $12_L$. For this reason, the synthesizing process portion 38 synthesizes the right and left side images $I_R$ and $I_L$ without executing the keystone distortion correction of the right and left side images $I_R$ and $I_L$, and outputs the synthesized image to the high fine monitor 40.

On the other hand, when the object surface 2 is located at a finite distance position, the right and left side imaging systems $10_R$ and $10_L$ are inclined in opposite directions by the convergence angle motors $27_R$ and $27_L$, so that the right and left side imaging systems $10_R$ and $10_L$ are directed toward the object surface 2. Thereafter, the inclination angles $\theta$ of the right and left side imaging systems $10_R$ and $10_L$ are controlled by the convergence angle motors $27_R$ and $27_L$, so that the sampling points on the optical axis $L_L$ of the left side imaging system $10_L$ are shifted by a ½ spatial phase pitch from those on the optical axis $L_R$ of the right side imaging system $10_R$. At this time, in synchronism with control of the inclination angles $\theta$ by the convergence angle motors $27_R$ and $27_L$, the magnification setting operations and focusing operations of the right and left side imaging optical systems $11_R$ and $11_L$ are performed using the zoom motors $25_R$ and $25_L$ and the focus motors $26_R$ and $26_L$.

In this case, since the imaging operations are performed in a state wherein the right and left imaging systems $10_R$ and $10_L$ are inclined through the inclination angle $\theta$, keystone distortions are generated in the right and left side images $I_R$ and $I_L$ obtained by the right and left side image sensors $12_R$ and $12_L$. Therefore, in order to correct these keystone distortions, the keystone distortion correction signal generation portion $32_L$ of the left side imaging optical system $11_L$ calculates the horizontal and vertical deviation amounts $\Delta y_0'$ and $\Delta z_0'$ of each point on the left side image $I_L$ obtained by the left side image sensor $12_L$ using the output signals from the rotational angle detecting means $28_L$ and the focus encoder $42_L$ and the zoom encoder $41_L$ from equations (7) to (9) described above, generates a keystone distortion correction signal for correcting the keystone distortion generated in the left side image $I_L$, and outputs the signal to the camera tube electron beam scanning locus control driver $31_L$ of the left side imaging optical system $11_L$. In this case, the distance $S_0'$ is calculated from equation (9). Alternatively, the distance $S_0'$ may be calculated from the output signal from the focus encoder $42_L$. The keystone distortion correction signal generation portion $32_R$ of the right side imaging optical system $11_R$ operates in the same manner as described above.

Figure 9:
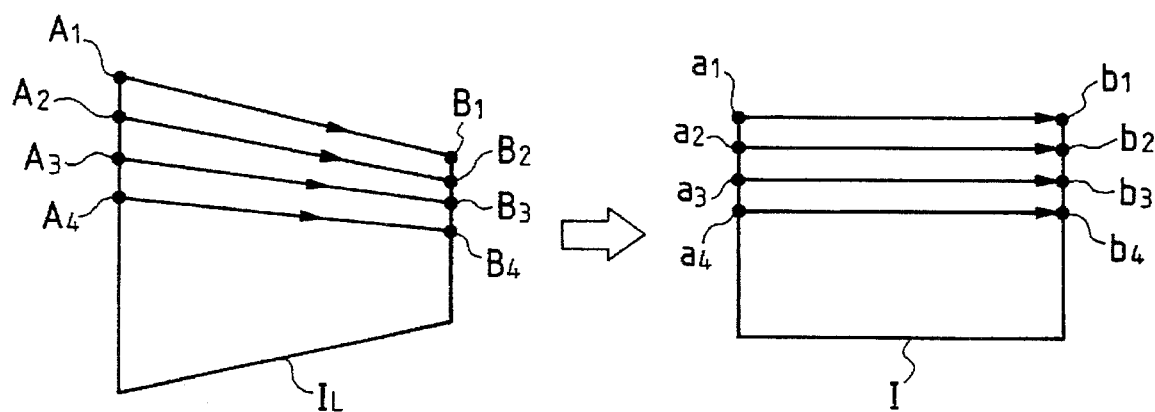
FIG. 9 is an explanatory view for explaining operations of camera tube electron beam scanning locus control drivers shown in FIG. 5B.

The camera tube electron beam scanning locus control driver $31_L$ of the left side imaging optical system $11_L$ changes the scanning locus of the electron beam emitted from the camera tube constituting the left side image sensor $12_L$ on the basis of the keystone distortion correction signal sent from the keystone distortion correction signal generation portion $32_L$, thereby correcting the keystone distortion generated in the left side image $I_L$. More specifically, the camera tube electron beam scanning locus control driver $31_L$ of the left side imaging optical system $11_L$ changes the scanning locus of the electron beam by controlling a deflection circuit of the camera tube constituting the left side image sensor $12_L$ on the basis of the keystone distortion correction signal sent from the keystone distortion correction signal generation portion $32_L$, thereby scanning the left side image $I_L$ along a point $A_1 \rightarrow$ a point $B_1$, a point $A_2 \rightarrow$ a point $B_2$, a point $A_3 \rightarrow$ a point $B_3$, and a point $A_4 \rightarrow$ a point $B_4$, as indicated by the left-hand side figure in FIG. 9. As a result, the left side image $I_L$ output from the camera tube constituting the left side image sensor $12_L$ is converted into the required image I, which is scanned along a point $a_1 \rightarrow$ a point $b_1$, a point $a_2 \rightarrow$ a point $b_2$, a point $a_3 \rightarrow$ a point $b_3$, and a point $a_4 \rightarrow$ a point $b_4$, as indicated by the right-hand side figure in FIG. 9, and the converted image is input to the synthesizing process portion 38.

In place of the rotational angle detecting means $28_R$ and $28_L$, means for detecting relative postures of the right and left imaging systems $10_R$ and $10_L$ to obtain the inclination angles $\theta$ may be used. The right and left imaging optical systems $11_R$ and $11_L$ may be constituted using zoom lenses or fixed focal point lenses.

Figure 10:
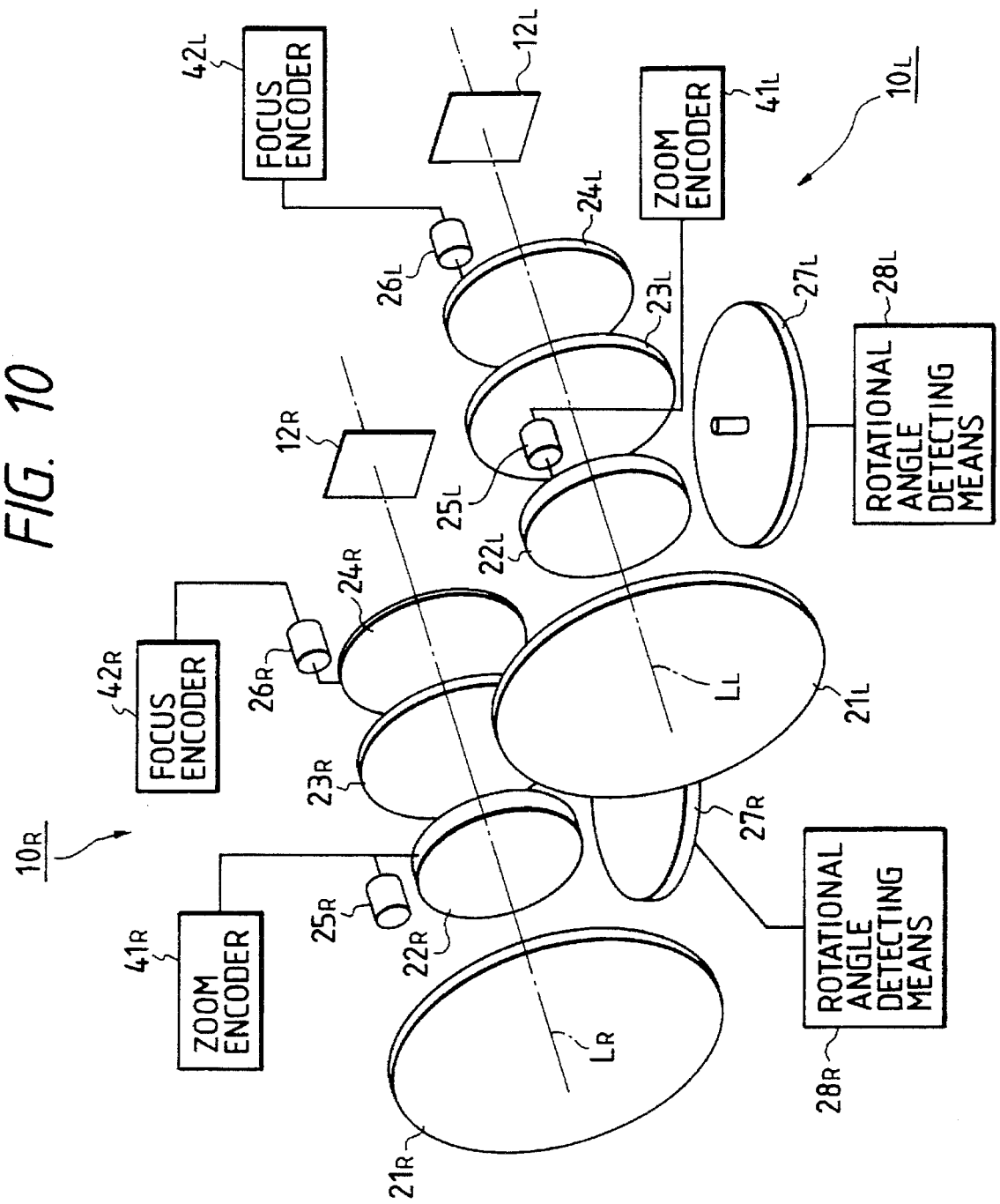
FIG. 10 is a perspective view showing the arrangement of right and left side imaging systems in a multi-lens imaging apparatus according to another embodiment of the present invention.
Figure 11:
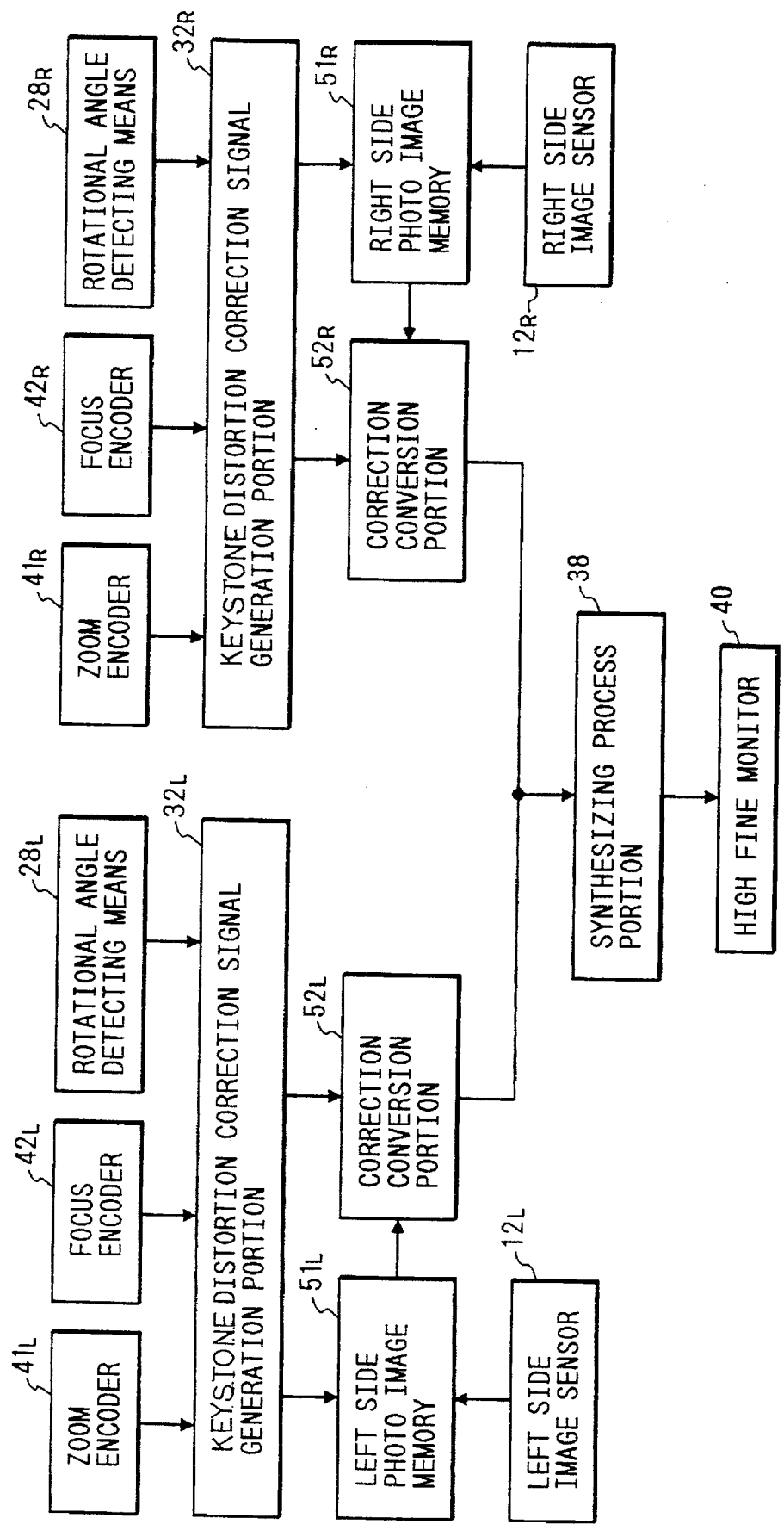
FIG. 11 is a block diagram for explaining operations of correction conversion portions in the multi-lens imaging apparatus according to the embodiment shown in FIG. 10.

FIG. 10 is a perspective view showing the arrangement of the right and left side imaging systems $10_R$ and $10_L$ in a multi-lens imaging apparatus according to another embodiment of the present invention, and FIG. 11 is a block diagram for explaining operations of correction conversion portions $52_R$ and $52_L$.

The multi-lens imaging apparatus of this embodiment has the following differences from the multi-lens imaging apparatus of the embodiment shown in FIGS. 5A and 5B.

(1) Both the right and left side image sensors $12_R$ and $12_L$ comprise solid-state imaging device in place of the camera tubes.

(2) The apparatus of this embodiment does not have the camera tube electron scanning locus control drivers $31_R$ and $31_L$ of the right and left imaging systems $10_R$ and $10_L$ shown in FIG. 5A.

(3) The apparatus of this embodiment has a left side image memory $51_L$ for left side image data output from the left side image sensor $12_L$, and a right side image memory $51_R$ for right side image data output from the right side image sensor $12_R$, as shown in FIG. 11.

(4) The apparatus of this embodiment has a correction conversion portion $52_L$ (to be described later) between the left side image memory $51_L$ and the synthesizing processing portion 38, and also has a correction conversion portion $52_R$ (to be described later) between the right side image memory $51_R$ and the synthesizing processing portion 38.

The operation of the multi-lens imaging apparatus of this embodiment will be described below.

When the object surface 2 is located at an infinity distance position, since no keystone distortions are generated in the right and left side images $I_R$ and $I_L$ obtained by the right and left side image sensors $12_R$ and $12_L$, right and left side image data respectively stored in the right and left image memories $51_R$ and $51_L$ are directly supplied to the synthesizing process portion 38 without executing keystone distortion correction of the right and left side images $I_R$ and $I_L$, and the right and left side images $I_R$ and $I_L$ are synthesized by the synthesizing process portion 38. The synthesized image is then output to the high fine monitor 40.

On the other hand, when the object surface 2 is located at a finite distance position, the right and left side imaging systems $10_R$ and $10_L$ are inclined by the convergence angle motors $27_R$ and $27_L$ in opposite directions, so that the right and left side imaging systems $10_R$ and $10_L$ are directed toward the object surface 2. Thereafter, the inclination angles $\theta$ of the right and left side imaging systems $10_R$ and $10_L$ are controlled by the convergence angle motors $27_R$ and $27_L$, so that the sampling points on the optical axis $L_L$ of the left side imaging system $10_L$ are shifted by a ½ spatial phase pitch from those on the optical axis $L_R$ of the right side imaging system $10_R$. At this time, in synchronism with control of the inclination angles θ by the convergence angle motors $27_R$ and $27_L$, the magnification setting operations and focusing operations of the right and left side imaging optical systems $11_R$ and $11_L$ are performed using the zoom motors $25_R$ and $25_L$ and the focus motors $26_R$ and $26_L$.

In this case, since the imaging operations are performed in a state wherein the right and left imaging systems $10_R$ and $10_L$ are inclined through the inclination angle θ, keystone distortions are generated in the right and left side images $I_R$ and $I_L$ obtained by the right and left side image sensors $12_R$ and $12_L$. Therefore, in order to correct these keystone distortions, as shown in FIG. 11, the keystone distortion correction signal generation portion $32_L$ of the left side imaging optical system $11_L$ calculates the horizontal and vertical deviation amounts $\Delta y_0'$ and $\Delta z_0'$ of each point on the left side image $I_L$ obtained by the left side image sensor $12_L$ using the output signals from the rotational angle detecting means $28_L$ and the focus encoder $42_L$ and the zoom encoder $41_L$ from equations (7) to (9) described above, generates a keystone distortion correction signal for correcting the keystone distortion generated in the left side image $I_L$, and outputs the signal to the correction conversion portion $52_L$. The correction conversion portion $52_L$ converts the coordinate of the left side image data of the left side image $I_L$ read out from the left side image memory $51_L$ so as to cancel the horizontal and vertical deviation amounts $\Delta y_0'$ and $\Delta z_0'$ on the basis of the keystone distortion correction signal sent from the keystone distortion correction signal generation portion $32_L$, thereby correcting the keystone distortion generated in the left side image $I_L$. In this case, the distance $S_0'$ is calculated from equation (9). Alternatively, the distance $S_0'$ may be calculated from the output signal from the focus encoder $42_L$. The keystone distortion correction signal generation portion $32_R$ and the correction conversion portion $52_R$ of the right side imaging optical system $11_R$ perform the same operation as described above.

As a result, the synthesizing process portion 38 synthesizes the right and left side image data of the right and left side images $I_R$ and $I_L$, which are respectively sent from the correction conversion portions $52_R$ and $52_L$, and in which the keystone distortions are corrected, so that a single high-fine synthesized image can be displayed on the high fine monitor 40.

In the multi-lens imaging apparatus of this embodiment, the output signal from the correction conversion portion $52_L$ is supplied to the synthesizing process portion 38. Alternatively, the output signal from the correction conversion portion $52_L$ may be stored again in the left side image memory $51_L$, and thereafter, the data may be supplied from the left side image memory $51_L$ to the synthesizing process portion 38. The same applies to the output signal from the other correction conversion portion $52_R$.

Figure 12:
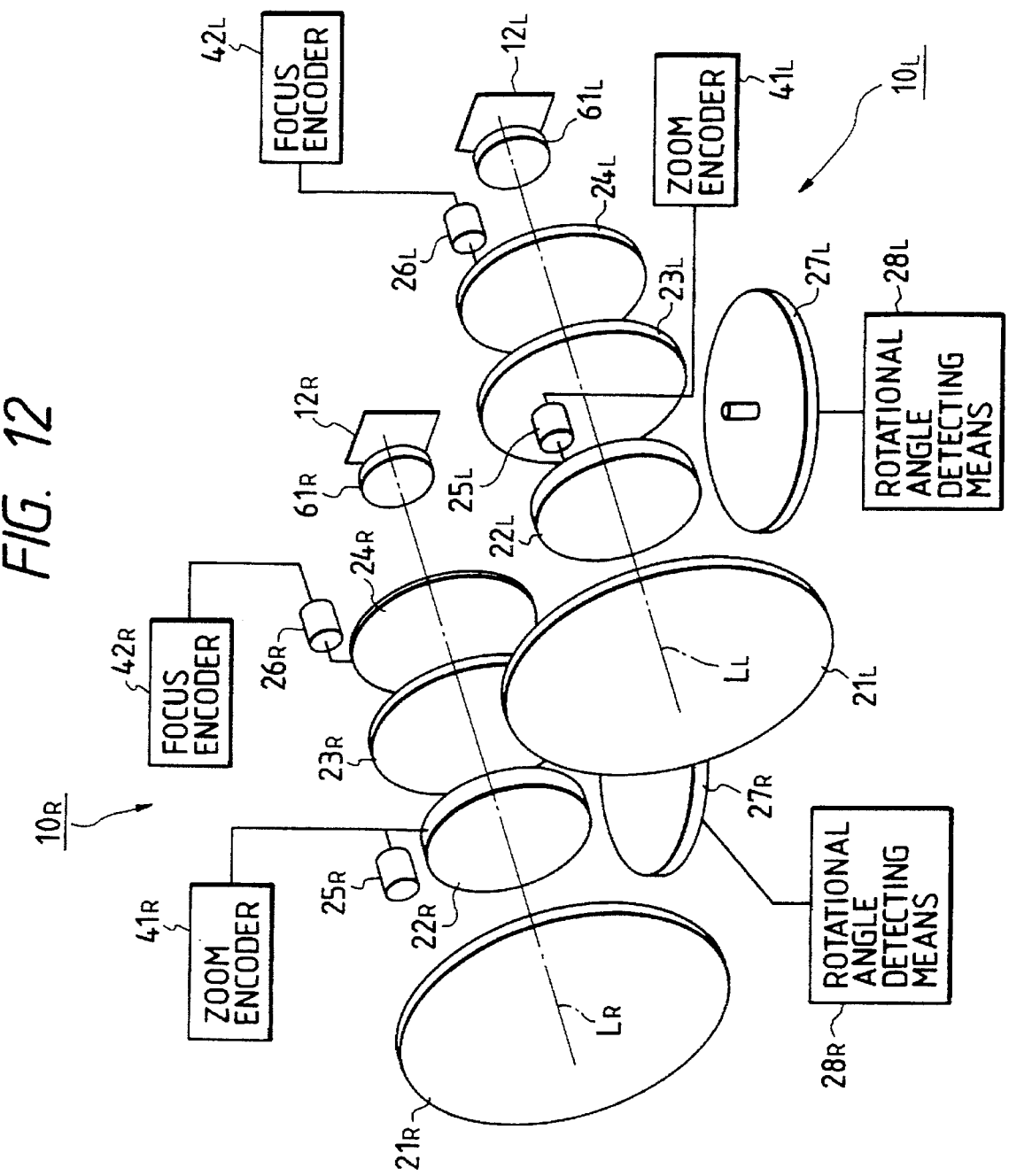
FIG. 12 is a perspective view showing the arrangement of right and left side imaging systems in a multi-lens imaging apparatus according to still another embodiment of the present invention.
Figure 13:
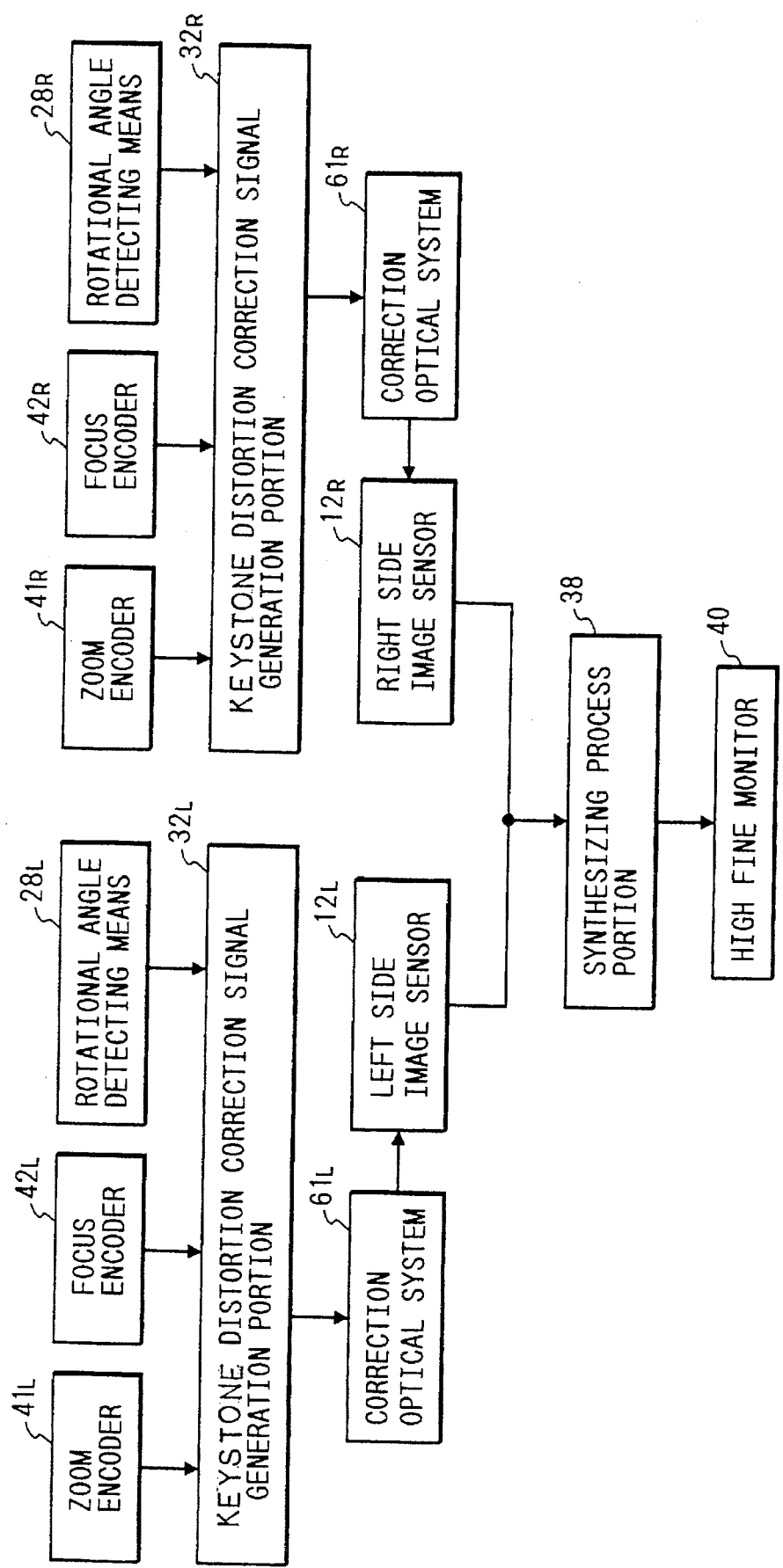
FIG. 13 is a block diagram showing operations of correction optical systems shown in FIG. 12.

FIG. 12 is a perspective view showing an arrangement of the right and left imaging systems $10_R$ and $10_L$ in a multi-lens imaging apparatus according to still another embodiment of the present invention, and FIG. 13 is a block diagram for explaining operations of correction optical systems $61_R$ and $61_L$.

In the multi-lens imaging apparatus of this embodiment, lenses constituting correction optical systems $61_R$ and $61_L$ (to be described later) are decentered in the vertical direction with respect to the optical axes $L_R$ and $L_L$ so as to generate distortions, thereby correcting keystone distortions generated in the right and left side images $I_R$ and $I_L$ obtained by the right and left side image sensors $12_R$ and $12_L$. More specifically, the arrangement of the multi-lens imaging apparatus is substantially the same as that of the multi-lens imaging apparatus of the embodiment shown in FIGS. 10 and 11, except that the apparatus of this embodiment has the correction optical system $61_L$ arranged between the left side imaging optical system $11_L$ and the left side image sensor $12_L$, and the correction optical system $61_R$ arranged between the right side imaging optical system $11_R$ and the right side image sensor $12_R$, in place of the correction conversion portions $52_L$ and $52_R$.

The operation of the multi-lens imaging apparatus of this embodiment will be described below.

When the object surface 2 is located at an infinity distance position, since no keystone distortions are generated in the right and left side images $I_R$ and $I_L$ obtained by the right and left side image sensors $12_R$ and $12_L$, the right and left side images $I_R$ and $I_L$ are synthesized by the synthesizing process portion 38 without executing keystone distortion correction of the right and left side images $I_R$ and $I_L$, and the synthesized image is output to the high fine monitor 40.

On the other hand, when the object surface 2 is located at a finite distance position, the right and left side imaging systems $10_R$ and $10_L$ are inclined by the convergence angle motors $27_R$ and $27_L$ in opposite directions, so that the right and left side imaging systems $10_R$ and $10_L$ are directed toward the object surface 2. Thereafter, the inclination angles θ of the right and left side imaging systems $10_R$ and $10_L$ are controlled by the convergence angle motors $27_R$ and $27_L$, so that the sampling points on the optical axis $L_L$ of the left side imaging system $10_L$ are shifted by a ½ spatial phase pitch from those on the optical axis $L_R$ of the right side imaging system $10_R$. At this time, in synchronism with control of the inclination angles θ by the convergence angle motors $27_R$ and $27_L$, the magnification setting operations and focusing operations of the right and left side imaging optical systems $11_R$ and $11_L$ are performed using the zoom motors $25_R$ and $25_L$ and the focus motors $26_R$ and $26_L$.

In this case, since the imaging operations are performed in a state wherein the right and left imaging systems $10_R$ and $10_L$ are inclined through the inclination angle θ, keystone distortions are generated in the right and left side images $I_R$ and $I_L$ obtained by the right and left side image sensors $12_R$ and $12_L$. Therefore, in order to correct these keystone distortions, as shown in FIG. 13, the keystone distortion correction signal generation portion $32_L$ of the left side imaging optical system $11_L$ calculates the horizontal and vertical deviation amounts $\Delta y_0'$ and $\Delta z_0'$ of each point on the left side image $I_L$ obtained by the left side image sensor $12_L$ using the output signals from the rotational angle detecting means $28_L$ and the focus encoder $42_1$ and the zoom encoder $41_L$ from equations (7) to (9) described above, generates a keystone distortion correction signal for correcting the keystone distortion generated in the left side image $I_L$, and outputs the signal to the correction optical system $61_L$ of the left side imaging optical system $11_L$. The correction optical system $61_L$ of the left side imaging optical system $11_L$ decenters at least one of lenses constituting the correction optical system $61_L$ in the vertical direction with respect to the optical axis $L_L$ on the basis of the keystone distortion correction signal sent from the keystone distortion correction signal generation portion $32_L$ so as to generate a distortion, thereby correcting the keystone distortion generated in the left side image $I_L$. In this case, the distance $S_0'$ is calculated from equation (9). Alternatively, the distance $S_0'$ may be calculated from the output signal from the focus encoder $42_L$. The keystone distortion correction signal generation portion $32_R$ and the correction optical system $61_R$ of the right side imaging optical system $11_L$ perform the same operations as described above.

Figure 14:
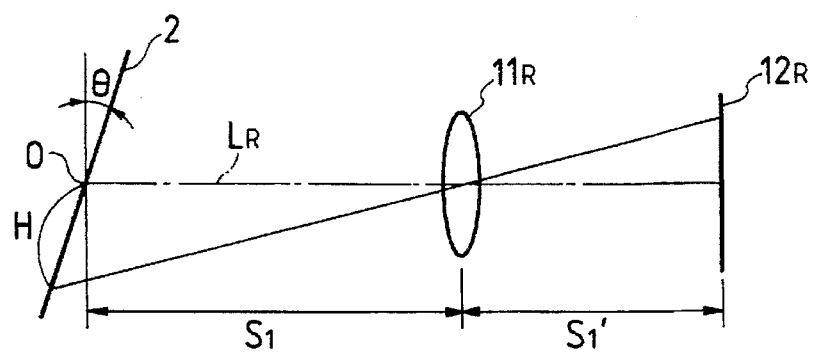
FIG. 14 is an explanatory view for explaining the principle of correcting keystone distortions in the correction optical systems shown in FIG. 12.

The principle of correcting keystone distortions will be described below with reference to FIG. 14.

The object surface 2 is inclined through the inclination angle θ with respect to the optical axis $L_R$, and its image is formed on the right side image sensor $12_R$. If the distance from the object surface 2 to the right side imaging optical system $11_R$ is represented by $S_1$, the distance from the right side imaging optical system $11_R$ to the image surface of the right side image sensor $12_R$ is represented by $S_1'$, and a point O on the object surface 2 is defined as an intersection between the optical axis $L_R$ and the object surface 2, an image formation magnification $β_H$ at a height H of the object surface 2 is expressed as follows by a paraxial calculation:

$$β_H = S_1'/(S_1 + H × \sin(θ)) \quad (10)$$
$$= β × \{S_1/(S_1 + H × \sin(θ))\}$$

where β=the image formation magnification at the point O on the object surface 2

Figure 15:
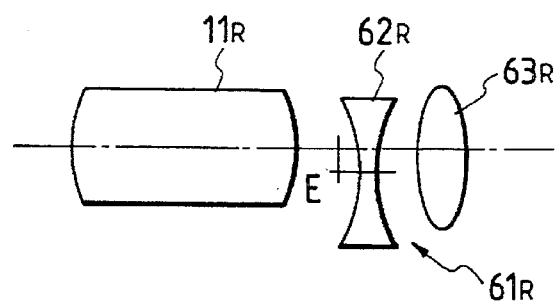
FIG. 15 is an explanatory view for explaining the principle of correcting keystone distortions in the correction optical systems shown in FIG. 12.

A decentering distortion d generated when a concave lens $62_R$ of the correction optical system $61_R$ (consisting of the concave lens $62_R$ and a convex lens $63_R$) arranged between the right side imaging optical system $11_R$ and the right side image sensor $12_R$ is parallelly decentered by a distance E in the vertical direction in FIG. 15 is given, in consideration of up to a third-order term, by:

$$d = -(E/2) × (\tan(ω))^2 × (3 × V_{E1} - V_{E2}) \quad (11)$$

for tan(ω)=H/f (f=the focal length of the right side imaging optical system 11R)

Figure 16:
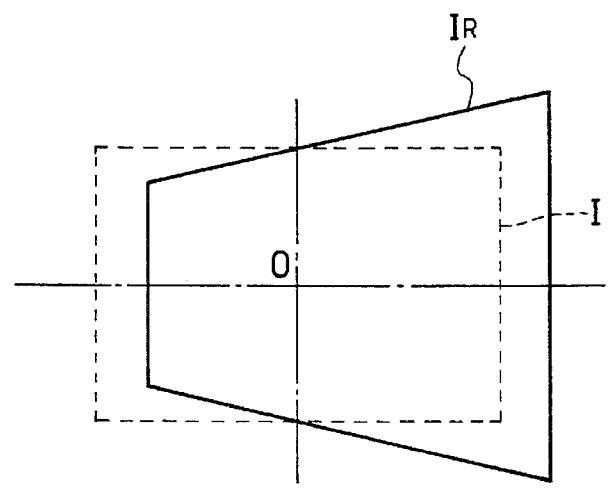
FIG. 16 is an explanatory view for explaining the principle of correcting keystone distortions in the correction optical systems shown in FIG. 12.

Note that $V_{E1}$ and $V_{E2}$ included in equation (11) are parallel decentering distortion coefficients of the correction optical system $61_R$, and are respectively given by:

$$V_{E1} = (h × φ × V_q - a × V_p)$$
$$- (h × φ × B_q - a × B_p) \quad (12)$$

$$V_{E2} = h × φ × P_q - a × P_p \quad (13)$$

where

φ=the refracting power of the correction optical system $61_R$ $V_p$=the third-order distortion of the convex lens $63_R$ $B_p$=the astigmatism coefficient of the convex lens $63_R$ $P_p$=the Petzval's sum of the convex lens $63_R$ $V_q$=the third-order distortion on the object surface 2 side of the concave lens $62_R$ $B_q$=the astigmatism coefficient on the object surface 2 side of the concave lens $62_R$ $P_q$=the Petzval's sum on the object surface 2 side of the concave lens $62_R$ h=the incident position of the paraxial object ray onto the correction optical system $61_R$ a=the incident angle of the paraxial object ray onto the correction optical system $61_R$ Since the distortion generated when the correction optical system $61_R$ is decentered is calculated in the above-mentioned procedures, keystone distortion correction shown in FIG. 16 can be attained by decentering the correction optical system $61_R$ so that the signs of $β_H/β - 1$ and the decentering distortion d are opposite to each other:

$$d = -β_H/β - 1 \quad (14)$$

In this manner, a keystone distortion can be corrected in a region up to the third order. Note that the parallel decentering amount E of the correction optical system $61_R$ can be calculated from equations (10) to (14).

When the right side image $I_R$ in which the keystone distortion is corrected in this manner, and which is obtained from the right side image sensor $12_R$, and the left side image $I_L$ in which the keystone distortion is similarly corrected, and which is obtained from the left side image sensor $12_L$ are synthesized by the synthesizing process portion 38, a single high-fine image can be displayed on the high fine monitor 40 (see FIG. 13).

Figure 17B:
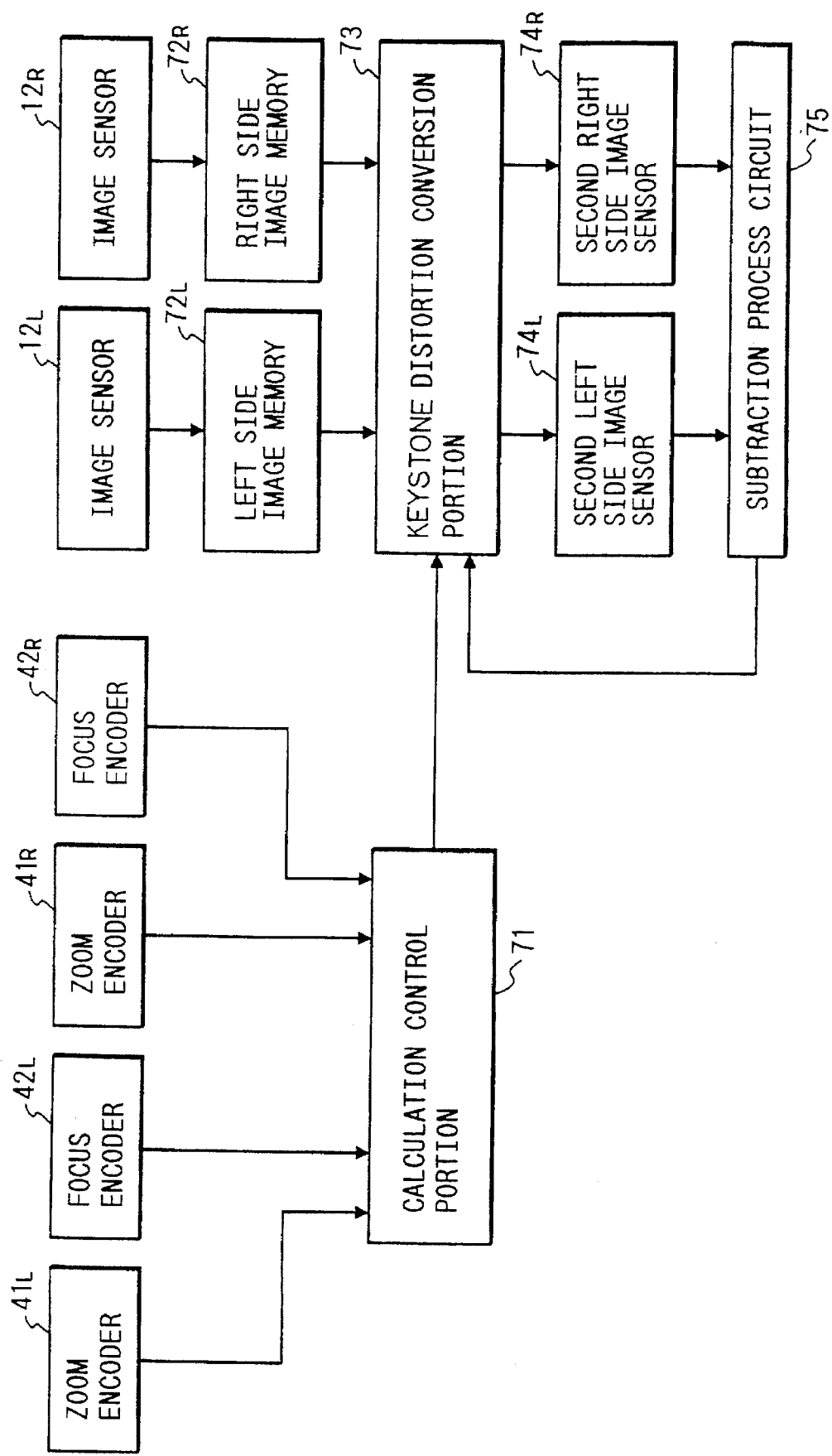

FIGS. 17A and 17B show a multi-lens imaging apparatus according to still another embodiment of the present invention.

The multi-lens imaging apparatus of this embodiment obtains a single high-fine image by synthesizing two images obtained by picking up an image of a common object using two imaging systems (right and left side imaging systems $10_R$ and $10_L$).

The arrangement of the right and left side imaging systems $10_R$ and $10_L$ will be described in detail below with reference to FIG. 17A.

The left side imaging system $10_L$ includes lens groups $21_L$ to $24_L$ including a zoom lens group $22_L$ and a focus lens group $24_L$, a zoom motor $25_L$ as a driving system for driving the zoom lens group $22_L$, a focus motor $26_L$ as a driving system for driving the focus lens group $24_L$, a mechanism system (not shown) and a driving system (convergence angle motor $27_L$) for integrally rotating the left side imaging optical system $11_L$ and a left side image sensor $12_L$ in a plane including an optical axis $L_L$, and a rotational angle detecting means $28_L$ for detecting the rotational angle of the convergence angle motor $27_L$, which constitute a left side imaging optical system $11_L$. As the rotational angle detecting means $28_L$, for example, an externally attached member such as a rotary encoder may be used, or a means such as a pulse motor for detecting the rotational angle by the driving system itself according to a driving method may be used. The right side imaging system $10_R$ has the same arrangement as that of the left side imaging system $10_L$.

Assume that when the focus motor $26_L$ and the zoom motor $25_L$ of the left side imaging optical system $11_L$ are independently controlled by signals from the focus encoder $42_L$ and the zoom encoder $41_L$, and a focus motor $26_R$ and a zoom motor $25_R$ of a right side imaging optical system $11_R$ are independently controlled by signals from a focus encoder $42_R$ and a zoom encoder $41_R$, a focal length f of the left side imaging optical system $11_L$ always coincides with a focal length f of the right side imaging optical system $11_R$, and an image formation magnification β of the left side imaging optical system $11_L$ always coincides with an image formation magnification β of the right side imaging optical system $11_R$.

At this time, a calculation control portion 71 shown in FIG. 17B can calculate the focal length f of the left side imaging optical system $11_L$ on the basis of a signal from the zoom encoder $41_L$, and can calculate the focal length f of the right side imaging optical system $11_R$ on the basis of a signal from the zoom encoder $41_R$. Also, since the calculation control portion 71 can calculate an object distance to the left side imaging optical system $11_L$ on the basis of a signal from the focus encoder $42_L$, it can calculate the image formation magnification β of the left side imaging optical system $11_L$, and similarly, it can calculate the image formation magnification β of the right side imaging optical system $11_R$ on the basis of a signal from the focus encoder $42_R$. Furthermore, the calculation control portion 71 can calculate inclination angles θ from the signals output from the rotational angle detecting means $28_R$ and $28_L$.

The output signals from the zoom encoders $41_R$ and $41_L$ and the focus encoders $42_R$ and $42_L$ are input to the calculation control portion 71, as shown in FIG. 17B. The calculation control portion 71 can calculate the distance $S_0'$ from the rear-side principal point of the left side imaging optical system $11_L$ to the image surface of the left side image sensor $12_L$ and the distance $S_0'$ from the rear-side principal point of the right side imaging optical system $11_R$ to the image surface of the right side image sensor $12_R$ from equation (9) described above:

$$S_0' = f \times (1-\beta) \tag{9}$$

Left side image data of a left side image $I_L$ output from the left side image sensor $12_L$ is stored in a left side image memory $72_L$, and right side image data of a right side image $I_R$ output from the right side image sensor $12_R$ is stored in a right side image memory $72_R$.

Figure 18:
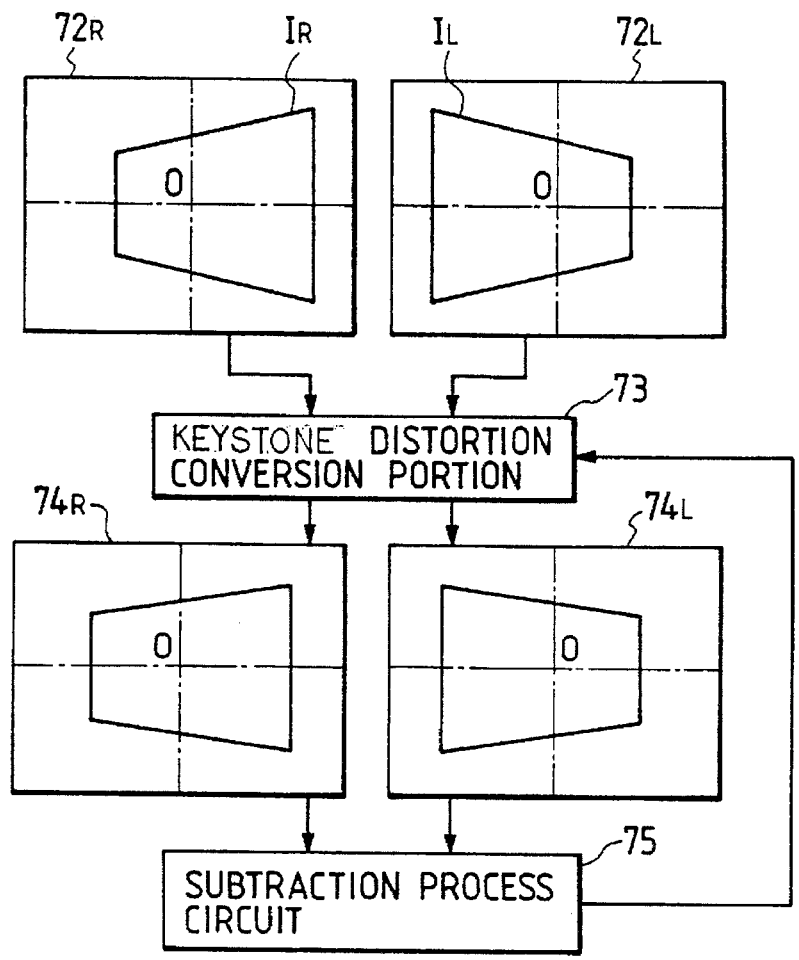
FIG. 18 is an explanatory view for explaining operations of a keystone distortion conversion portion and a subtraction process circuit shown in FIG. 17B.

The principle of correcting keystone distortions generated in the right and left images $I_R$ and $I_L$ by a keystone distortion conversion portion 73, second right and left side image memories $74_R$ and $74_L$, and a subtraction process circuit 75 shown in FIG. 17B will be described below with reference to FIGS. 18 and 19.

The keystone distortion conversion portion 73 calculates horizontal and vertical deviation amounts $\Delta y_0'$ and $\Delta z_0'$ of predetermined several image points from equations (7) and (8) described above using the left side image data read out from the left side image memory $72_L$, the right side image data read out from the right side image memory $72_R$, and the distances $S_0'$ sent from the calculation control portion 71. At this time, the inclination angle θ is defined as a conversion variable (an angle is not detected), and the horizontal and vertical deviation amounts $\Delta y_0'$ and $\Delta z_0'$ are calculated by substituting, e.g., θ=θ₁ (θ₁ is an arbitrary value). Thereafter, the keystone distortion conversion portion 73 shifts the coordinates of the image points in the right and left side image memories $72_R$ and $72_L$ by the calculated horizontal and vertical deviation amounts $\Delta y_0'$ and $\Delta z_0'$, and writes the shifted right and left side image data in the second right and left side image memories $74_R$ and $74_L$, respectively. Thereafter, the subtraction process circuit 75 reads out the coordinate-shifted right and left side image data respectively from the second right and left side image memories $74_R$ and $74_L$, and calculates a sum (to be referred to as an "image difference" hereinafter) $\delta_{S1}$ of the absolute values of differences of these data. Subsequently, the keystone distortion conversion portion 73 changes the inclination angle θ (conversion variable) to be θ=θ₂, and an image difference $\delta_{S2}$ is similarly calculated.

Figure 19:
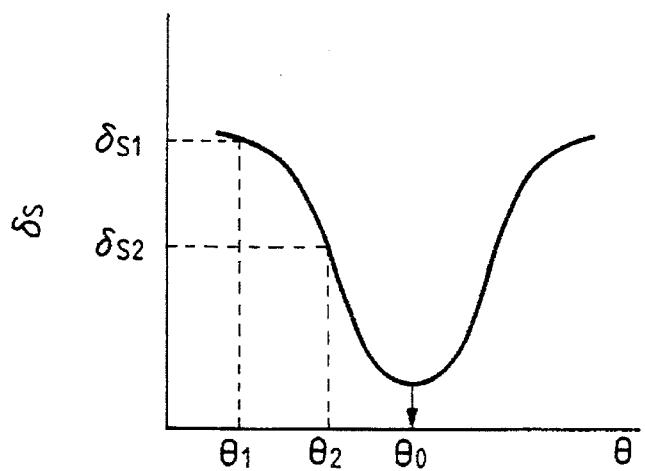
FIG. 19 is a graph showing the relationship between the image difference and the inclination angle (conversion variable)

When the above-mentioned operations are repeated, since the relationship between the inclination angle θ (conversion variable) and the image difference $\delta_S$ can be obtained, as shown in, e.g., FIG. 19, an inclination angle θ₀ (conversion variable) at which the image difference $\delta_s$ assumes a minimum value is obtained. The keystone distortion conversion portion 73 calculates the horizontal and vertical deviation amounts $\Delta y_0'$ and $\Delta z_0'$ of all image points of the left side image data from equations (7) and (8) using the inclination angle θ₀ (conversion variable) at which the image difference $\delta_s$ assumes a minimum value, thereafter, shifts the coordinates of all the image points of the left side image data by the calculated horizontal and vertical deviation amounts $\Delta y_0'$ and $\Delta z_0'$, and writes the shifted left side image data in the second left side image memory $74_L$. As a result, the left side image data in which the keystone distortion is corrected is written in the second left side image memory $74_L$. Therefore, when the left side image data in which the keystone distortion is corrected, and which is written in the second left side image memory $74_L$, and the right side image data in which the keystone distortion is corrected, and which is written in the second right side image memory $74_R$ are synthesized by a synthesizing process portion (not shown), a single high-fine image can be displayed on a high fine monitor (not shown).

Figure 20B:
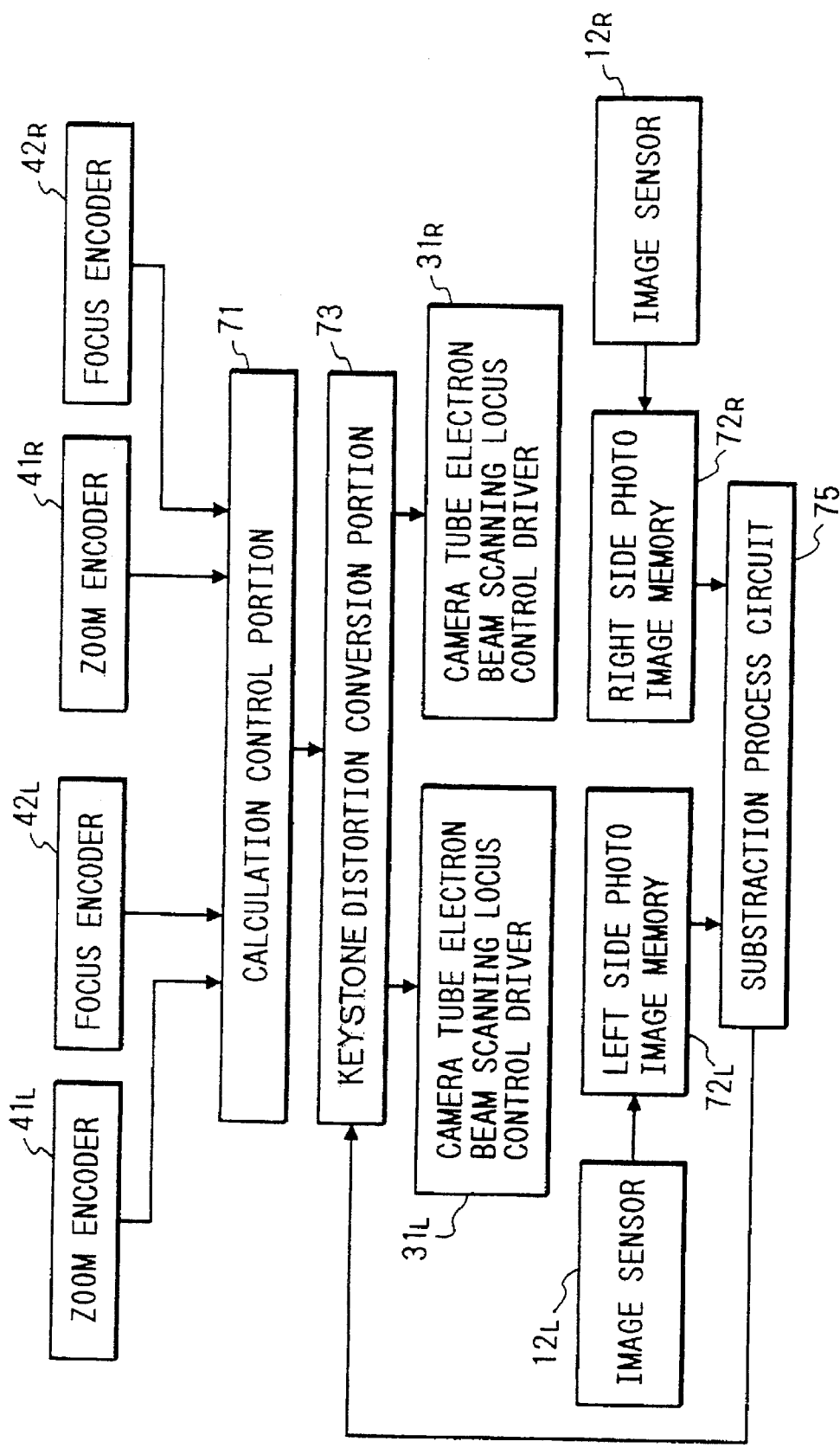

FIGS. 20A and 20B show a multi-lens imaging apparatus according to still another embodiment of the present invention.

The arrangement of the multi-lens imaging apparatus of this embodiment is substantially the same as that of the multi-lens imaging apparatus of the embodiment shown in FIGS. 17A and 17B, except that the right and left image sensors $12_R$ and $12_L$ comprise camera tubes, and the keystone distortion conversion portion 73 controls camera tube electron beam scanning locus drivers $31_R$ and $31_L$ according to the calculated horizontal and vertical deviation amounts $\Delta y_0'$ and $\Delta z_0'$.

Since the operations of the camera tube electron beam scanning locus drivers $31_R$ and $31_L$ and the principle of correcting keystone distortions in the multi-lens imaging apparatus of this embodiment are the same as those in the multi-lens imaging apparatuses in the embodiments shown in FIGS. 5A and 5B and FIGS. 17A and 17B, a repetitive description will be avoided here.

Figure 21C:
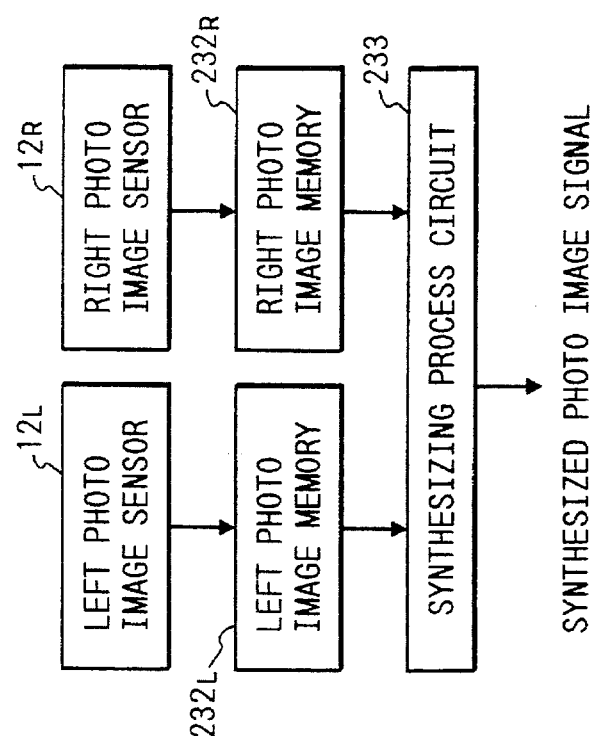
Figure 21B:
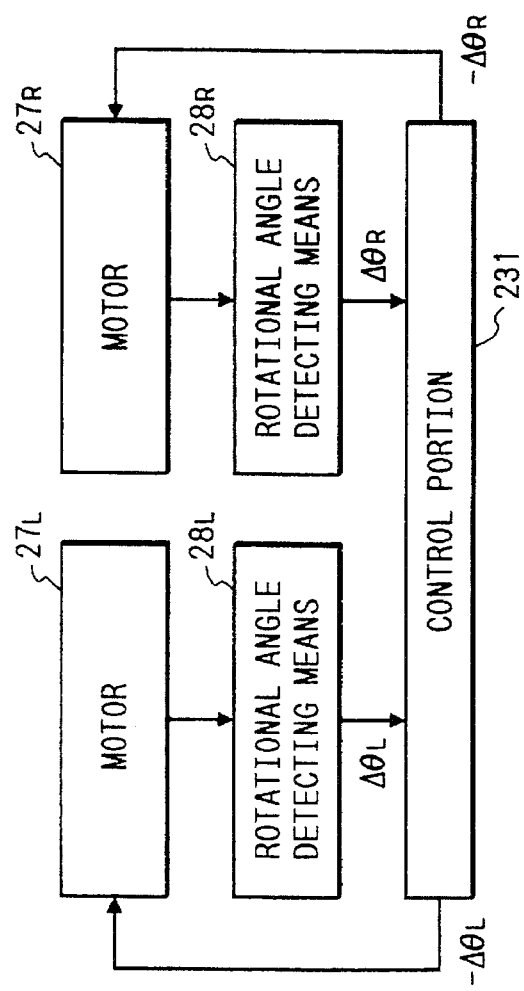
Figure 22:
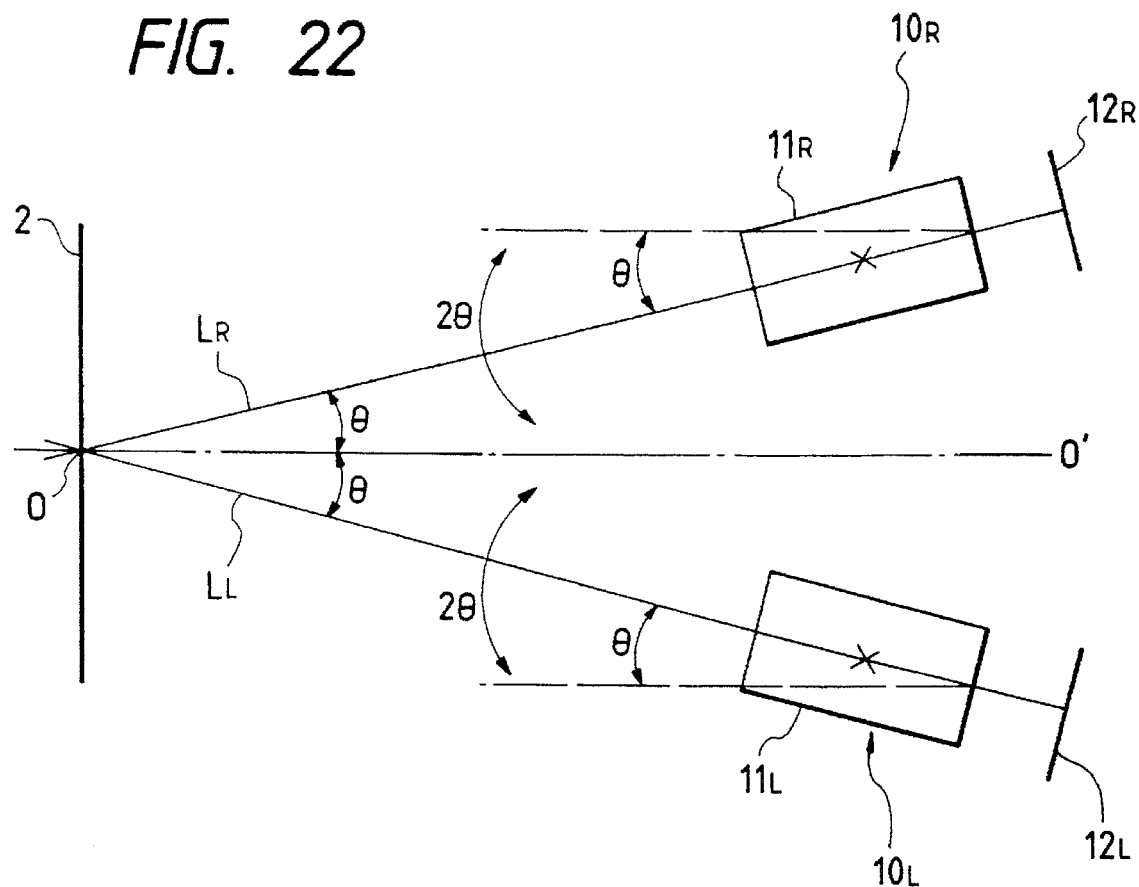
FIG. 22 is an explanatory view for explaining a basic arrangement of imaging systems in the multi-lens imaging apparatus according to the embodiment shown in FIGS. 21A to 21C.

FIGS. 21A to 21C show a multi-lens imaging apparatus according to still another embodiment of the present invention, and FIG. 22 shows a basic arrangement of imaging systems in the multi-lens imaging apparatus of the embodiment shown in FIGS. 21A to 21C.

The multi-lens imaging apparatus of this embodiment obtains a single high-fine image by synthesizing two images obtained by picking up an image of a common object using two sets of imaging systems (right and left side imaging systems $10_R$ and $10_L$).

As shown in FIG. 22, the left side imaging system $10_L$ is constituted by a left side imaging optical system $11_L$ and a left side image sensor $12_L$, and the right side imaging system $10_R$ is constituted by a right side imaging optical system $11_R$ and a right side image sensor $12_R$. The right and left side imaging optical systems $11_R$ and $11_L$ have equivalent specifications, and each comprises a zoom lens. The right and left side image sensors $12_R$ and $12_L$ have equivalent specifications, and each comprises a camera tube such as a saticon or a solid-state imaging element such as a CCD. Optical axes $L_R$ and $L_L$ of the right and left imaging systems $10_R$ and $10_L$ cross almost at a point O on an object surface 2, and these systems are arranged at positions axially symmetrical about a normal O–O' to the object surface 2.

In this multi-lens imaging apparatus, when the object distance is changed, the convergence angle 2θ is changed by rotating each of the right and left side imaging systems $10_R$ and $10_L$ about an X mark shown in FIG. 22 in accordance with the change in object distance, thus performing an imaging operation.

The arrangement of the right and left imaging systems $10_R$ and $10_L$ will be described in detail below with reference to FIG. 21A.

The left side imaging system $10_L$ includes lens groups $21_L$ to $24_L$ including a zoom lens group $22_L$ and a focus lens group $24_L$, a zoom motor $25_L$ as a driving system for driving the zoom lens group $22_L$, a focus motor $26_L$ as a driving system for driving the focus lens group $24_L$, a mechanism system (not shown) and a driving system (convergence angle motor $27_L$) for integrally rotating the left side imaging optical system $11_L$ and a left side image sensor $12_L$ in a plane including an optical axis $L_L$, and a rotational angle detecting means $28_L$ for detecting the rotational angle of the convergence angle motor $27_L$, which constitute a left side imaging optical system $11_L$. As the rotational angle detecting means $28_L$, for example, an externally attached member such as a rotary encoder may be used, or a means such as a pulse motor for detecting the rotational angle by the driving system itself according to a driving method may be used. The right side imaging system $10_R$ has the same arrangement as that of the left side imaging system $10_L$.

A control method for the convergence angle motors $27_R$ and $27_L$ will be described below with reference to FIG. 21B.

When the right and left imaging systems $10_R$ and $10_L$ perform imaging operations respectively at convergence angles $2\theta+\Delta\theta_R$ and $2\theta+\Delta\theta_L$ to have angular deviations $\Delta\theta_R$ and $\Delta\theta_L$ with respect to the predetermined convergence angle $2\theta$ (see FIG. 22), the rotational angle detecting means $28_L$ detects the angular deviation $\Delta\theta_L$ with respect to an angle $\theta$ (see FIG. 22) formed between the optical axis $L_L$ of the left side imaging system $10_L$ and the normal O–O' to the object surface 2, and the rotational angle detecting means $28_R$ detects the angular deviation $\Delta\theta_R$ with respect to an angle $\theta$ formed between the optical axis $R_R$ of the right side imaging system $10_R$ and the normal O–O' to the object surface 2. The angular deviations $\Delta\theta_R$ and $\Delta\theta_L$ output from the rotational angle detecting means $28_R$ and $28_L$ are supplied to a control portion 231.

Assume that the convergence angle motors $27_R$ and $27_L$ have the following response characteristics.

Figure 23:
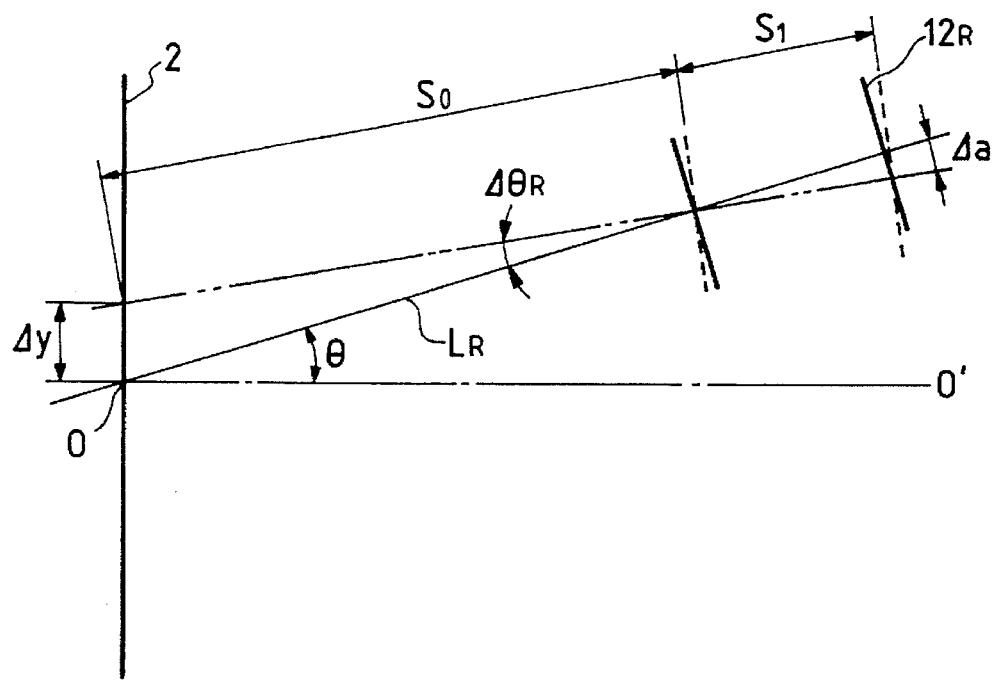
FIG. 23 is a view for explaining response characteristics of each convergence angle motor shown in FIG. 21A.

For the sake of simplicity, as shown in FIG. 23, only a mis-registration amount $\Delta a$ of a image output from the right side imaging system $10_R$ when the optical axis $L_R$ of the right side imaging system $10_R$ is deviated by the angular deviation $\Delta\theta_R$ will be examined below. If the distance (object distance) from the front-side principal point of the right side imaging optical system $11_R$ to the object surface 2 is represented by $S_0$, the distance from the rear-side principal point of the right side imaging optical system $11_R$ to the right side image sensor $12_R$ is represented by $S_1$, and the deviation amount of the optical axis $L_R$ of the right side imaging system $10_R$ in the object surface 2 is represented by $\Delta y$, when the angular deviation $\Delta\theta_R$ is small, we have:

$$S_0 \times \tan(\Delta\theta_R) = \Delta y \times \cos(\theta) \quad (15)$$

If the image formation magnification of the right side imaging optical system $11_L$ is represented by $\beta$, we have:

$$\beta = \Delta a / \Delta y \quad (16)$$

Furthermore, if the focal length of the right side imaging optical system $11_R$ is represented by f, we have:

$$S_0 = f \times (\beta-1)/\beta \quad (17)$$

From equations (15) to (17), the mis-registration amount $\Delta a$ of the image is given by:

$$\Delta a = \{f \times (\beta-1) \times \tan(\Delta\theta_R)\}/\cos(\theta) \quad (18)$$

Therefore, assume that the convergence angle motor $27_R$ shown in FIG. 21A has sufficient response characteristics for an angle $(\Delta\theta_R)$ necessary for correcting the mis-registration amount $\Delta a$ of the image given by equation (18) to be equal to or smaller than an allowable value $\Delta a_0$. The same applies to the convergence angle motor $27_L$ of the left side imaging optical system $11_L$.

The control portion 231 supplies a correction signal $-\Delta_L$ to the convergence angle motor $27_L$ of the left side imaging system $10_L$ as a control target value, and supplies a correction signal $-\Delta\theta_R$ to the convergence angle motor $27_R$ of the right side imaging system $10_R$ as a control target value, as shown in FIG. 21B. As a result, the mis-registration amount $\Delta a$ of the image obtained by each of the right and left imaging systems $10_R$ and $10_L$ can be corrected to be equal to or smaller than the allowable value $\Delta a_0$.

When the mis-registration amounts of the images are corrected as described above, a image signal output from the left side image sensor $12_L$ is stored in a left side image memory $232_L$, and a image signal output from the right side image sensor $12_R$ is stored in a right side image memory $232_R$, as shown in. FIG. 21C. Thereafter, these images are synthesized by a synthesizing process circuit 233, and a synthesized image signal is output.

Therefore, since the multi-lens imaging apparatus of this embodiment can synthesize images obtained by the right and left imaging systems $10_R$ and $10_L$ while registering the two images, if, for example, the convergence angle is controlled in advance so that the relative spatial phase between the right and left side image sensors $12_R$ and $12_L$ is shifted by a ½ pitch when the sampling points of the right and left image side sensors $12_R$ and $12_L$ are imaginarily projected onto an object, the synthesizing process circuit 233 can obtain a single high fine image.

In the multi-lens imaging apparatus of this embodiment, when a solid state imaging element is used as each of the right and left side image sensors $12_R$ and $12_L$, either a single-sensor type element or two- or three-sensor type element via a color separation system may be used. When a camera tube is used as each of the right and left side image sensors $12_R$ and $12_L$, either a single-tube type element or two- or three-tube type element via a color separation system may be used. The control portion 231 may supply a correction signal $-(\Delta\theta_L + \Delta\theta_R)$ to one of the two convergence angle motors $27_R$ and $27_L$ as a control target value in place of respectively supplying the correction signals $-\Delta\theta_R$ and $-\Delta\theta_L$ to the two convergence angle motors $27_R$ and $27_L$ as control target values.

Figure 24B:
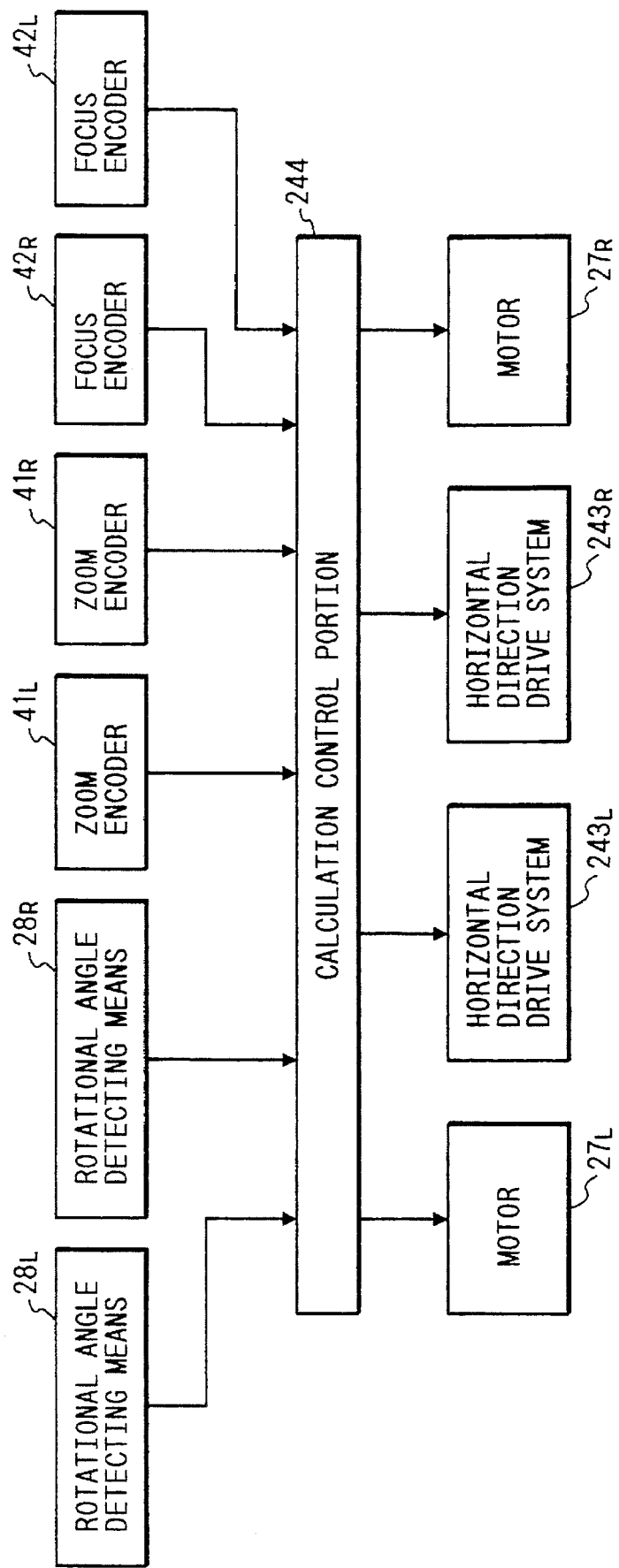

FIGS. 24A and 24B show a multi-lens imaging apparatus according to still another embodiment of the present invention.

In the multi-lens imaging apparatus of the embodiment shown in FIGS. 21A to 21C, as can be understood from equation (18), when the focal lengths f of the right and left side imaging optical systems $11_R$ and $11_L$ are large, or when the allowable values $\Delta a_0$ of the mis-registration amounts of images are small, the correction signals $-\Delta\theta_R$ and $-\Delta\theta_L$ output from the control portion 231 also take small values (e.g., on the order of several seconds), and it becomes difficult to obtain angular response performance necessary for correction under the influence of, e.g., non-sensitive bands of the convergence angle motors $27_R$ and $27_L$.

In the multi-lens imaging apparatus of the embodiment shown in FIGS. 24A and 24B, the image mis-registration amount $\Delta a$ given by equation (18) is calculated, and is corrected by means other than the convergence angle motors $27_R$ and $27_L$, thereby solving the above-mentioned problem. The apparatus of this embodiment has the following differences from the multi-lens imaging apparatus of the embodiment shown in FIGS. 21A to 21C.

(1) Zoom encoders $41_R$ and $41_L$ for detecting the focal lengths f of the right and left side imaging optical systems $11_R$ and $11_L$ are respectively provided to the zoom motors $25_R$ and $25_L$.

(2) Focus encoders $42_R$ and $42_L$ for detecting the object distances $S_O$ with respect to the right and left side imaging optical systems $11_R$ and $11_L$ are respectively provided to the focus motors $26_R$ and $26_L$.

(3) The apparatus of this embodiment includes horizontal direction drive systems $243_R$ and $243_L$ for respectively driving the right and left side image sensors $12_R$ and $12_L$ in the horizontal direction.

(4) The apparatus of this embodiment also includes a calculation control portion 244 (to be described later; see FIG. 24B).

The operation of the multi-lens imaging apparatus of this embodiment will be described below.

In the left side imaging optical system $11_L$, when the zoom motor $25_L$ is controlled by a signal from the zoom encoder $41_L$, and the focus motor $26_L$ is controlled by an output signal from the focus encoder $42_L$, the focal length f and the image formation magnification β are caused to always coincide with each other. In the right side imaging optical system $11_R$, the focal length f and the image formation magnification β are similarly caused to always coincide with each other.

Therefore, the focal lengths f and the image formation magnifications β of the right and left side imaging optical systems $11_R$ and $11_L$ can be obtained from the output signals from the zoom encoders $41_R$ and $41_L$, and the object distances $S_O$ with respect to the right and left side imaging optical systems $11_R$ and $11_L$ can be obtained from the output signals from the focus encoders $42_R$ and $42_L$. For this reason, the output signals from the zoom encoders $41_R$ and $41_L$ and the focus encoders $42_R$ and $42_L$ are input to the calculation control portion 244, and the calculation control portion 244 calculates equation (18) described above, thus obtaining the mis-registration amounts $\Delta a_0$ of images. The calculation control portion 244 controls the horizontal direction drive systems $243_R$ and $243_L$ to move the right and left side image sensors $12_R$ and $12_L$ in the horizontal direction according to the calculated mis-registration amounts $\Delta a_0$ of the images, thereby correcting the mis-registration amounts Δa of the images to be equal to or smaller than the allowable value $\Delta a_0$.

As each of the zoom encoders $41_R$ and $41_L$ and the focus encoders $42_R$ and $42_L$, for example, an externally attached member such as a potentiometer may be used, or a means such as a pulse motor for detecting the rotational angle by the driving system itself according to a driving method may be used. Also, each of the horizontal direction drive systems $243_R$ and $243_L$ may comprise, e.g., a piezo element or piezoelectric bimorph.

When a swing motion in the vertical direction occurs due to insufficient precision of a mechanism system (not shown) for driving the convergence angle motor, encoders for respectively detecting inclination angles (elevation angles) $\Delta\phi_1$, in the vertical direction, of the right and left side imaging systems $10_R$ and $10_L$, and vertical direction drive systems for respectively moving the right and left side image sensors $12_R$ and $12_L$ in the vertical direction may be separately arranged. Thus, when the right and left side image sensors $12_R$ and $12_L$ are moved in the vertical direction according to the detected inclination angles $\Delta\phi_1$ in the vertical direction, mis-registration amounts Δb, in the vertical direction, of images obtained by the right and left imaging systems $10_R$ and $10_L$ can be similarly corrected to be equal to or smaller than an allowable value $\Delta b_0$. At this time, the mis-registration amount Δb, in the vertical direction, of each image can be calculated by the following equation like in equation (18):

$$\Delta b = f \times (\beta - 1) \times \tan(\Delta\phi_1) \quad (19)$$

For the following reasons, the mis-registration amounts Δb, in the vertical direction, of images may be corrected upon combination of coarse adjustment attained by the convergence angle motors $27_R$ and $27_L$ in the multi-lens imaging apparatus of the embodiment shown in FIGS. 21A to 21C, and fine adjustment attained by the horizontal direction drive systems $243_R$ and $243_L$ in the multi-lens imaging apparatus of this embodiment:

(1) to prevent regions to be subjected to aberration correction of the right and left side imaging optical systems $11_R$ and $11_L$ from being increased very much; and (2) to prevent the loads on the horizontal direction drive systems $243_R$ and $243_L$ from being increased.

Figure 25B:
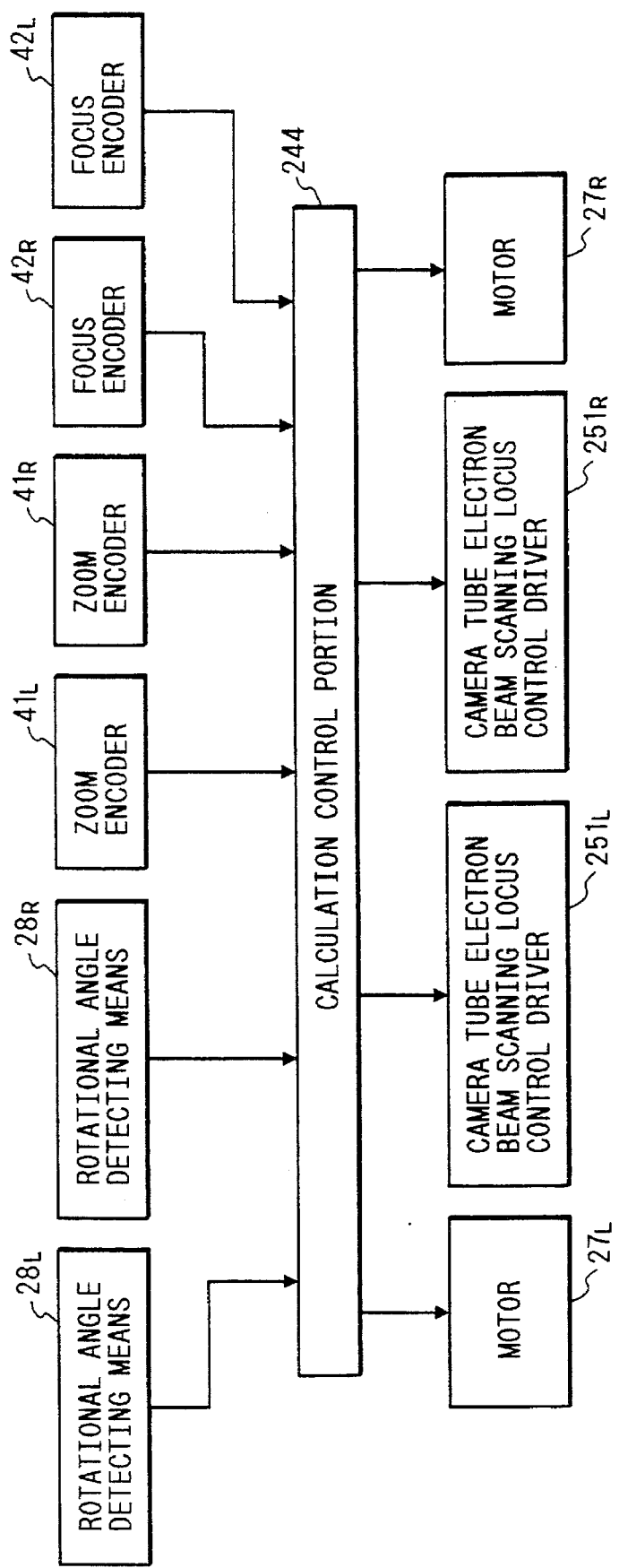

FIGS. 25A and 25B show a multi-lens imaging apparatus according to still another embodiment of the present invention.

In the multi-lens imaging apparatus of this embodiment, the right and left side image sensors $12_R$ and $12_L$ respectively comprise camera tubes, and the arrangement of the apparatus of this embodiment is substantially the same as that of the multi-lens imaging apparatus of the embodiment shown in FIGS. 24A and 24B, except that camera tube electron beam scanning locus control drivers $251_R$ and $251_L$ are used in place of the horizontal direction drive systems $243_R$ and $243_L$.

More specifically, in the multi-lens imaging apparatus of this embodiment, since the camera tubes read video signals by scanning electron beams, the scanning loci of the electron beams by the camera tubes are controlled by the camera tube electron beam scanning locus control drivers $251_R$ and $251_L$ in accordance with the mis-registration amounts Δa obtained by equation (18) above, thereby registering the images expressed by the video signals output from the right and left side image sensors $12_R$ and $12_L$.

Figure 26B:
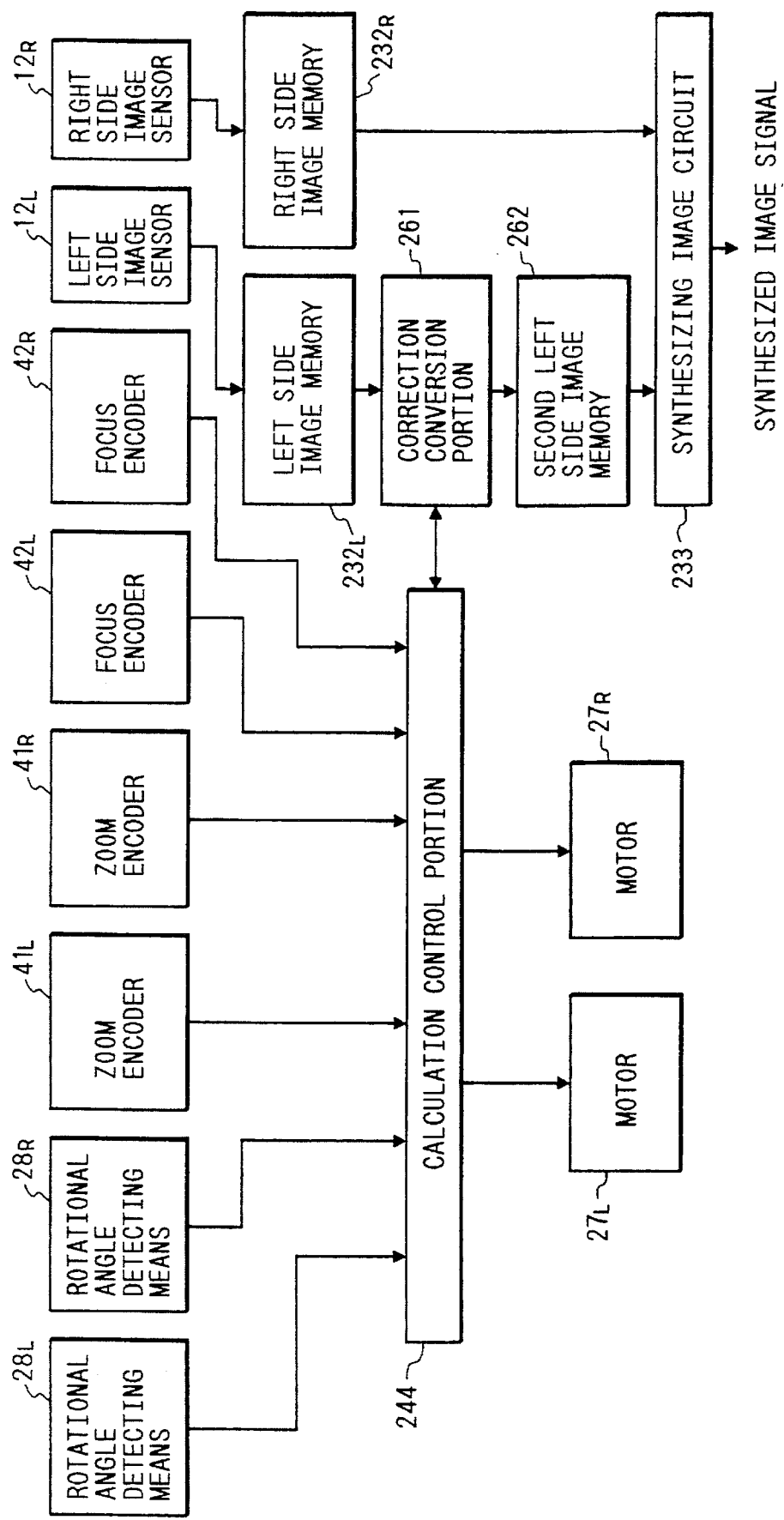

FIGS. 26A and 26B show a multi-lens imaging apparatus according to still another embodiment of the present invention.

In the multi-lens imaging apparatus of this embodiment, the right and left side image sensors $12_R$ and $12_L$ respectively comprise solid-state imaging device, and the mis-registration amounts Δa of images obtained by the right and left imaging systems $10_R$ and $10_L$ are corrected to be equal to or smaller than the allowable value $\Delta a_0$ without using the horizontal direction drive systems $243_R$ and $243_L$ shown in FIG. 24B. The apparatus of this embodiment has the following differences from the multi-lens imaging apparatus of the embodiment shown in FIGS. 24A and 24B.

(1) The apparatus of this embodiment does not include the horizontal direction drive systems $243_R$ and $243_L$.

(2) The apparatus of this embodiment includes a correction conversion portion 261 and a second left side image memory 262 between the left side image memory $232_L$, and the synthesizing process circuit 233 (see FIG. 26B).

The operation of the multi-lens imaging apparatus of this embodiment will be described below.

The calculation control portion 244 receives the output signals from the rotational angle detecting means $28_R$ and $28_L$, the zoom encoders $41_R$ and $41_L$, and the focus encoders $42_R$ and $42_L$, and calculates the mis-registration amounts Δa and Δb of images using equations (18) and (19). The correction conversion portion 261 converts the coordinates of image data output from the left side image memory $232_L$ in accordance with the mis-registration amount Δa calculated by the calculation control portion 244, and writes the converted image data in the second left side image memory 262. As a result, when the synthesizing process circuit 233 synthesizes the image data respectively output from the second left side image memory 262 and the right side image memory $232_R$, a high-fine synthesized image signal can be obtained.

Note that the correction conversion portion 261 and a second left side image memory may be arranged between the right side image memory 232R and the synthesizing process circuit 233 in place of the correction conversion portion 261 and the second left side image memory 262. The left side image memory $232_L$ and the second left side image memory 262 may be replaced with a common one. Furthermore, when the coordinates of image data output from the left side image memory $232_L$ are converted, an interpolation calculation process of image data may be performed as needed.

In each of the multi-lens imaging apparatus of the embodiments shown in FIGS. 21A to 26B according to the present invention, the mis-registration amounts Δa of images are calculated based on the output signals from the rotational angle detecting means $28_R$ and $28_L$, the zoom encoders $41_R$ and $41_L$, and the focus encoders $42_R$ and $42_L$. Alternatively, the mis-registration amounts Δa of images may be calculated from image signals output from the right and left imaging systems $10_R$ and $10_L$. Such embodiments of multi-lens imaging apparatuses of the present invention will be described hereinafter.

Figure 27:
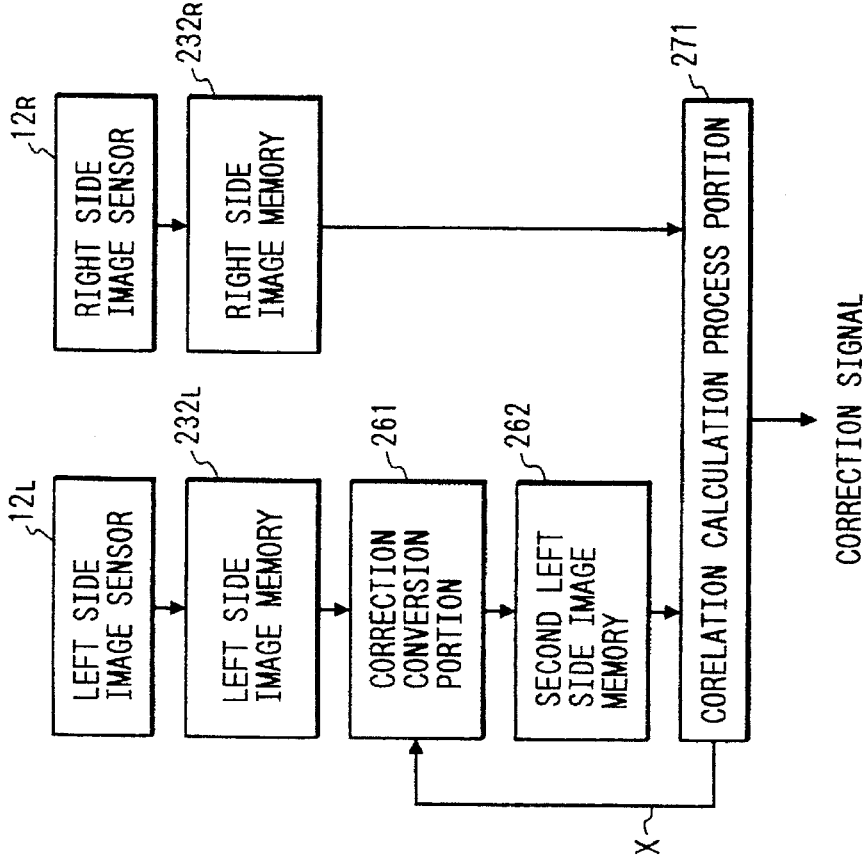
FIG. 27 is a block diagram for explaining an operation of a correlation calculation process portion in a multi-lens imaging apparatus according to still another embodiment of the present invention.

FIG. 27 is a block diagram for explaining an operation of a correlation calculation process portion in a multi-lens imaging apparatus according to still another embodiment of the present invention.

The multi-lens imaging apparatus of this embodiment has the following differences from the multi-lens imaging apparatus of the embodiment shown in FIGS. 26A and 26B.

(1) The apparatus of this embodiment includes a correlation calculation process portion 271 for performing a correlation calculation between image data output from the second left side image memory 262 and image data output from the right side image memory $232_R$ to obtain a correlation value $\delta_S$. When the correlation value $\delta_S$ is equal to or larger than a predetermined value, the portion 271 calculates a new shift amount X so that the correlation value $\delta_S$ becomes equal to or smaller than the predetermined value, and outputs the calculated shift amount X to the correction conversion portion 261.

(2) When the correction conversion portion 261 writes image data output from the left side image memory $232_L$ in the second left side image memory 262, it shifts the coordinates of the image data in the horizontal and vertical directions by the shift amount X sent from the correlation calculation process portion 271.

The operation of the multi-lens imaging apparatus of this embodiment will be described below.

The correction conversion portion 261 shifts the coordinates of image data output from the left side image memory $232_L$ in the horizontal and vertical directions by a predetermined shift amount X (e.g., by one pixel each in the horizontal and vertical directions), and writes the coordinate-shifted image data in the second left side image memory 262. The correlation calculation process portion 271 performs a correlation calculation between image data output from the second left side image memory 262 and image data output from the right side image memory $232_R$ to obtain a correlation value $\delta_S$. When the correlation value $\delta_S$ is equal to or larger than a predetermined value, the portion 271 calculates a new shift amount X so that the correlation value $\delta_S$ becomes equal to or smaller than the predetermined value, and outputs the calculated shift amount X to the correction conversion portion 261. The correction conversion portion 261 shifts the coordinates of image data output from the left side image memory $232_L$ in the horizontal and vertical directions by the new shift amount X, and writes the coordinate-shifted image data in the second left side image memory 262. Thereafter, the above-mentioned operations are repeated until the correlation value $\delta_S$ becomes equal to or smaller than the predetermined value. After the correlation value $\delta_S$ becomes equal to or smaller than the predetermined value, a synthesizing process circuit (not shown) synthesizes image data respectively output from the second left side image memory 262 and the right side image memory $232_R$, thus obtaining a high-fine synthesized image signal.

In order to shorten the correlation calculation time in the correlation calculation process portion 271, for example, the correlation calculation may be performed using only image data at the central portion of a frame. As a correlation calculation method, a known matching method, gradient method, or the like may be used.

Since a finally obtained shift amount $X_0$ indicates the mis-registration amount Δa of a image, the correlation calculation process portion 271 may calculate a correction signal corresponding to the finally obtained shift amount $X_0$, and the correction control methods described in the embodiments shown in FIGS. 21A to 25B, i.e., the following control methods may be executed:

(1) convergence angle control
(2) correction drive control using drive systems capable of shifting the image sensors in the horizontal and vertical directions
(3) correction control for changing the electron beam scanning loci The above-mentioned multi-lens imaging apparatus of the embodiment shown in FIG. 27 executes correction control of the mis-registration amounts Δa of images caused by convergence angle errors using the image signals output from the right and left side imaging systems $10_R$ and $10_L$. However, the correction control of the mis-registration amounts Δa of images caused by a difference between the image formation magnifications of the right and left imaging optical systems $10_R$ and $10_L$ may be executed using the image signals output from the right and left imaging systems $10_R$ and $10_L$. A multi-lens imaging apparatus according to such an embodiment of the present invention will be described below.

Figure 28:
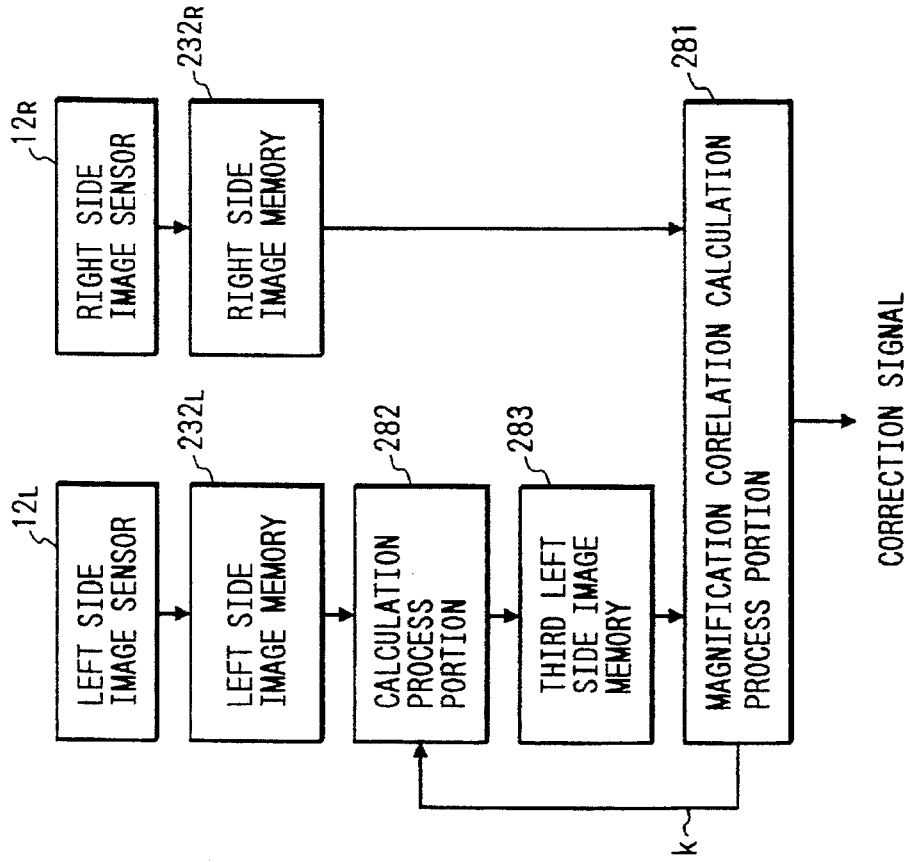
FIG. 28 is a block diagram for explaining an operation of a magnification correlation calculation process portion in a multi-lens imaging apparatus according to still another embodiment of the present invention.

FIG. 28 is a block diagram for explaining an operation of a magnification correlation calculation process portion in a multi-lens imaging apparatus according to still another embodiment of the present invention.

The multi-lens imaging apparatus of this embodiment has substantially the same arrangement as that of the multi-lens imaging apparatus of the embodiment shown in FIG. 27, except that the apparatus of this embodiment includes a magnification correlation calculation process portion 281, a calculation process portion 282, and a third left side image memory 283.

The operation of multi-lens imaging apparatus of this embodiment will be described below.

Assume that the central positions of images obtained by the right and left side imaging systems $10_R$ and $10_L$ are registered with each other like in the multi-lens imaging apparatus of the embodiment shown in FIG. 27.

The calculation process portion 282 converts the coordinates of image data output from the left side image memory $232_L$ by multiplying the coordinates with a constant k proportional to the distance from the center of the frame, and writes the coordinate-converted image data in the third left side image memory 283. The magnification correlation calculation process portion 281 executes a correlation calculation between image data output from the third left side image memory 283 and image data output from the right side image memory $232_R$ to obtain a correlation value $\delta_S$. When the correlation value $\delta_S$ is equal to or larger than a predetermined value, the portion 281 calculates a new constant k, so that the correlation value $\delta_S$ becomes equal to or smaller than the predetermined value, and outputs the constant to the calculation process portion 282. The calculation process portion 282 converts the coordinates of image data output from the left side image memory $232_L$ by multiplying the coordinates with the new constant k, and writes the coordinate-converted image data in the third left side image memory 283. Thereafter, the above-mentioned operations are repeated until the correlation value $\delta_S$ becomes equal to or smaller than the predetermined value. After the correlation value $\delta_S$ becomes equal to or smaller than the predetermined value, a synthesizing process circuit (not shown) synthesizes image data respectively output from the second left side image memory 262 and the right side image memory $232_R$, thus obtaining a high-fine synthesized image signal from which the mis-registration amounts of images caused by a difference between the image formation magnifications of the right and left imaging optical systems $11_R$ and $11_L$ are corrected.

Since a finally obtained constant $k_0$ indicates the ratio of image formation magnifications of the right and left imaging optical systems $11_R$ and $11_L$, the magnification correlation calculation process portion 281 may calculate a correction signal according to the finally obtained constant $k_0$, and may execute the correction control methods described in the embodiments shown in FIGS. 21A to 25B.

Figure 29:
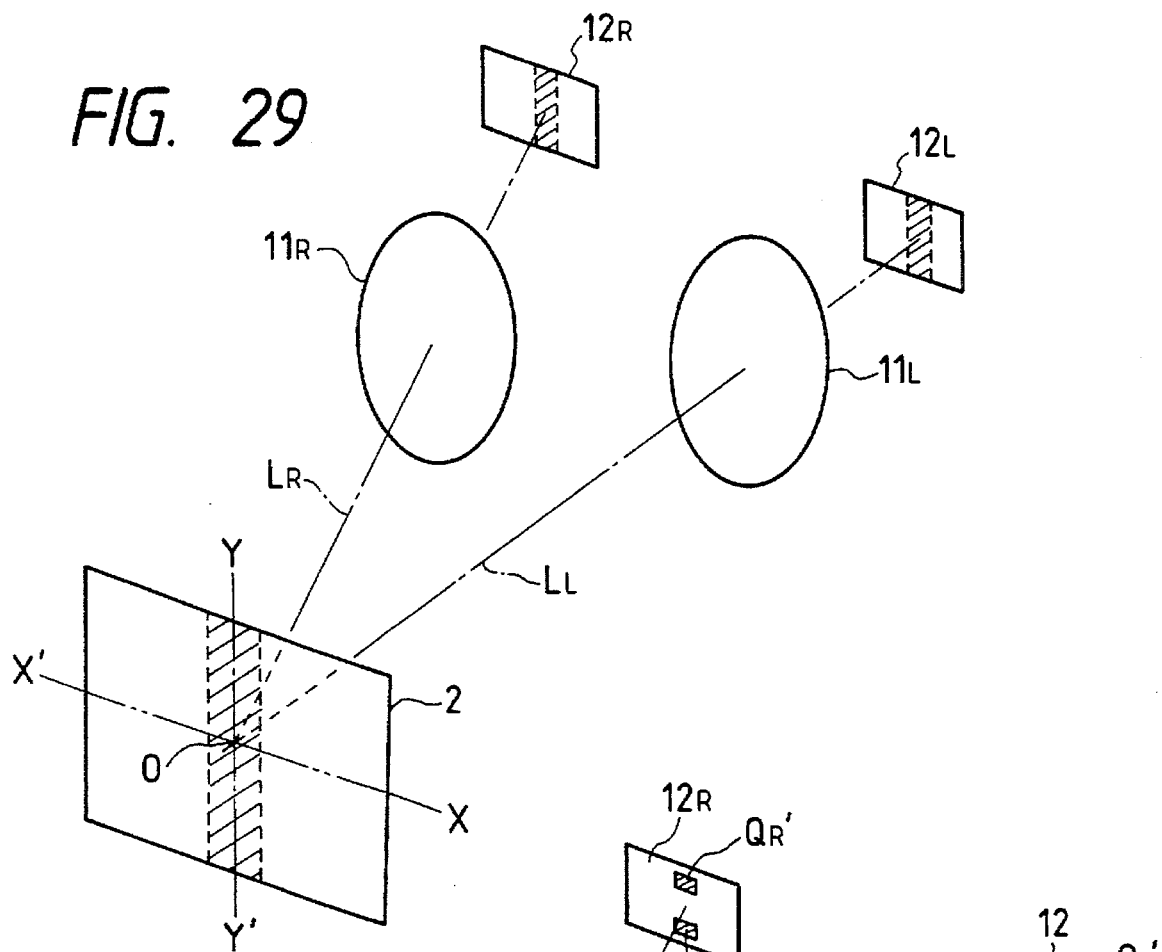
FIG. 29 is an explanatory view for explaining a method of shortening the correlation calculation time in the magnification correlation calculation process portion shown in FIG. 28.

In order to shorten the correlation calculation time of the magnification correlation calculation process portion 281, the correlation calculation may be executed using only image signals in a hatched region (a region obtained by narrowing a horizontal process portion) having as its center a line Y–Y' passing through a point O on the object surface 2 and perpendicular to the plane including two optical axes $L_R$ and $L_L$, as shown in FIG. 29. Since this region has symmetricity from the arrangement conditions of the right and left side imaging optical systems $11_R$ and $11_L$, and suffers from a common image distortion, a difference between the image formation magnifications can be easily calculated.

Figure 30:
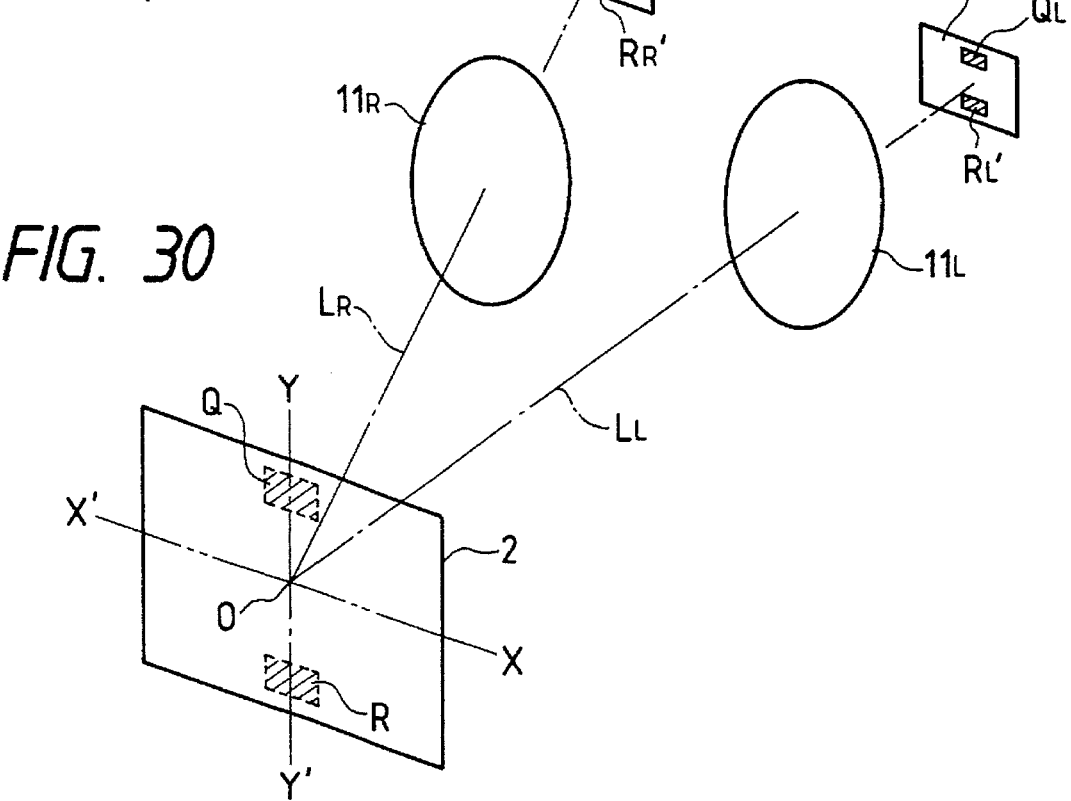
FIG. 30 is an explanatory view for explaining another method of shortening the correlation calculation time in the magnification correlation calculation process portion shown in FIG. 28.

In order to shorten the correlation calculation time of the magnification correlation calculation process portion 281, a positional deviation correlation in the vertical direction may be calculated by the method described in the embodiment shown in FIGS. 26A and 26B using only image signals in two upper and lower hatched regions which have as their center a line Y–Y' passing through the point O on the object surface 2 and perpendicular to the plane including two optical axes $L_R$ and $L_L$, and which are separated from the point O, as shown in FIG. 30. When representative points of these regions are represented by Q and R, and when images of these representative points Q and R on the left side image sensor $12_L$ are represented by $Q_L'$ and $R_L'$ and images of these representative points Q and R on the right side image sensor $12_R$ are represented by $Q_R'$ and $R_R'$, a ratio of a line $Q_L'$–$R_L'$ to a line $Q_R'$ and $R_R'$ is calculated to obtain the final constant $k_0$. This technique utilizes the fact that the detection sensitivity of the difference between the image formation magnifications can be improved toward the periphery of the frame, and the fact that the difference between the image formation magnifications can be regarded as a positional deviation in a small region.

The final constant $k_0$ is obtained as described above, and the following correction control can be made on the basis of this constant $k_0$.

(1) When the zoom motors $25_R$ and $25_L$ have response characteristics necessary for correcting the mis-registration amounts of images caused by the difference between the image formation magnifications to be equal to or smaller than a predetermined value (allowable value), servo control is executed by supplying a correction signal to one or both of the zoom motors $25_R$ and $25_L$.

(2) When it is difficult for the zoom motors $25_R$ and $25_L$ to obtain response characteristics necessary for correcting the mis-registration amounts due to the influence of the non-sensitive bands or the like, correction control by changing the scanning loci of the electron beams or correction control by converting the coordinates of the image memory is suitably executed. In this case, an interpolation calculation process of image data may be performed as needed.

Each of the multi-lens imaging apparatuses according to the above-mentioned embodiments of the present invention comprises two imaging systems. However, the present invention can also be applied to an apparatus using three or more imaging systems.

An embodiment of an apparatus for displaying images while partially overlapping image fields using a plurality of imaging systems, e.g., for obtaining a panoramic image or a 3D–2D mixed image is disclosed.

Figure 31:
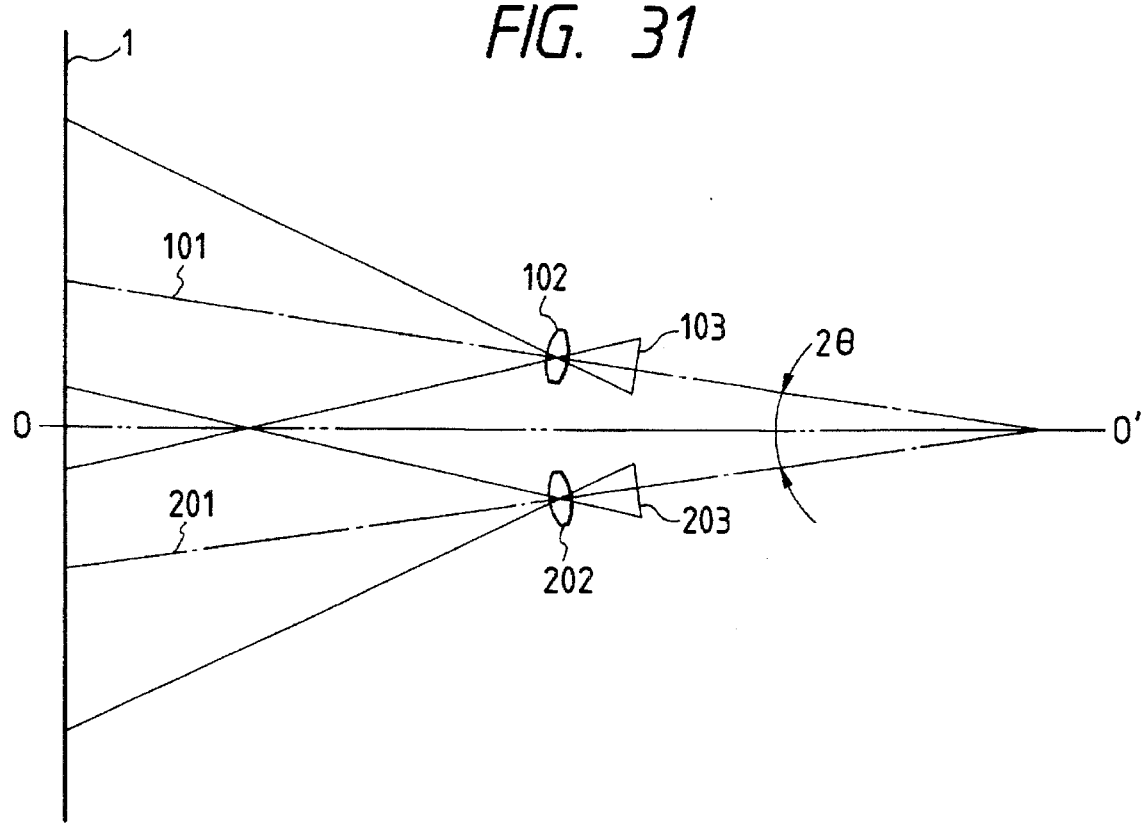
FIG. 31 is a view showing a basic arrangement according to still another embodiment of the present invention.

FIG. 31 shows the basic arrangement of a panoramic multi-lens imaging system according to the present invention. The system includes a common object surface 1, and first and second imaging optical systems 102 and 202 having equivalent specifications, and normally comprising zoom lenses. The system also includes image sensors 103 and 203 similarly having equivalent specifications. Each of the image sensors 103 and 203 comprises a camera tube such as a saticon or a solid state imaging element such as a CCD. (Although FIG. 31 illustrates a single-sensor type (or single-tube type) image sensor for the sake of simplicity, versatility will not be disturbed even when a two-sensor type (two-tube type) image sensor or three-sensor type (three-tube type) image sensor via a color separation system is used.) Optical axes 101 and 201 of these image sensors are arranged to be inclined through about θ symmetrically about a normal O–O' to the object surface 1 so as to satisfy a condition that image fields to be picked up by these sensors overlap each other by a predetermined amount. Note that 2θ will be referred to as the convergence angle, and is changed according to the image formation magnifications of the imaging optical systems (the object distances and the focal lengths of photographing lenses).

Figure 32:
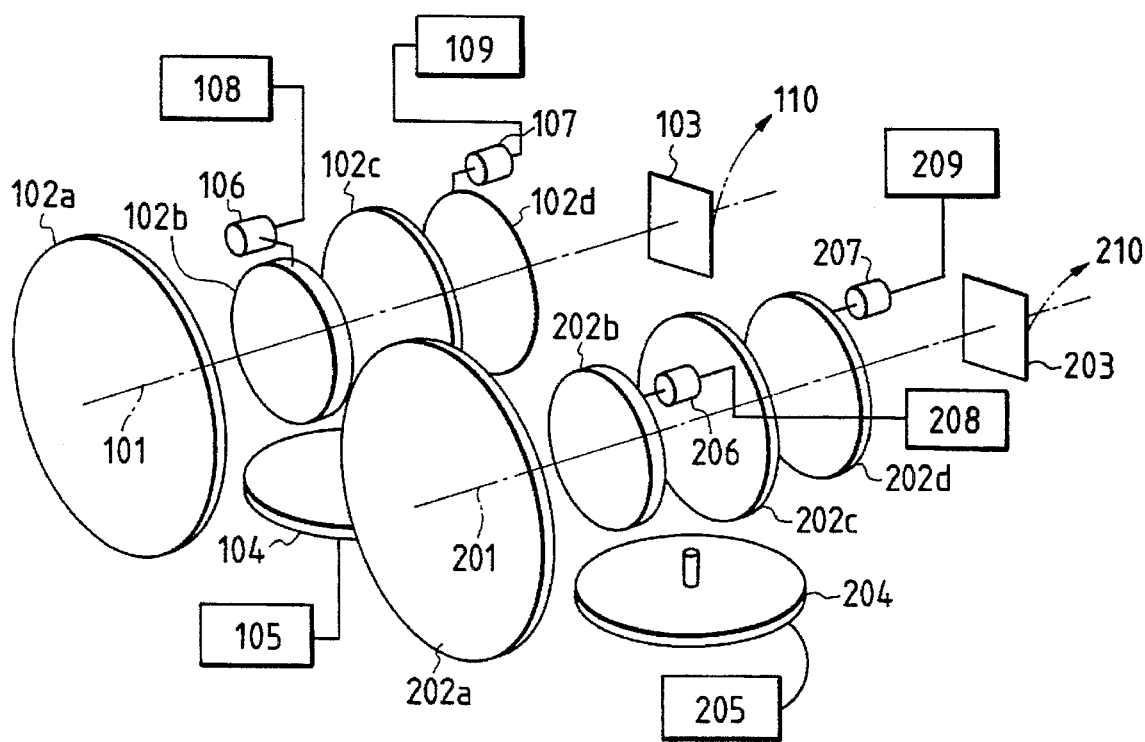
FIG. 32 is a perspective view of optical systems of the embodiment shown in FIG. 31.

FIG. 32 shows the detailed arrangement of the imaging optical systems and the image sensors. In FIG. 32, a support structure such as a lens barrel is not shown.

The first and second imaging optical systems 102 and 202 are respectively constituted by lens groups 102a, 102b, 102c, and 102d, and lens groups 202a, 202b, 202c, and 202d. In particular, the lens groups 102b and 202b are zoom lens groups, and the lens groups 102d and 202d are focus lens groups. The zoom lens groups 102b and 202b are respectively driven by drive systems (zoom motors) 106 and 206, and similarly, the focus lens groups 102d and 202d are respectively driven by drive systems (focus motors) 107 and 207. Encoders (zoom encoders) 108 and 208 are provided to the zoom lens groups 102b and 202b of the imaging optical systems so as to obtain position information, in the optical axis direction, of the corresponding lens groups. Focal lengths f of the imaging optical systems 102 and 202 can be obtained based on signals output from the encoders 108 and 208. Note that the lens groups 102d and 202d also have a function of compensating for image surface movement upon movement of the zoom lens groups in addition to the focus function. Since the arrangement of the zoom lens is well known, a detailed description thereof will be omitted.

Encoders (focus encoders) 109 and 209 are provided to the focus lens groups 102d and 202d of the imaging optical systems so as to obtain position information, in the optical axis direction, of the corresponding lens groups. These encoders may comprise, e.g., externally attached members such as potentiometers, or may comprise systems such as pulse motors for detecting the position information, in the optical axis direction, of the lens by the drive systems themselves according to their drive method. The system of this embodiment further includes mechanism systems (not shown) for integrally rotating the optical system 102 and the image sensor 103, and the optical system 202 and the image sensor 203 in opposite directions by the same amount in planes respectively including optical axes 101 and 201, and drive systems (convergence angle motors) 104 and 204 for attaining such rotations. The system also includes rotational angle information detecting means 105 and 205. These means may comprise, e.g., externally attached members such as rotary encoders, or may comprise systems such as pulse motors for detecting the position information, in the optical axis direction, of angle information by the drive systems themselves according to their drive method.

Figure 33:
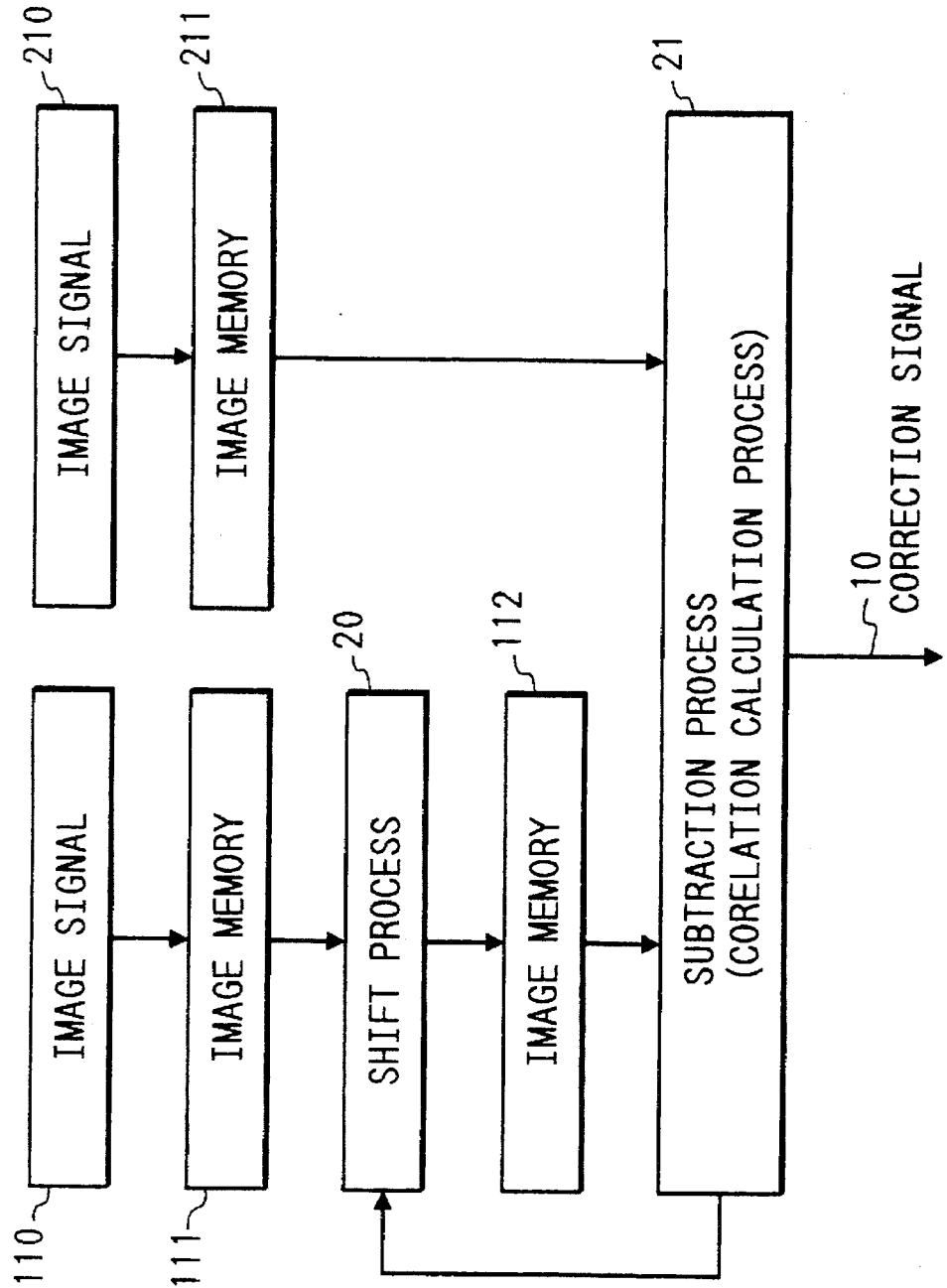
FIG. 33 is a diagram showing the flow of a signal process for calculating a mis-registration amount.
Figure 34:
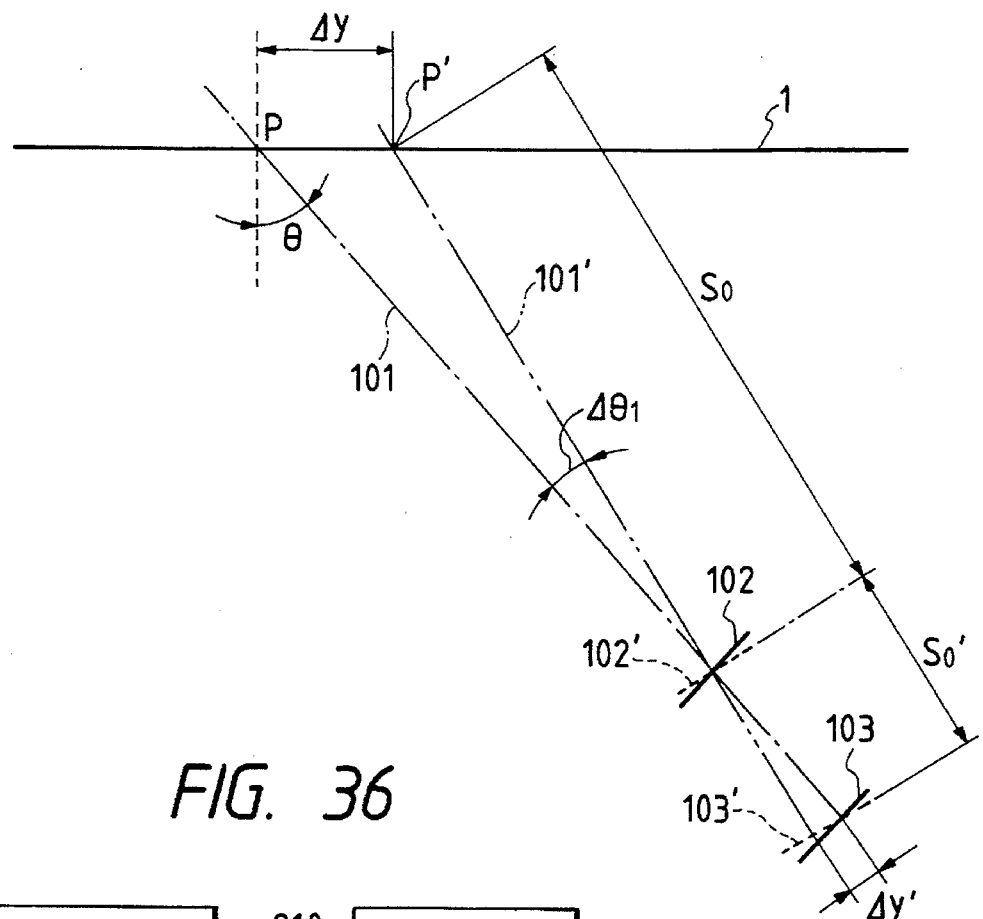
FIG. 34 is a view for explaining a problem.

A method of obtaining mis-registration amounts on the basis of image signals will be described below with reference to FIGS. 33 and 34. Image memories 111 and 211 temporarily store signals of the overlapping portion of image signals 110 and 210. Assume that image data are mis-registered due to a deviation in convergence angle. A horizontal image shift process portion 20 shifts the coordinates of image data in the image memory 111 in the horizontal direction by a predetermined amount X (e.g., one pixel), and writes the shifted image data in a image memory 112. Furthermore, control for calculating a difference $\delta_S$ between the contents of the image memories 112 and 211 is performed using a correlation calculation process portion 21 including a subtraction calculation process circuit and the like while sequentially changing the shift amount X so as to obtain a shift amount $X_0$ for minimizing the difference $\delta_S$. At this time, the shift amount $X_0$ is normally obtained by an interpolation calculation process by, e.g., approximating the relationship between the difference $\delta_S$ and the shift amount X by, e.g., a function.

In order to shorten the correlation calculation time, a method using only image data at the central portion of the frame of the overlapping portion, i.e., a region which includes a point O on the object surface 1 and whose vertical and horizontal widths are shortened is effective. Alternatively, coarse adjustment may be attained by commonly using the encoders 105 and 205 for outputting convergence angle information, and fine adjustment may be attained by the above-mentioned detection using the image signals, so as to further reduce the area of a region to be subjected to a correlation calculation. The correlation calculation method described here is normally called a matching method. However, the present invention is not particularly limited to this method, and other methods such as a gradient method may be used.

The shift amount $X_0$ corresponding to the minimum value indicates a relative mis-registration amount $\Delta y'$ itself of a image output from each imaging system, which mis-registration occurs due to a deviation of the optical axis 101 or 201 (FIG. 31) from an ideal optical axis. Therefore, convergence angle correction control is performed using a correction signal 10 for canceling the mis-registration amount $\Delta y'$ of the image. The method of obtaining the mis-registration amount will be described below.

Assume that an imaging operation is performed while the convergence angle has a deviation from a predetermined value, i.e., the optical axis 101 or 201 has an angular deviation $\Delta\theta 1$ or $\Delta\theta 2$ with respect to an axis having a predetermined angle $\theta$. Under this assumption, the relationship between the angular deviation $\Delta\theta 1$ or $\Delta\theta 2$ and the mis-registration amount $\Delta y'$ of a image will be described below. For the sake of simplicity, a mis-registration amount $\Delta y'$ of a image output from each imaging system, which amount is generated since the optical axis 101 is deviated to an axis 101', as shown in FIG. 34, will be described below. The mis-registration amount with respect to the optical axis 201 can be obtained by the same equations, as is obvious to those who are skilled in the art from the arrangement of the optical systems, and even when both the optical axes 101 and 201 have deviations, the mis-registration amount can be obtained as a sum of the two deviations. Therefore, a method of obtaining the mis-registration amount with respect to one optical axis will be described below, and a description of the method for the other axis will be omitted. Note that reference symbols shown in FIG. 34 are used. Furthermore, under an assumption that $\Delta\theta 1$ is very small, geometrically, we have:

$$S_0 \tan \Delta\theta 1 = \Delta y \cdot \cos \theta \quad (1)$$

where $\Delta y$ is the deviation (PP' in FIG. 34), generated in the object surface, of an intersection P of the optical axis 101 and the object surface 1 from a predetermined value, and $S_0$ is the distance from the front-side principal point of the imaging optical system (lens) 102 to an object (similarly, $S_0'$ is the distance from the rear-side principal point to the image surface). If the image formation magnification of the imaging optical system 102 is represented by $\beta$, the magnification $\beta$ can be expressed from its definition by:

$$\beta = \Delta y'/\Delta y \quad (2)$$

If the focal length of the imaging system (lens) is represented by f, we have:

$$S_0 = f(\beta - 1)/\beta \quad (3)$$

From equations (1), (2), and (3), the mis-registration amount $\Delta y'$ is given by:

$$\Delta y' = \tan \Delta\theta 1 \cdot f(\beta - 1)/\cos \theta \quad (4)$$

The zoom lens group 102b of the imaging optical system shown in FIG. 32 is provided with the encoder (zoom encoder) 108 for obtaining position information, in the optical axis direction, of the lens group, and the focal length f of the imaging optical system 102 can be obtained based on a signal output from the encoder 108. Similarly, the focus lens group 102d of the imaging optical system is provided with the encoder (focus encoder) 109 for obtaining position information, in the optical axis direction, of the lens group, and the image formation magnification $\beta$ of the imaging optical system 102 can be obtained based on both the signals from the zoom encoder 108 and the focus encoder 109. Assume that the focal lengths f and the image formation magnifications $\beta$ of the two imaging optical systems 102 and 202 are caused to always coincide with each other by separately controlling the drive systems 105, 107, 206, and 207 on the basis of the signals from the encoders 108, 109, 208, and 209. As described above, the mis-registration amount Δy' of a image is obtained by a image signal process system, and the convergence angle 2θ, the focal length f, and the image formation magnification β are obtained by the encoders provided to each mechanism system. Based on these signals, a calculation control portion 22 obtains all the parameters except for Δθ1 in equation (4).

Figure 35:
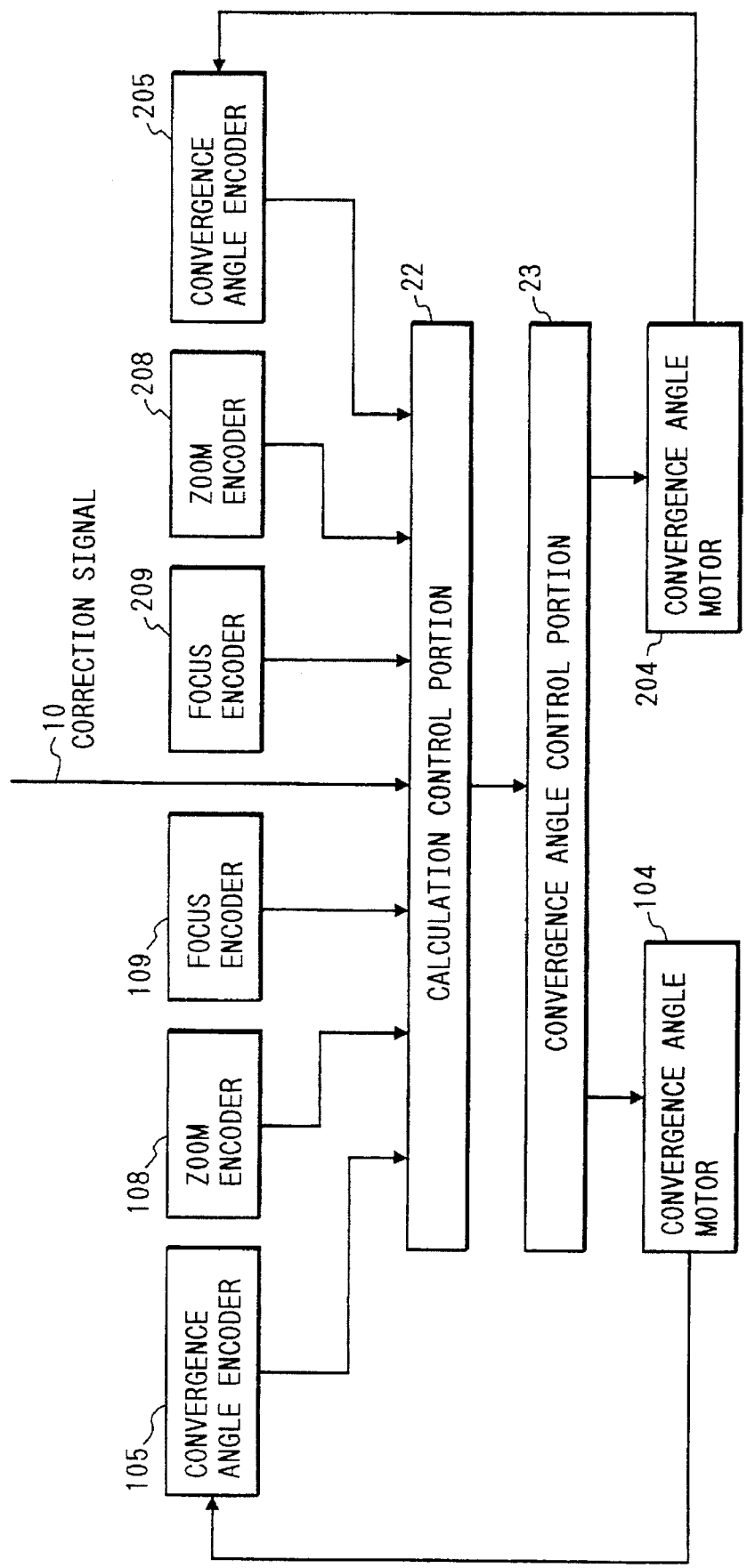
FIG. 35 is a diagram showing the flow of a compensation signal process in the embodiment shown in FIG. 31.

The calculated angular deviations Δθ1 and Δθ2 are supplied to a convergence angle control portion 23. Note that the convergence angle motors 104 and 204 have sufficient response performance for angular precision necessary for correcting Δy' to be equal to or smaller than a predetermined value (allowable value) Δy0'. The control portion 23 supplies Δθ1 to the convergence angle motor 104 as a correction signal, and supplies Δθ2 to the convergence angle motor 204 as a direct control target value. Alternatively, the sum of Δθ1 and Δθ2 may be supplied to one of the convergence angle motors 104 and 204. FIG. 35 shows the flow of these signals.

Figure 36:
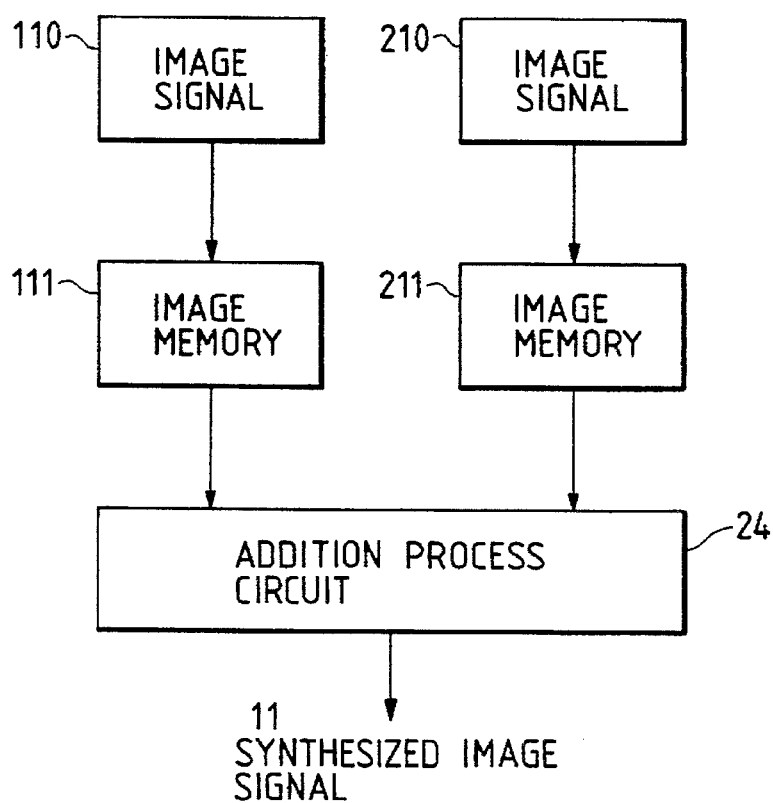
FIG. 36 is a diagram showing the flow of a image signal process in the embodiment shown in FIG. 31.

In this manner, after the mis-registration amounts of the image signals 110 and 210 output from the corresponding imaging systems are mechanically corrected to be equal to or smaller than the predetermined value (allowable value) Δy0', images of the overlapping portion are subjected to a joint process, and thereafter, the image signals 110 can be synthesized to a single image signal 11 using, e.g., the image memories 111 and 211, an addition process circuit 24, and the like. FIG. 36 shows the flow of these signals. When such processes are sequentially performed as needed, a good panoramic image can always be obtained.

Figure 37:
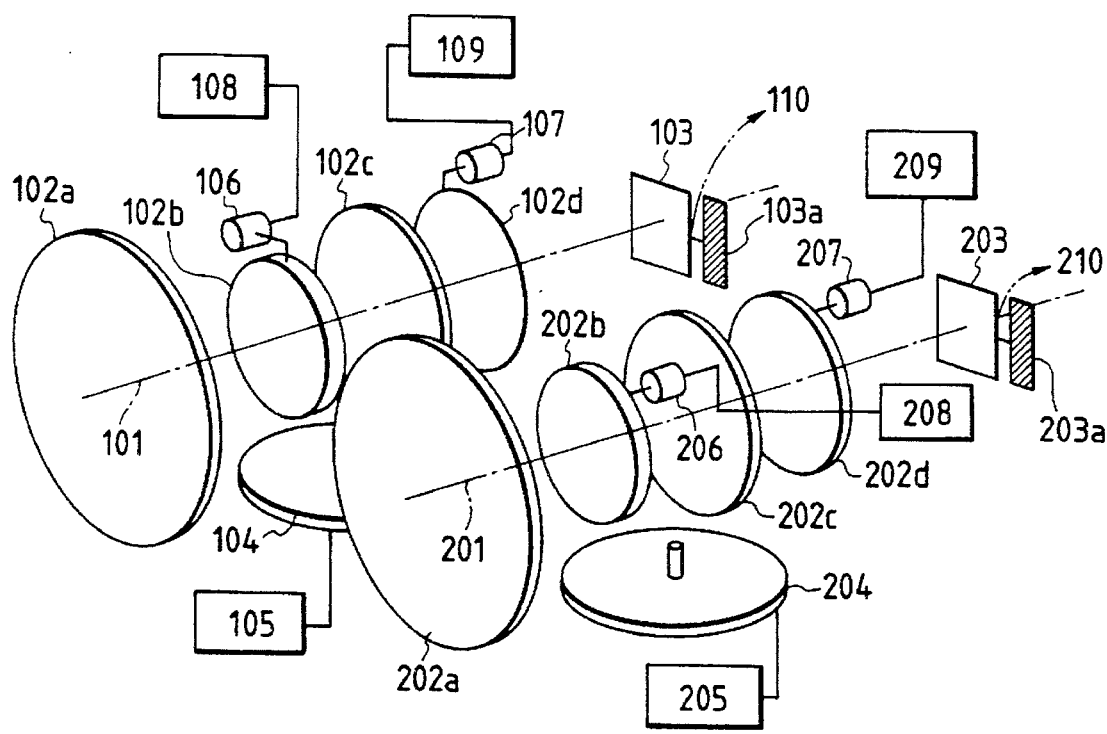
FIG. 37 is a perspective view showing optical systems according to still another embodiment of the present invention.

A panoramic image is generally an image corresponding to a short focal length. However, as can be understood from equation (4), when the focal length f of the imaging optical system is large, or when the allowable value of the mis-registration amount of a image is small, the correction signals Δθ1 and Δθ2 also assume small values (on the order of several seconds), and it is difficult to obtain angular response performance necessary for correcting the mis-registration under the influence of, e.g., non-sensitive bands of the convergence angle motors 104 and 204. In this case, a method of correcting the mis-registration amount of a image output from each imaging system by a means other than the convergence angle motor 104 or 204 is effective. Such an embodiment will be described below. The basic arrangement of the embodiment shown in FIG. 37 is substantially the same as that of the embodiment shown in FIG. 32, except that precision correction means 103a and 203a are added.

The first and second imaging optical systems 102 and 202 are respectively constituted by lens groups 102a, 102b, 102c, and 102d, and lens groups 202a, 202b, 202c, and 202d. In particular, the lens groups 102b and 202b are zoom lens groups, and the lens groups 102d and 202d are focus lens groups. The zoom lens groups 102b and 202b are respectively driven by drive systems (zoom motors) 106 and 206, and similarly, the focus lens groups 102d and 202d are respectively driven by drive systems (focus motors) 107 and 207. Encoders (zoom encoders) 108 and 208 are provided to the zoom lens groups 102b and 202b of the imaging optical systems so as to obtain position information, in the optical axis direction, of the corresponding lens groups. Similarly, encoders (focus encoders) 109 and 209 are provided to the focus lens groups 102d and 202d of the imaging optical systems so as to obtain position information, in the optical axis direction, of the corresponding lens groups. These encoders may comprise, e.g., externally attached members such as potentiometers, or may comprise systems such as pulse motors for detecting the position information, in the optical axis direction, of the lens by the drive systems themselves according to their drive method. The system of this embodiment further includes mechanism systems (not shown) for integrally rotating the optical system 102 and the image sensor 103, and the optical system 202 and the image sensor 203 in opposite directions by the same amount in planes respectively including optical axes 101 and 201, and drive systems (convergence angle motors) 104 and 204 for attaining such rotations. The system also includes rotational angle information detecting means 105 and 205. These means may comprise, e.g., externally attached members such as rotary encoders, or may comprise systems such as pulse motors for detecting the position information, in the optical axis direction, of angle information by the drive systems themselves according to their drive method. However, since the above-mentioned encoders are used for the auxiliary purpose, they are not always necessary in this embodiment.

As has been described above with reference to FIG. 33, image memories 111 and 211 temporarily store signals of the overlapping portion of image signals 110 and 210. A horizontal image shift process portion 20 shifts the coordinates of image data in the image memory 111 in the horizontal direction by a predetermined amount X (e.g., one pixel), and writes the shifted image data in a image memory 112. Furthermore, control for calculating a difference $δ_S$ between the contents of the image memories 112 and 211 is performed using a correlation calculation process portion 21 including a subtraction calculation process circuit and the like while sequentially changing the shift amount X so as to obtain a shift amount $X_0$ for minimizing the difference $δ_S$. At this time, the shift amount $X_0$ may be obtained by an interpolation calculation process by, e.g., approximating the relationship between the difference $δ_S$ and the shift amount X by, e.g., a function. When a swing motion in the vertical direction occurs as well due to insufficient precision of the mechanism system for driving the convergence angle motors, the same process as that for the horizontal direction may be performed for the vertical direction, and a two-dimensional (plane) mis-registration amount can be obtained. Note that a mis-registration amount Δy' (vertical) of a image in the vertical direction is given by:

$$Δy'(vertical)=\tan Δθ1·f(β-1) \qquad (5)$$

In order to shorten the correlation calculation time, a method using only image data at the central portion of the frame of the overlapping portion, i.e., a region which includes a point O on the object surface 1 and whose vertical and horizontal widths are shortened is effective. Alternatively, coarse adjustment may be attained by commonly using the encoders 105 and 205 for outputting convergence angle information, and fine adjustment may be attained by the above-mentioned detection using the image signals, so as to further reduce the area of a region to be subjected to a correlation calculation. The correlation calculation method described here is normally called a matching method. However, the present invention is not particularly limited to this method, and other methods such as a gradient method may be used. The shift amount $X_0$ corresponding to the minimum value indicates a relative mis-registration amount Δy' itself of a image output from each imaging system, which mis-registration occurs due to a deviation of the optical axis 101 or 201.

Figure 38:
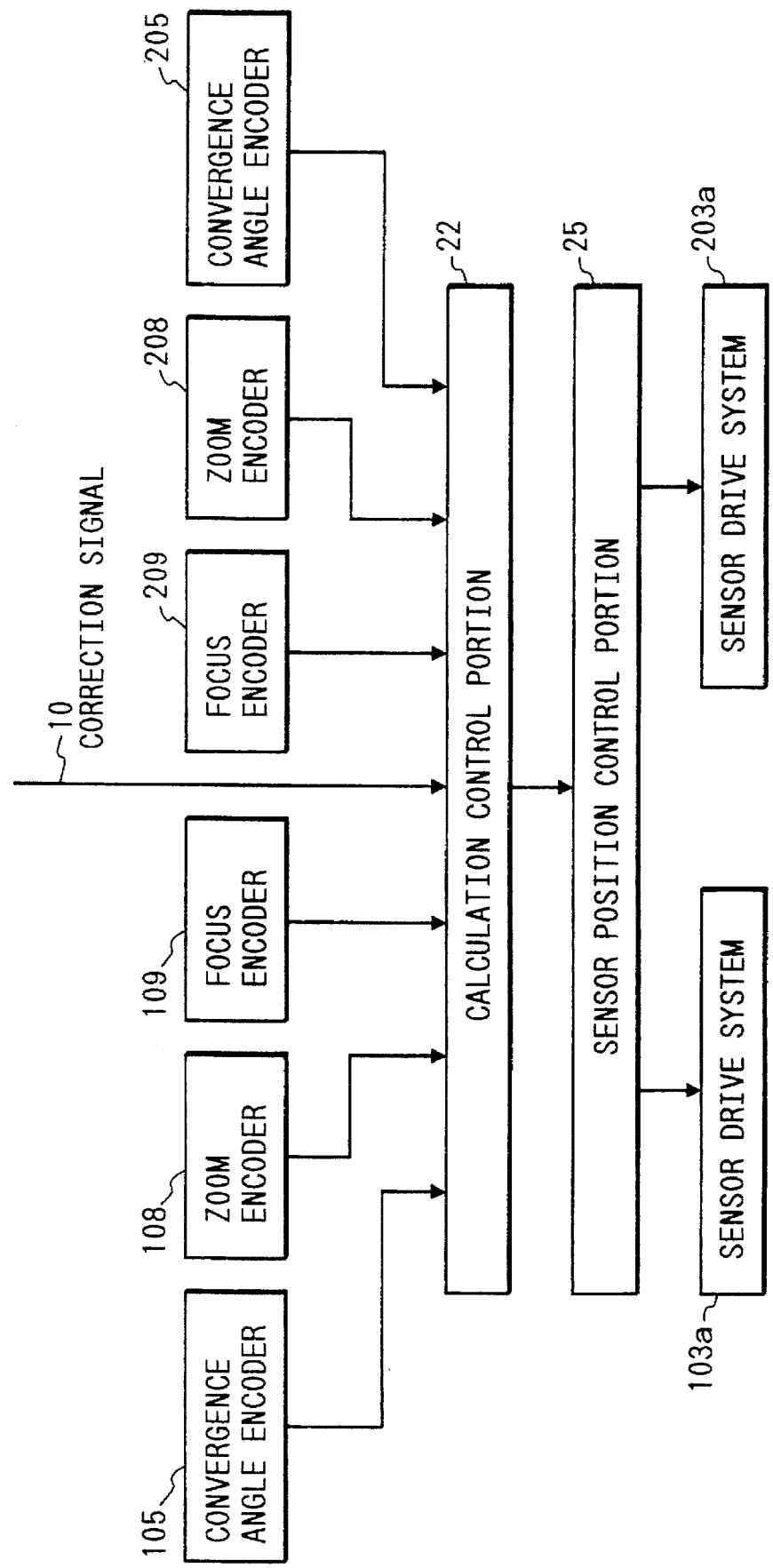
FIG. 38 is a diagram showing the flow of a compensation signal process in the embodiment shown in FIG. 37.

Therefore, in this embodiment, correction control of the positions in a plane of the sensors is performed using a correction signal 10 according to the mis-registration amount Δy' of a image. More specifically, the image sensors 103 and 203 are provided with drive systems 103a and 203a capable of shifting the sensors in the horizontal and vertical directions. Signals calculated by a calculation control portion 22, which received various signals, are received by a sensor position control portion 25, and correction drive control is executed using the drive systems 103a and 203a. Each of the drive systems 103a and 203a comprises, e.g., a piezo element or a piezoelectric bimorph. FIG. 38 shows the flow of these signals.

After the mis-registration amounts of the image signals 110 and 210 output from the imaging systems are corrected to be equal to or smaller than Δy0' as a predetermined allowable value, two images can be synthesized using, e.g., image memories and an addition process circuit like in the above embodiment. Since the flow of signals in this synthesizing process portion is common to that shown in FIG. 36, its illustration will be omitted here.

The movable ranges of the drive systems 103a and 203a may be defined as follows. That is, in order to prevent a region to be subjected to aberration correction of the imaging optical system from being increased very much, and to prevent the load on the specifications of the drive system from being increased, the convergence angle encoders 105 and 205 may also be used, and the correction amount may be classified into coarse and fine levels with reference to a predetermined level, so that coarse adjustment is attained by driving the convergence angle motors 104 and 204, and fine adjustment is attained by driving the drive systems 103a and 203a.

Figure 39:
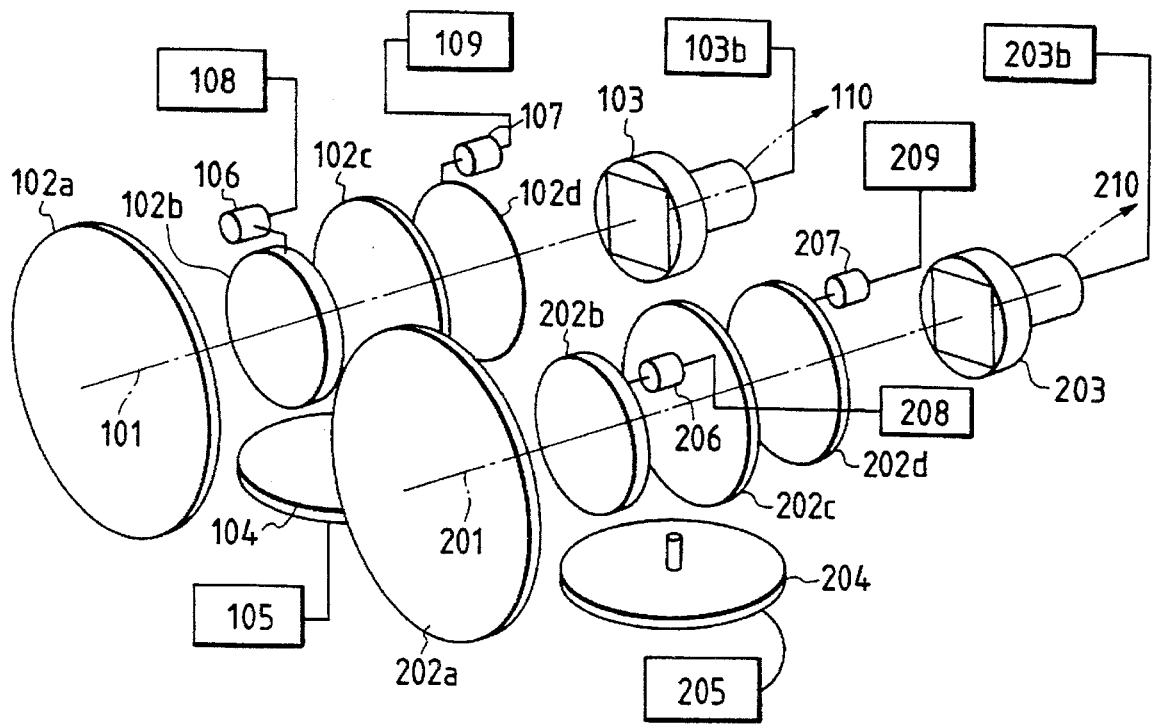
FIG. 39 is a perspective view showing optical systems according to still another embodiment of the present invention.

FIG. 39 shows still another embodiment of the present invention. In this embodiment, the image sensors 103 and 203 described in the embodiment shown in FIG. 37 are specified to camera tubes, and systems for driving the image sensors in the horizontal or vertical direction are not used. The arrangement except for the drive systems 103a and 203a and the method of obtaining the correction signal 10 are common to those in the above embodiment, and a detailed description thereof will be omitted.

In general, the camera tubes read image signals by scanning electron beams. Therefore, camera tube electron beam scanning locus control drivers 103b and 203b for controlling the scanning loci of electron beams upon reading of the image signals are provided. As described above, signals calculated by the calculation control portion 22 which received various signals are received by an electron beam scanning locus control portion 26, and correction control for shifting the scanning loci of electron beams using the drivers 103b and 203b is executed. With this control, images defined by the image signals 110 and 210 output from the image sensors 103 and 203 can be registered. FIG. 40 shows the flow of these signals. Note that the above-mentioned technique for registering images by changing the scanning loci of electron beams is a general technique as DRC (Digital Registration Correction) in, e.g., a three-tube color television system. After the mis-registration amounts of the image signals 110 and 210 output from the imaging systems are corrected to be equal to or smaller than a predetermined value (allowable value) Δy0', two images can be synthesized using, e.g., image memories and an addition process circuit like in the above embodiment (since the flow of signals in this synthesizing process portion is common to that shown in FIG. 36, its illustration will be omitted here).

Figure 41:
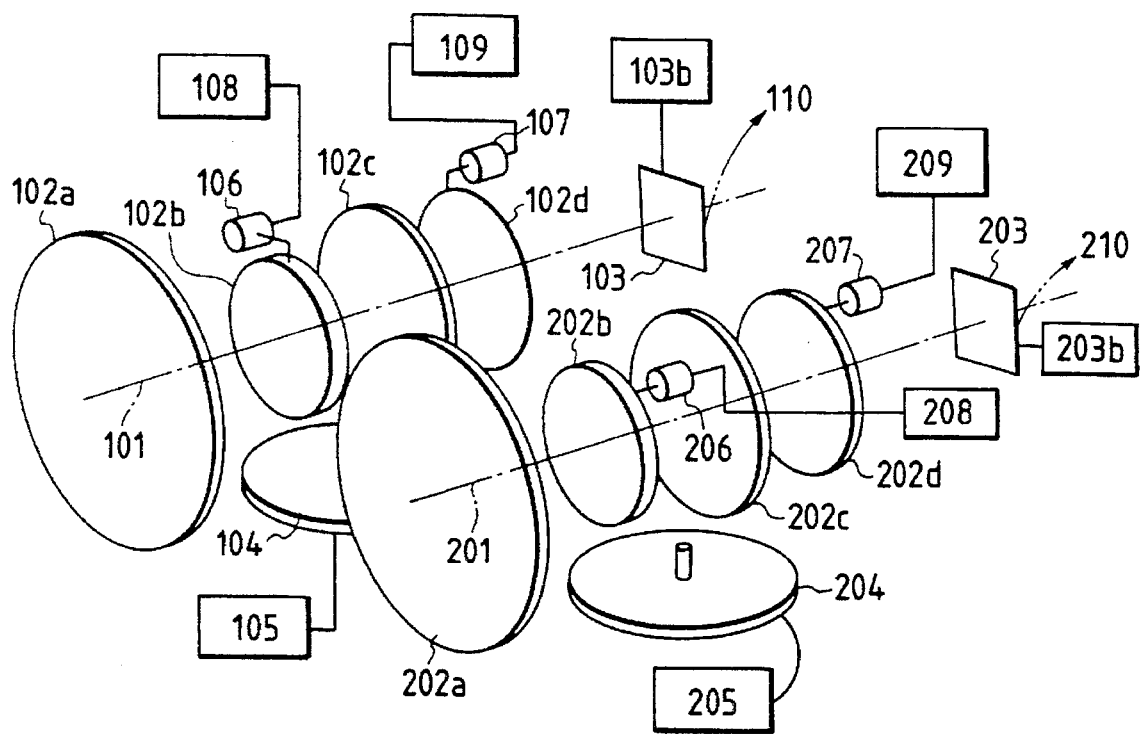
FIG. 41 is a perspective view showing optical systems according to still another embodiment of the present invention.

FIG. 41 shows still another embodiment of the present invention, wherein the image sensors comprise solid-state imaging device in place of the camera tubes, and systems for driving the sensors in the horizontal or vertical direction are not used. More specifically, in this embodiment, the image sensors 103 and 203 described in the embodiment shown in FIG. 39 specifically use solid-state imaging device. Therefore, the basic arrangement and the method of obtaining the correction signal 10 are common to those in the embodiments shown in FIGS. 37 and 39, and a detailed description thereof will be omitted.

Figure 42:
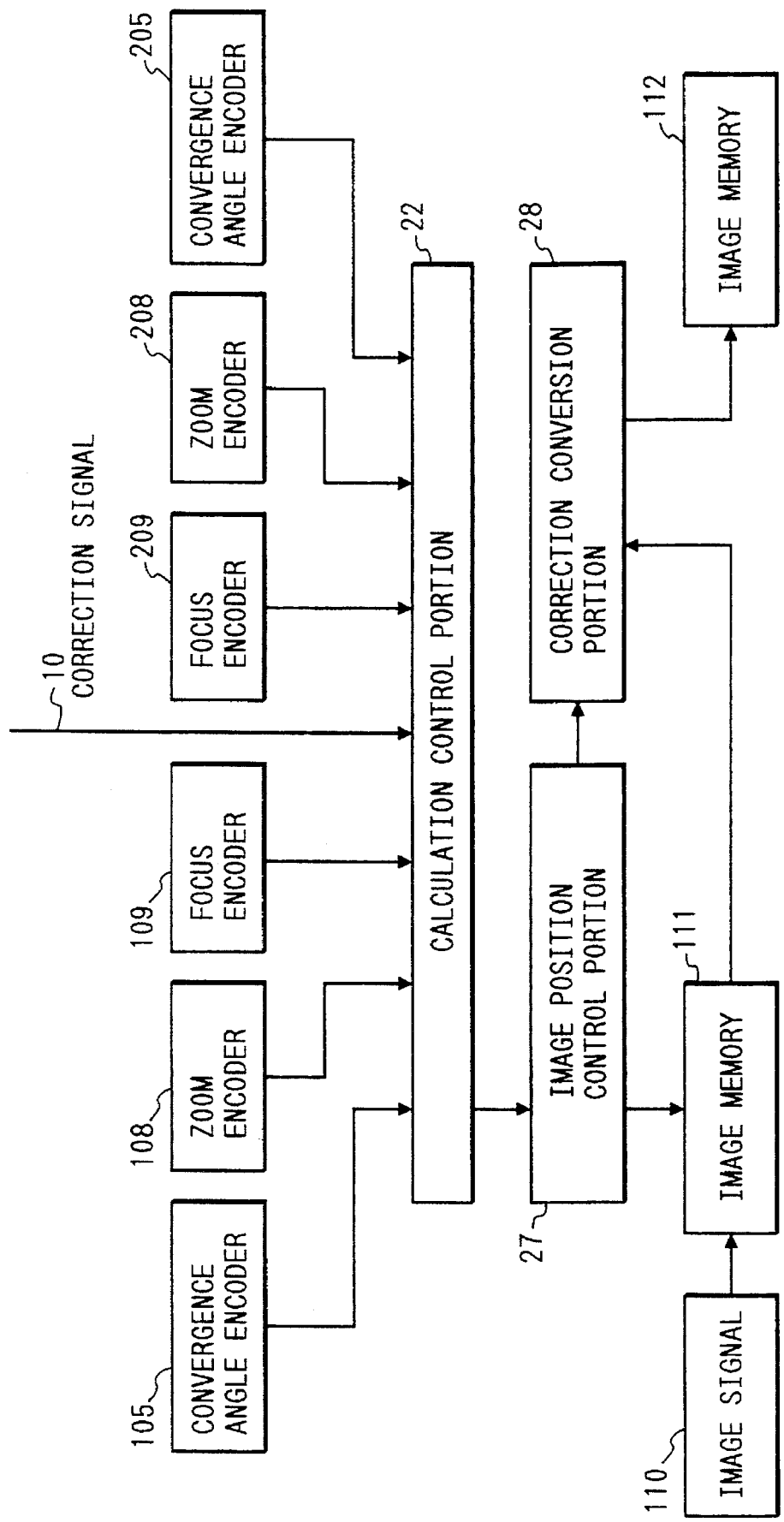
FIG. 42 is a diagram showing the flow of a compensation signal process in the embodiment shown in FIG. 41.

As shown in FIG. 42, signals calculated by a calculation control portion 22, which received various signals, are received by a image position control portion 27. Image memories 111 and 211 temporarily store image signals 110 and 210. Images defined by image data in this stage are not registered due to convergence angle errors. A correction conversion portion 28 converts the coordinates of image data. More specifically, the portion 28 executes control for shifting image data in the memory 111 by the calculated mis-registration amount Δy' of a image, and writing the shifted image data in a image memory 112. Although the image memories 112 and 111 are independently arranged for the sake of simplicity, a common memory may be used in place of these memories. When the coordinates of image data are shifted, a data interpolation calculation process may be performed as needed. In this embodiment, the coordinates of image data in the image memory 111 are shifted. Of course, the coordinates of image data in the image memory 211 may be shifted. Then, two images can be synthesized based on image data in the image memories 112 and 211, as shown in FIG. 36, using, e.g., the image memories and an addition process circuit like in the above embodiment.

In the above embodiment, correction control of the mis-registration amounts Δy' of images due to convergence angle errors is executed. In some cases, mis-registration amounts of images due to a difference between image formation magnifications of imaging optical systems must also be taken into consideration.

Such mis-registration amounts can also be detected using image signals independently of the encoders 108 and 109 for obtaining position information, in the optical axis direction, of the lenses. Such an embodiment will be described below.

Figure 43:
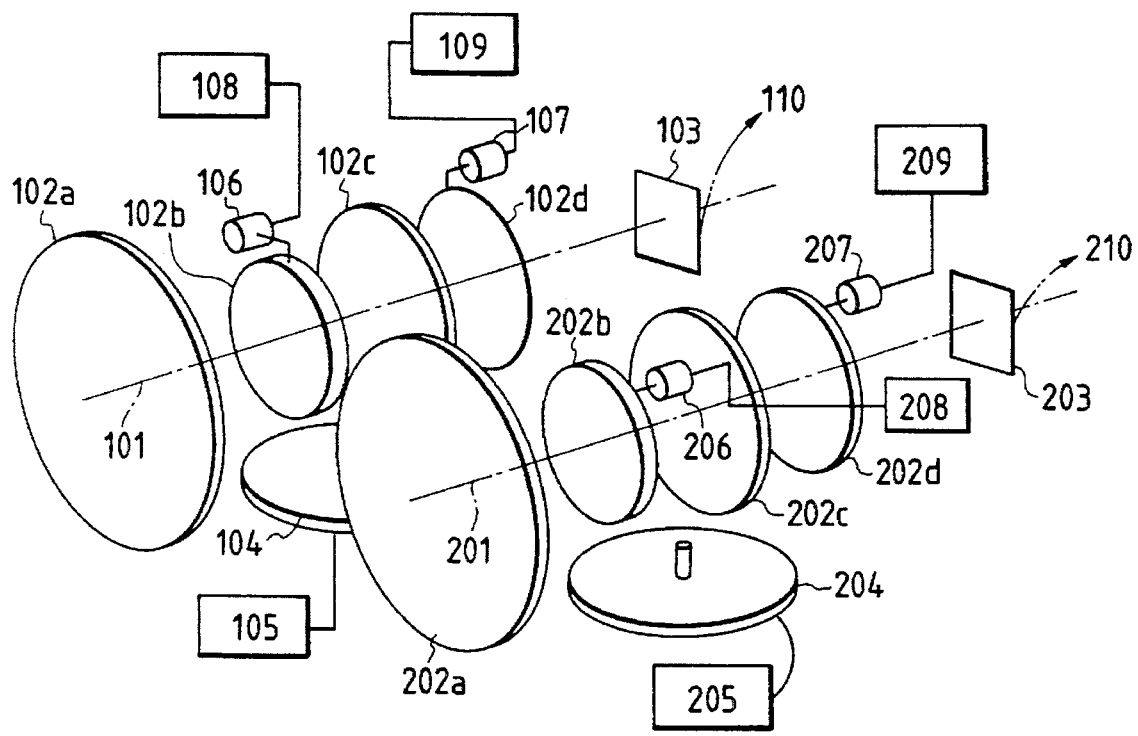
FIG. 43 is a perspective view showing optical systems according to still another embodiment of the present invention.

FIG. 43 shows still another embodiment of the present invention. The basic arrangement of this embodiment is the same as that of the embodiment shown in FIG. 37, and since the same reference numerals in FIG. 43 denote the same parts as in FIG. 37, a detailed description thereof will be omitted. The image memories 111 and 211 temporarily store image signals of the overlapping portions of the image signals 110 and 210. In this stage, images defined by image data are not registered due to a difference between the image formation magnifications of the imaging optical systems 102 and 202. In this case, assume that mis-registration amounts (Δy' described above) of the central positions of two images have already been detected by, e.g., the method described in the embodiments shown in FIGS. 32 to 42, and the central positions of the two images have been corrected.

Figure 44:
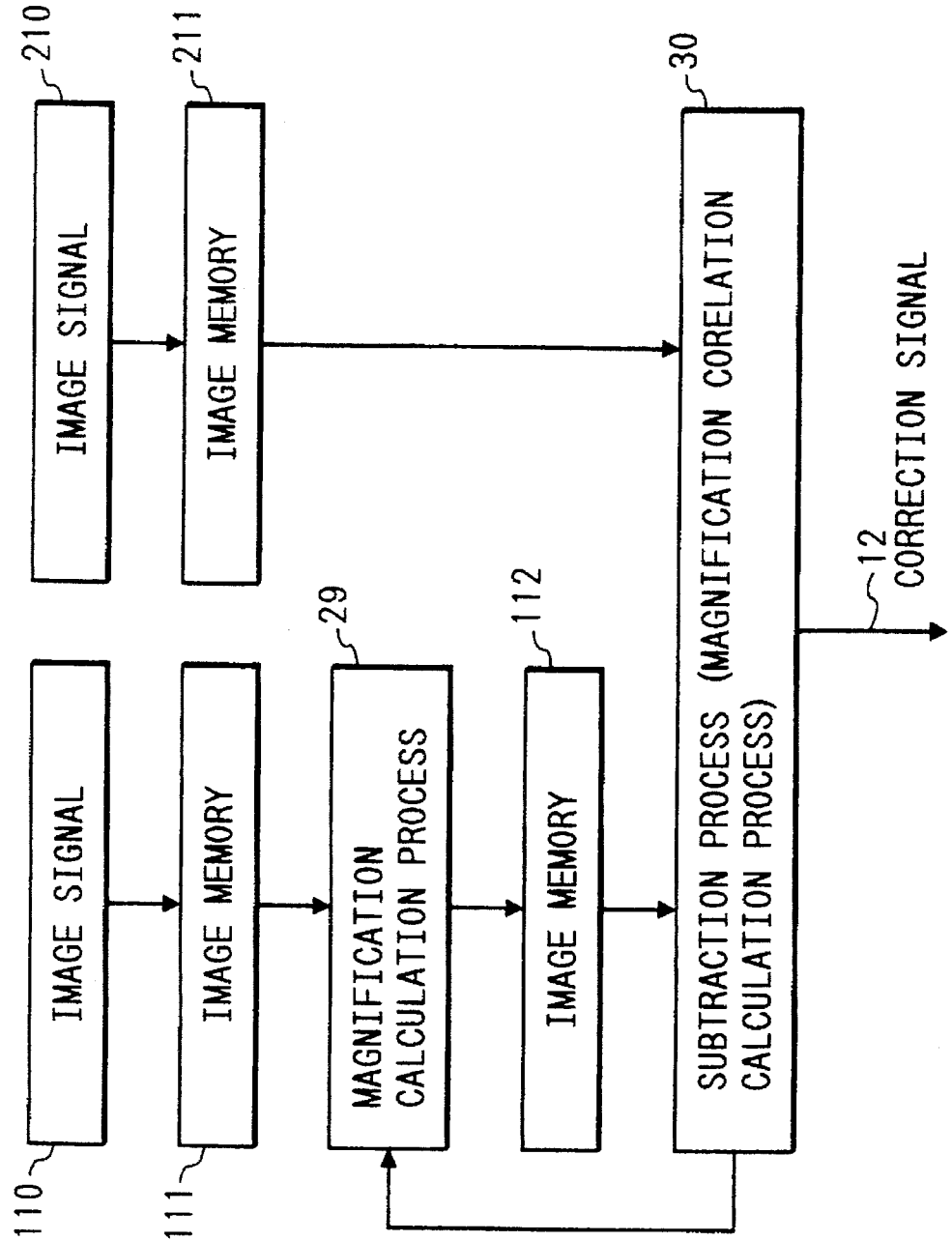
FIG. 44 is a diagram showing the flow of a signal process for calculating a mis-registration amount.

As one method of a magnification correlation calculation process, the following method is known. More specifically, a magnification calculation process portion 29 converts the coordinates of image data in the image memory 111 by multiplying the coordinates with a constant k proportional to the distance from the center of the frame, and writes the coordinate-converted image data in a image memory 112. A difference $\delta_m$ between the contents of the image memories 112 and 211 is then calculated using a subtraction process circuit 30. The above-mentioned subtraction process is repeated while sequentially changing the constant k, thereby obtaining a constant $k_0$ corresponding to the minimum difference $\delta_m$. FIG. 44 shows the flow of these signals. The constant $k_0$ represents the ratio of the image formation magnification of the imaging optical system 102 to that of the imaging optical system 202, and is defined as a correction signal 12.

Figure 45:
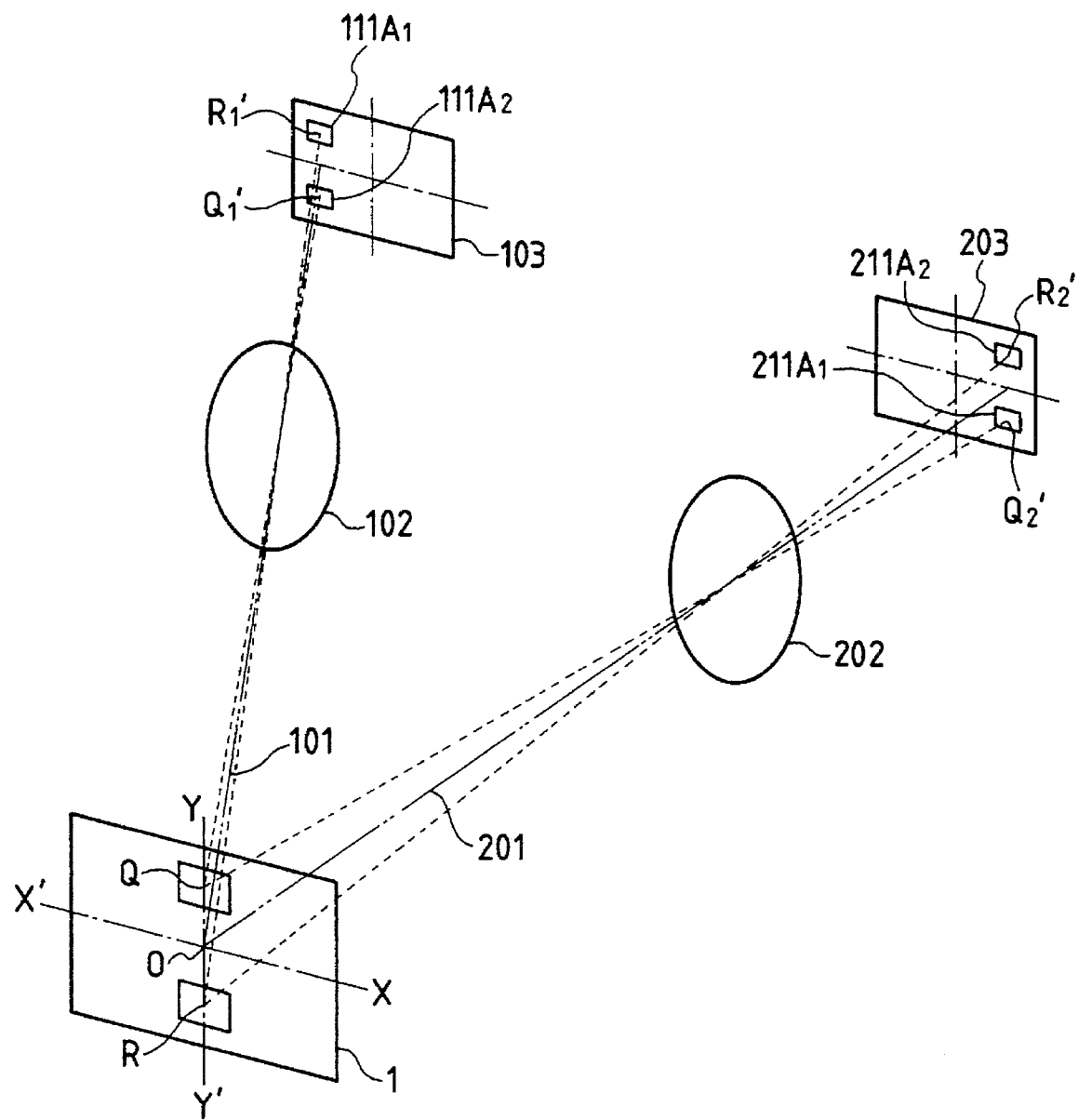
FIG. 45 is a perspective view for explaining an optical effect.

FIG. 45 shows a method of shortening the above-mentioned magnification correlation process time.

In FIG. 45, only image signal portions 110a1 and 110a2, and 210a1 and 210a2 corresponding to two upper and lower regions 111A1 and 111A2 and two upper and lower regions 211A1 and 211A2, which portions respectively include a line Y–Y' passing through a point O on an object surface 1 and perpendicular to a plane including the optical axes 101 and 201, and are separated from the central portion O, are used. Representative points of these regions on the object surface are represented by Q and R, and images of these points are represented by Q1', R1', Q2', and R2'. The positional deviation correlation, in the vertical direction of these points may be calculated by, e.g., the method described in the embodiments shown in FIGS. 32 to 42, and the ratio of a length Q1'–R1' to a length Q2'–R2' may be calculated to obtain the constant $k_0$. This technique utilizes the fact that the detection sensitivity of the difference between the image formation magnifications can be improved toward the periphery of the frame, and the fact that the difference between the image formation magnifications can be regarded as a positional deviation in a small region. The constant $k_0$ is obtained, as described above, and the following correction control can be executed based on this constant.

More specifically, as a mis-registration correction method, when the zoom motors 106 and 206 have response performance necessary for obtaining a constant $k_0$ for correcting the mis-registration amounts of images caused by the difference between the image formation magnifications to be equal to or smaller than a predetermined value (allowable value), servo control is executed by supplying a correction signal to one or both of the zoom motors 106 and 206 so as to compensate for the magnifications.

When it is difficult for the zoom motors 106 and 206 to obtain response performance necessary for correcting the mis-registration amounts due to the 10 influence of the non-sensitive bands, correction control by changing the scanning loci of the electron beams described above with reference to FIG. 39 or correction control by converting the coordinates of the image memory in the above embodiment may be suitably executed. In this case, upon coordinate conversion of the image memory, an interpolation calculation process of image data may be performed as needed.

As described above, an imaging apparatus which can obtain a panoramic image in which the boundary line is not conspicuous can be provided.

Figure 46:
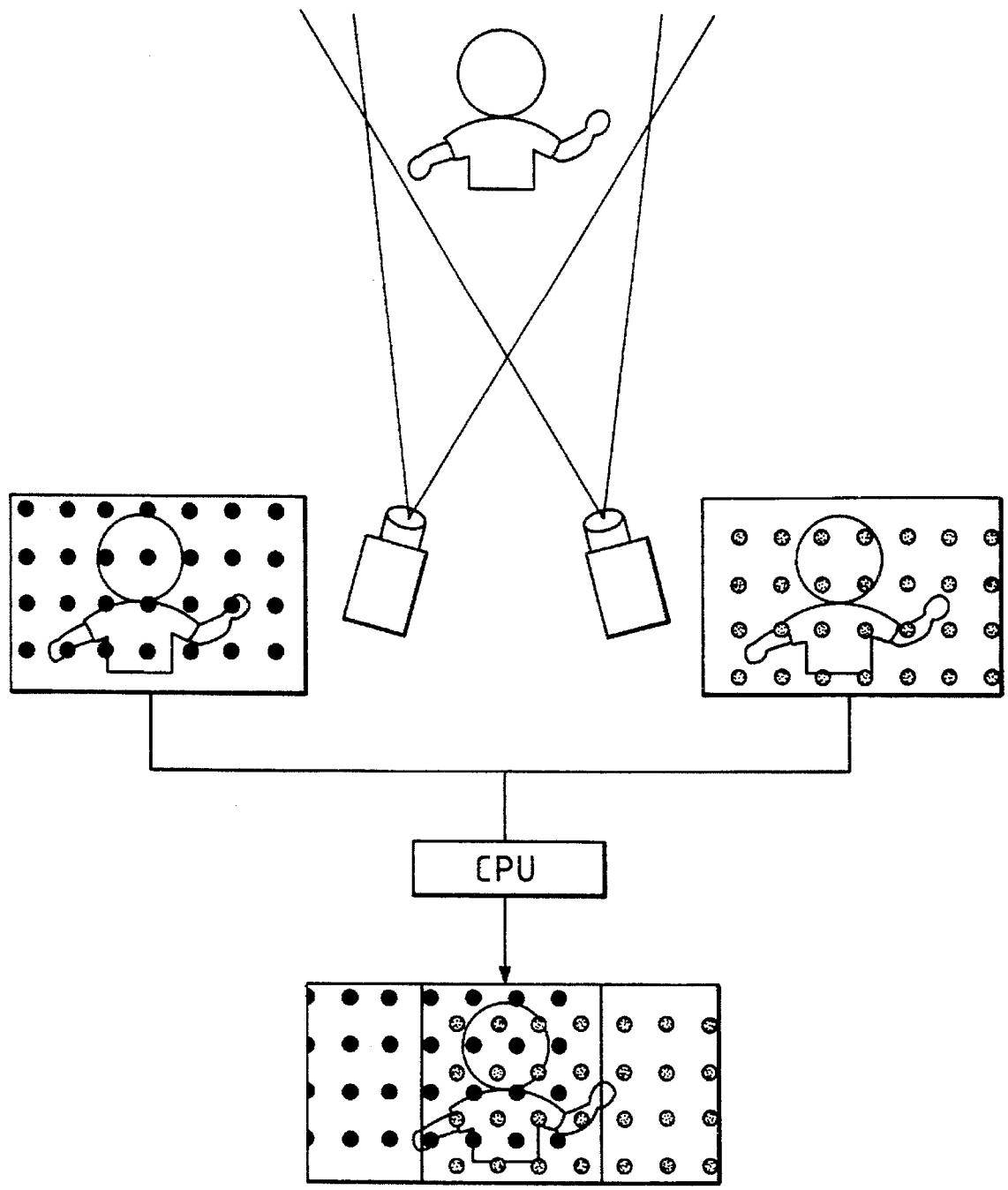
FIG. 46 is an explanatory view for explaining a method of obtaining an image having a desired aspect ratio.

In the above embodiment, a relatively large aspect ratio is set. However, an image having a desired aspect ratio can be obtained by changing the convergence angle 2θ. FIG. 46 shows the principle of a synthesizing system. In FIG. 46, an image having a new aspect ratio is obtained by synthesizing images from right and left side imaging systems.

In this case, although the basic arrangement is the same as that shown in FIG. 31, the convergence angle 2θ is selected to be smaller than that of a panoramic image.

More specifically, the optical axes 101 and 201 shown in FIG. 31 are set to be symmetrically inclined through θ with respect to the normal O–O' to the object surface 1, so that two image fields overlap each other by a predetermined amount according to a selected aspect ratio of a frame.

Figure 47:
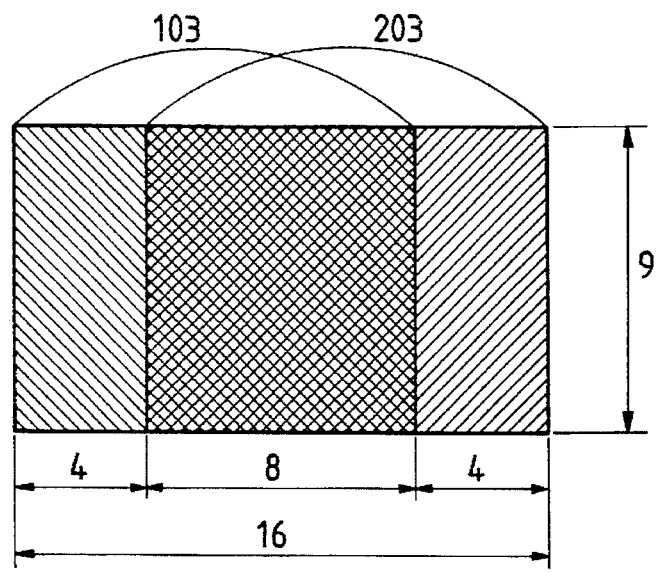
FIG. 47 is an explanatory view of the aspect ratio.

For example, FIG. 47 shows a mode for converting an aspect ratio of 4:3 of images picked up by NTSC image sensors into an aspect ratio of 16:9 of an HD system.

Figure 48:
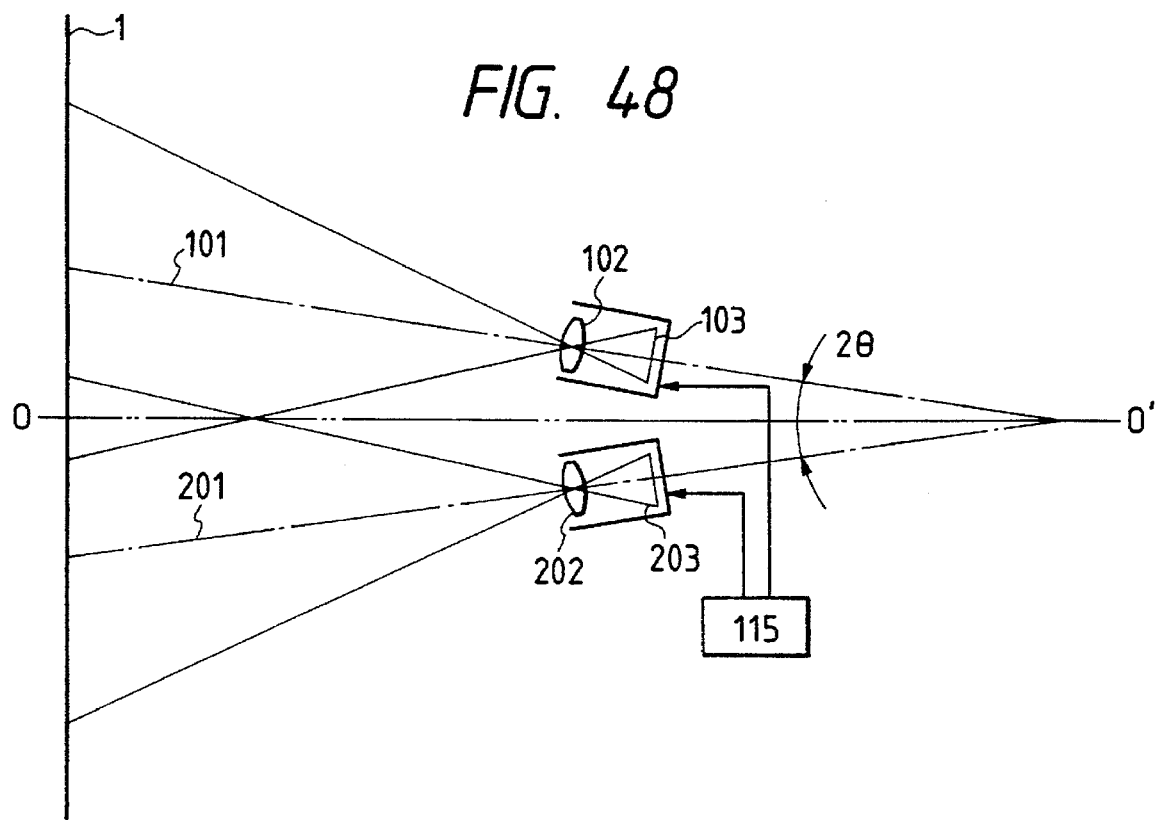
FIG. 48 is a view showing an optical basic arrangement.

Therefore, a desired aspect ratio is determined first, and the convergence angle corresponding to the determined aspect ratio is set by a setting means 115 (FIG. 48) by driving the convergence angle motors 104 and 204. Thereafter, the registration compensation method described in each of the above embodiments is applied to obtain a desired image.

The descriptions of the above embodiments have been made under an assumption that an object is a substantially flat one or can be regarded as a flat object. Next, an embodiment that can be applied to an object whose depth cannot be ignored will be described below.

Figure 49:
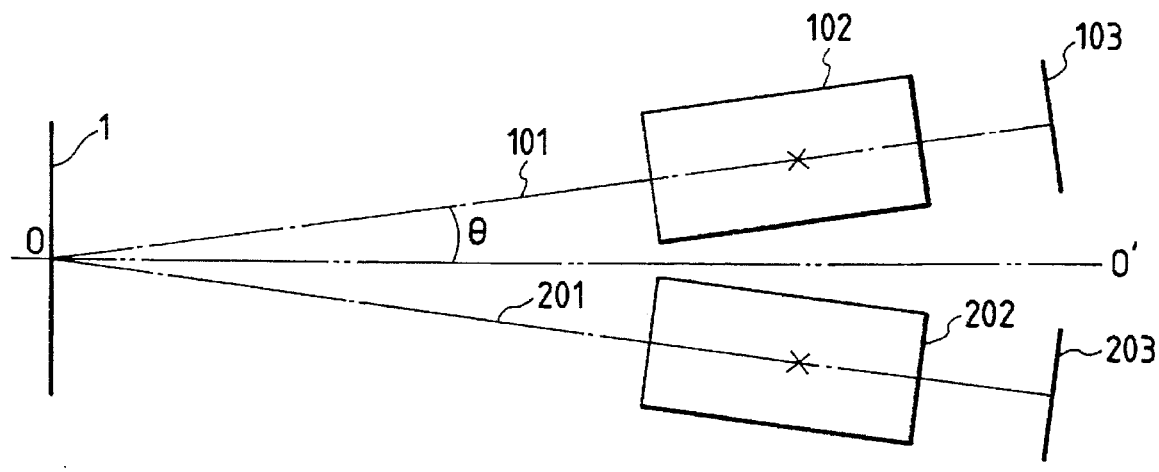
FIG. 49 is a view showing a basic arrangement according to still another embodiment of the present invention.

FIG. 49 shows a basic arrangement of a multi-lens imaging system according to still another embodiment of the present invention. The system shown in FIG. 49 includes a common object surface 1, and first and second imaging optical systems 102 and 202 having equivalent specifications, and normally comprising zoom lenses, as will be described later. Image sensors 103 and 203 similarly have equivalent specifications, and comprise camera tubes such as saticons, or solid-state imaging device such as CCDs. Although FIG. 49 illustrates a single-sensor type (or single-tube type) image sensor for the sake of simplicity, versatility will not be disturbed even when a two-sensor type (two-tube type) image sensor or three-sensor type (three-tube type) image sensor via a color separation system is used.

Optical axes 101 and 201 of these imaging optical systems are set to cross at a point O on the object surface 1 and to be symmetrically inclined through θ with respect to a normal O–O' to the object surface 1 while passing the point O. Note that 2θ is defined as the convergence angle, and imaging operations are performed by changing the convergence angle according to a change in object distance S.

Figure 50:
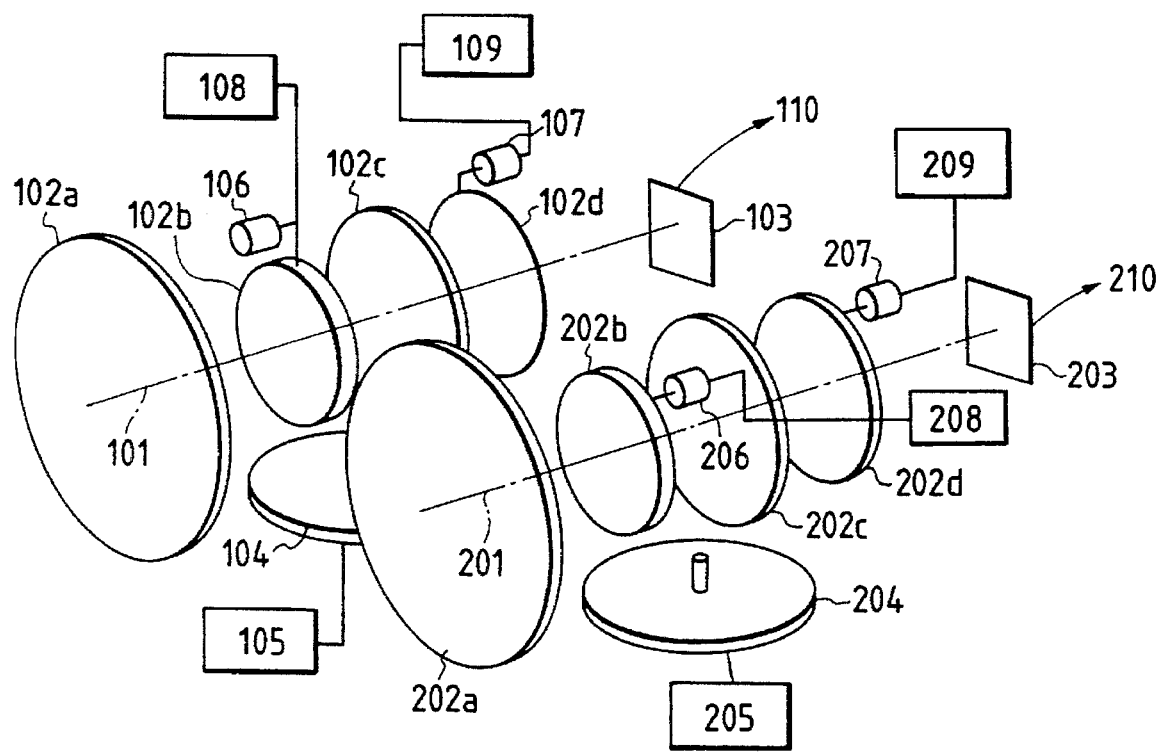
FIG. 50 is a perspective view showing the detailed arrangement of the embodiment shown in FIG. 49.
Figure 51:
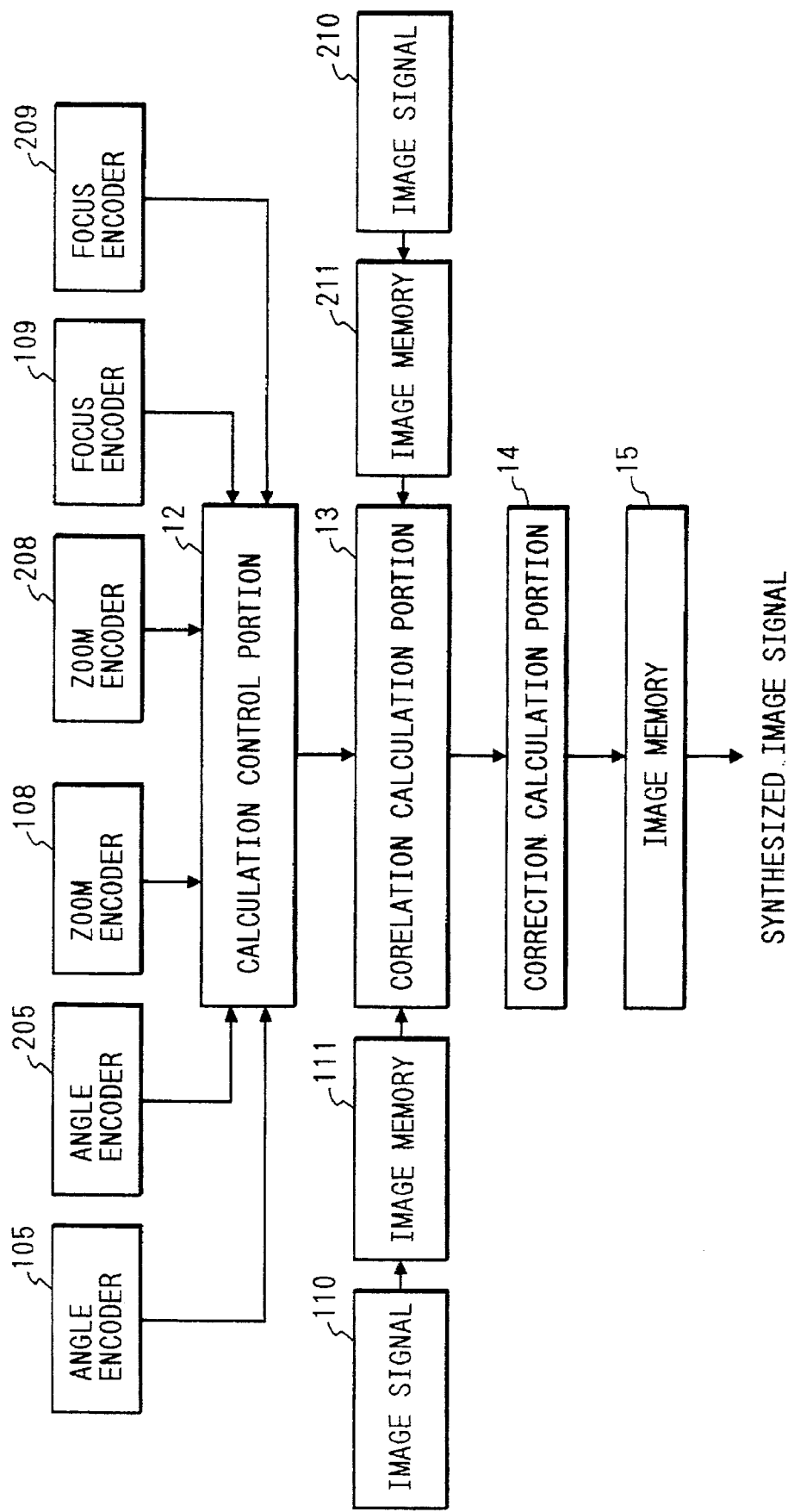
FIG. 51 is a block diagram showing relationships among functions in the embodiment shown in FIG. 49.

FIG. 50 shows the detailed arrangement of the imaging optical systems 102 and 202, and FIG. 51 is a block diagram showing functions of the members constituting the imaging optical systems. The first and second imaging optical systems 102 and 202 are respectively constituted by lens groups 102a, 102b, 102c, and 102d, and lens groups 202a, 202b, 202c, and 202d. In particular, the lens groups 102b and 202b are zoom lens groups, and the lens groups 102d and 202d are focus lens groups. The zoom lens groups 102b and 202b are respectively driven by drive systems (zoom motors) 106 and 206, and similarly, the focus lens groups 102d and 202d are respectively driven by drive systems (focus motors) 107 and 207. The system of this embodiment further includes mechanism systems (not shown) for integrally rotating the optical system 102 and the image sensor 103, and the optical system 202 and the image sensor 203 in opposite directions by the same amount in planes respectively including optical axes 101 and 201, and drive systems (convergence angle motors) 104 and 204 for attaining such rotations.

Angle encoders (rotational angle detecting means) 105 and 205 respectively measure the rotational angles of the imaging optical systems 102 and 202. Zoom encoders 108 and 208 respectively measure the moving amounts of the zoom lens groups 102b and 202b to obtain zoom ratios. Focus encoders 109 and 209 measure the positions of the focus lens groups. Image signals 110 and 210 are output from the image sensors 103 and 203, and are stored in image memories 111 and 211.

Functions of a calculation control portion 12, a correlation calculation portion 13, and a correction calculation portion 14 will be described later.

Detection of position information of an object when imaging operations are performed in an arrangement shown in FIG. 52 will be described below.

Figure 52:
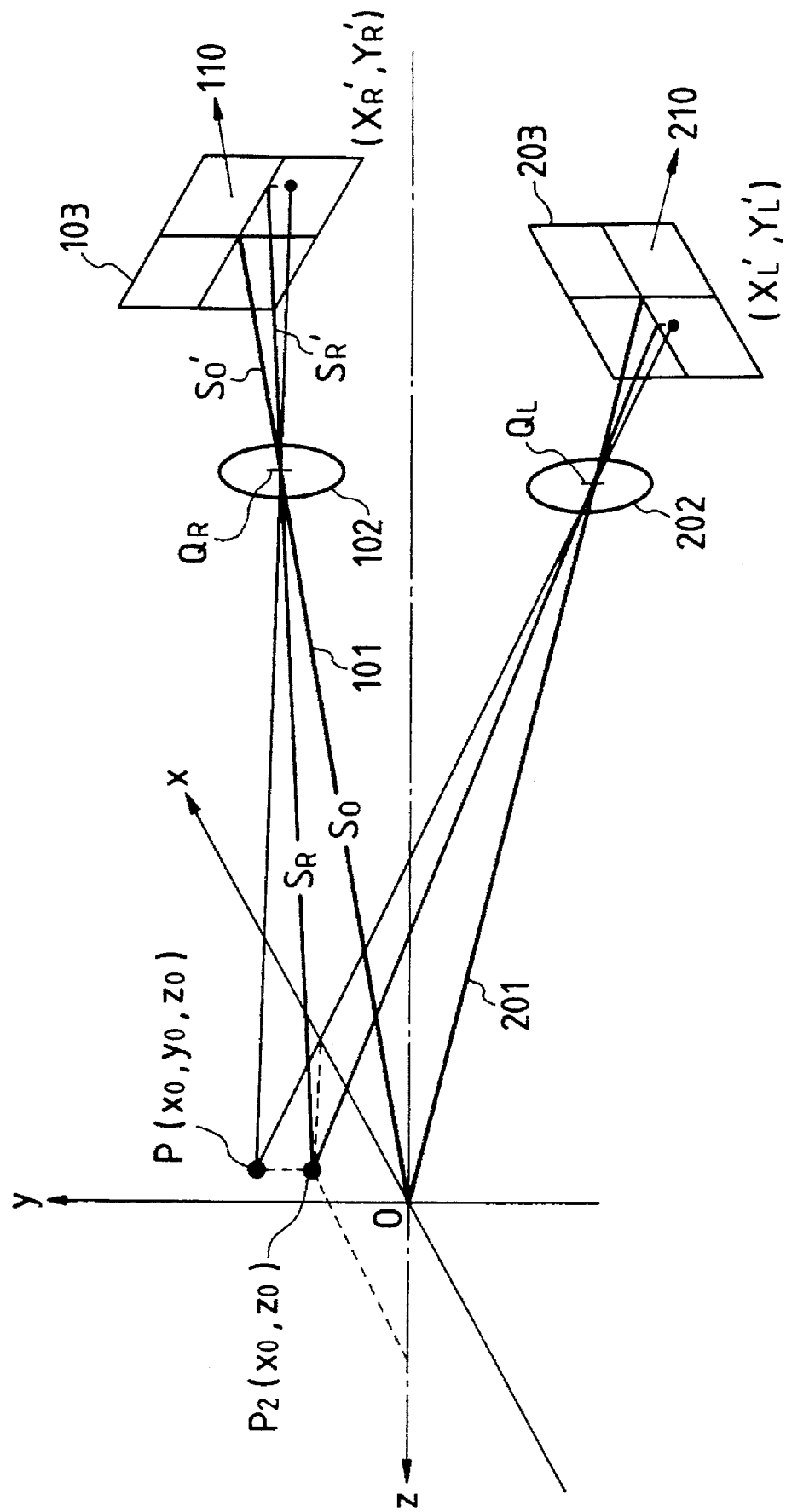
FIG. 52 is an explanatory view associated with a method of calculating three-dimensional position information of an object.

As shown in FIG. 52, x-, y- and z-axes are defined to have the above-mentioned point O on the object surface as an origin.

The intersections between the imaging optical systems 102 and 202 and their optical axes 101 and 201 are represented by $Q_R$ and $Q_L$, the distance from the front-side principal point of the imaging optical system (lens) 102 or 202 to the above-mentioned point O is represented by $S_0$, and the distance from the rear-side principal point to the image sensor 103 or 203 is represented by $S_0'$. A method of obtaining coordinates $P_2$ ($x_0$, $z_0$) on the object surface 1 in the x-z plane shown in FIG. 53 will be briefly described below.

If the intersections between the imaging optical systems 102 and 202 and their optical axes 101 and 201 are respectively represented by $Q_R$ ($x_1$, $-z_1$) and $Q_L$ ($-x_1$, $-z_1$), the coordinates $x_1$ and $z_1$ can be geometrically expressed as follows using the imaging condition $S_0$ and the convergence angle θ:

$$x_1 = S_0 \sin \theta \quad (1\text{-a})$$

$$z_1 = S_0 \cos \theta \quad (1\text{-b})$$

Similarly, as for intersections $O_R'$ ($x_2$, $-z_2$) and $O_L'$ ($-x_2$, $-z_2$) between the image sensors 103 and 203 and the optical axes 101 and 201, their coordinates are expressed by:

$$x_2 = (S_0 + S_0') \sin \theta \quad (2\text{-a})$$

$$z_2 = (S_0 + S_0') \cos \theta \quad (2\text{-b})$$

Figure 53:
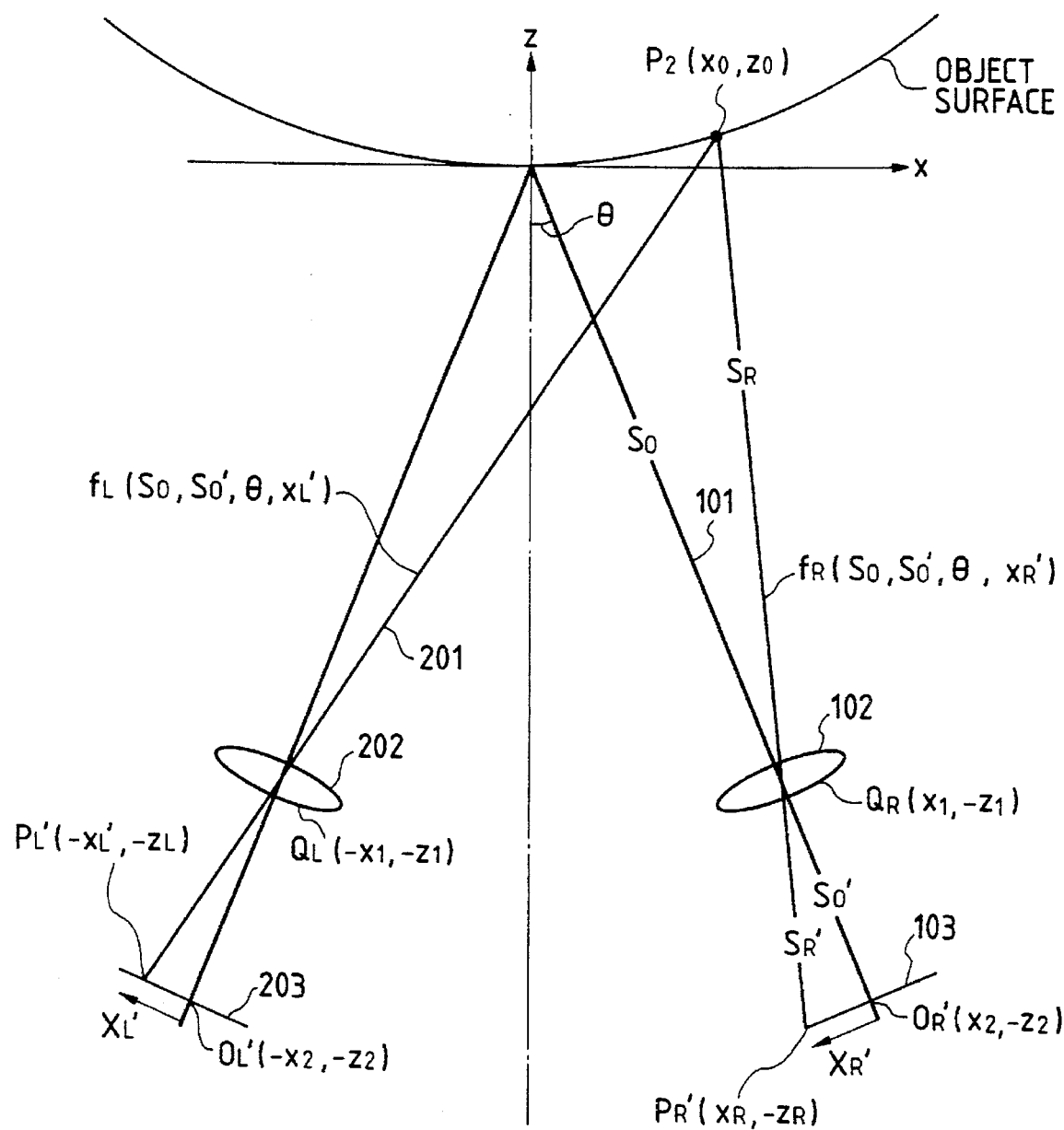
FIG. 53 is an explanatory view associated with a method of calculating two-dimensional position information of an object.

As shown in FIG. 53, if image points on the image sensors 103 and 203 with respect to an object point $P_2$ ($x_0$, $z_0$) on an object are respectively represented by $P_R'$ ($x_R$, $-z_R$) and $P_L'$ ($-x_L$, $-z_L$), and the image heights on the image sensors 103 and 203 are respectively represented by $x_R'$ and $x_L'$, geometrically, we have:

$$x_R = (S_0 + S_0') \sin \theta - x_R' \cos \theta \quad (3\text{-a})$$

$$z_R = (S_0 + S_0') \cos \theta + x_R' \sin \theta \quad (3\text{-b})$$

$$x_L = (S_0 + S_0') \sin \theta + x_L' \cos \theta \quad (3\text{-c})$$

$$z_L = (S_0 + S_0') \cos \theta - x_L' \sin \theta \quad (3\text{-d})$$

At this time, if a line passing the points $P_R'$ and $Q_R$ is represented by $f_R$ ($S_0$, $S_0'$, θ, $x_R'$), and a line passing the points $P_L'$ and $Q_L$ is represented by $f_L$ ($S_0$, $S_0'$, θ, $x_L'$), the point $P_2$ ($x_0$, $z_0$) on the object surface corresponds to the coordinates of the intersection of these two lines according to the definition.

Also, as shown in FIG. 52, $y_0$ can be expressed as follows in association with the imaging optical system 102:

$$y_0 = y_R' S_R' / S_R \quad (4)$$

$S_R$ is the distance from the object point $P_2$ ($x_0$, $z_0$) to the front-side principal point of the imaging optical system 102 in FIG. 53 and $S_R'$ is the distance from the rear-side principal point of the imaging optical system 102 to the image pint $P_R'$ on the image sensor 103 in FIG. 53.

At this time, a point P ($x_0$, $y_0$, $z_0$) in FIG. 52 is defined by:

$$P = f(S_0, S_0', \theta, x_R', x_L', y_{R(L)}') \quad (5)$$

That is, the point P is expressed by a function of imaging conditions ($S_0$, $S_0'$, θ) and an output image ($x_R'$, $x_L'$, $y_{R(L)}'$) of each image sensor, and position information on the object surface can be obtained by detecting these parameters.

The method of obtaining parameters in the above-mentioned process will be described below with reference to FIGS. 50 and 51. First, the convergence angle 2θ is detected by the rotational angle detecting means 105 and 205 such as rotary encoders. The encoders (zoom encoders) 108 and 208 for obtaining position information, in the optical axis direction, of the corresponding lens groups are used, and the focal lengths f of the imaging optical systems 102 and 202 are obtained based on the signals output from these encoders. Similarly, the encoders (focus encoders) 109 and 209 for obtaining position information, in the optical axis direction, of the corresponding lens groups are provided to the focus lens groups 102d and 202d of the imaging optical systems. These encoders may comprise, e.g., externally attached members such as potentiometers, or may comprise systems such as pulse motors for detecting the position information, in the optical axis direction, of the lens by the drive systems themselves according to their drive method. The calculation control portion 12 calculates the object distances $S_0$ to the imaging optical systems 102 and 202 on the basis of the signals from the focus encoders 109 and 209. Furthermore, the portion 12 calculates lens backs $S_0'$ of the imaging optical systems 102 and 202 together with the focal lengths f of the imaging optical systems 102 and 202. Note that the focal lengths f and the lens backs $S_0'$ of the two imaging optical systems 102 and 202 are caused to always coincide with each other by independently controlling the drive systems 106, 107, 206, and 207 on the basis of the signals from the encoders 108, 109, 208, and 209.

As described above, the calculation control portion 12 calculates $S_0$ (the distance from the front-side principal point of the imaging optical system (lens) to the intersection of the corresponding optical axis), $S_0'$ (the distance from the rear-side principal point of the imaging optical system (lens) to the image surface), and θ (convergence angle) on the basis of the signals from the encoders 105, 108, 109, 205, 208, and 209. The image memories 111 and 211 temporarily store image signals 110 and 210.

Figure 54A:
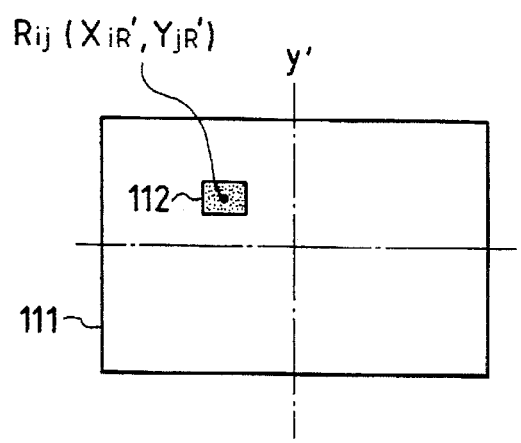
FIGS. 54A and 54B are views showing a correlation calculation process.
Figure 54B:
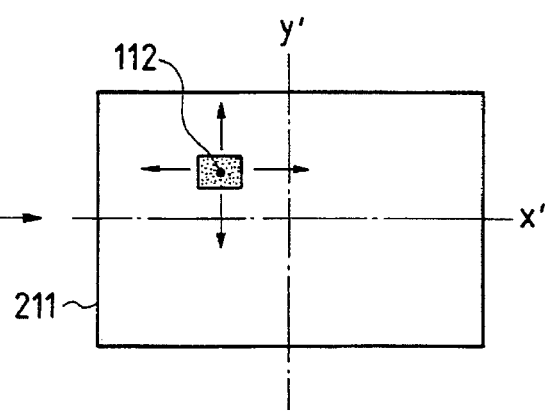
Figure 55:
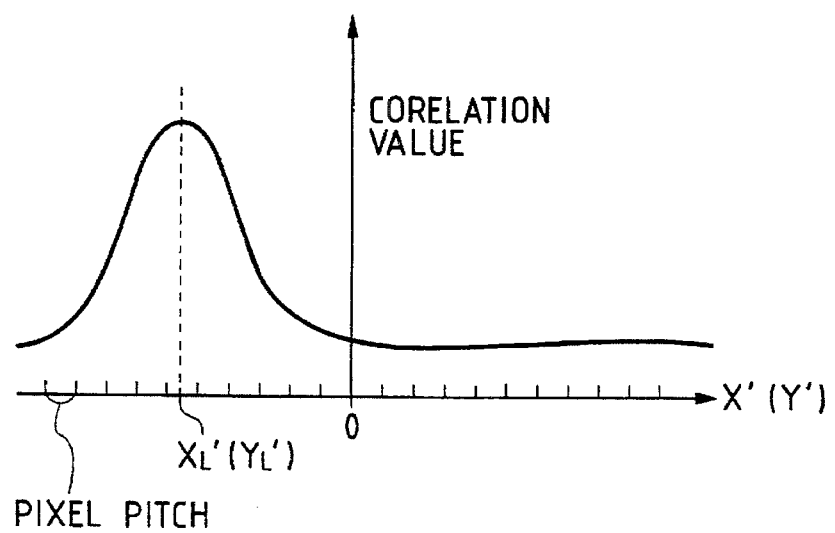
FIG. 55 is a graph showing a correlation value.

The correlation calculation process portion 13 performs a correlation calculation about image data stored in the image memories 111 and 211. FIGS. 54A and 54B show the principle of a correlation calculation process. In the process, as shown in FIG. 54B, a pixel data group 112 having pixel data $R_{ij}$ at a point ($x_{iR}'$, $y_{jR}'$) as a center is defined as one block, and a correlation calculation is performed between this block and a corresponding image block on the image memory 211. FIG. 55 illustrates the relationship between a correlation value and an x' (y') axis coordinate in the correlation calculation in the horizontal and vertical directions. In FIG. 55, $x_L'$ ($y_L'$) corresponding to a maximum correlation value is obtained with a precision equal to or lower than the sampling pitch of the image sensor by, e.g., approximating the relationship near the correlation peak by a function. The block 112 is also defined for other pixel data $R_{ij}$ on the image memory 111, and a similar calculation process is executed to obtain $x_L'$ and $y_L'$ for each pixel data.

The coordinates $P_R$ ($x_0$, $y_0$, $z_0$) on the object surface corresponding to each pixel data $R_{ij}$ on the image sensor 103 can be calculated from the relationship given by equation (5) using the image information ($x_{iR}'$, $x_L'$, $y_{jR}'$) obtained by these series of processes, and the imaging conditions ($S_0$, $S_0'$, θ).

The same calculation process is executed for each pixel data $L_{ij}$ ($x_{iL}'$, $y_{jL}'$) of the image sensor 203 to obtain $x_R'$ and $y_R'$ for each pixel, and the coordinates $P_L$ ($x_0$, $y_0$, $z_0$) on the object surface corresponding to each pixel data $L_{ij}$ on the image sensor 203 are then calculated. Note that the coordinates $P_R$ and $P_L$ on the object surface do not always coincide with each other.

Figure 56:
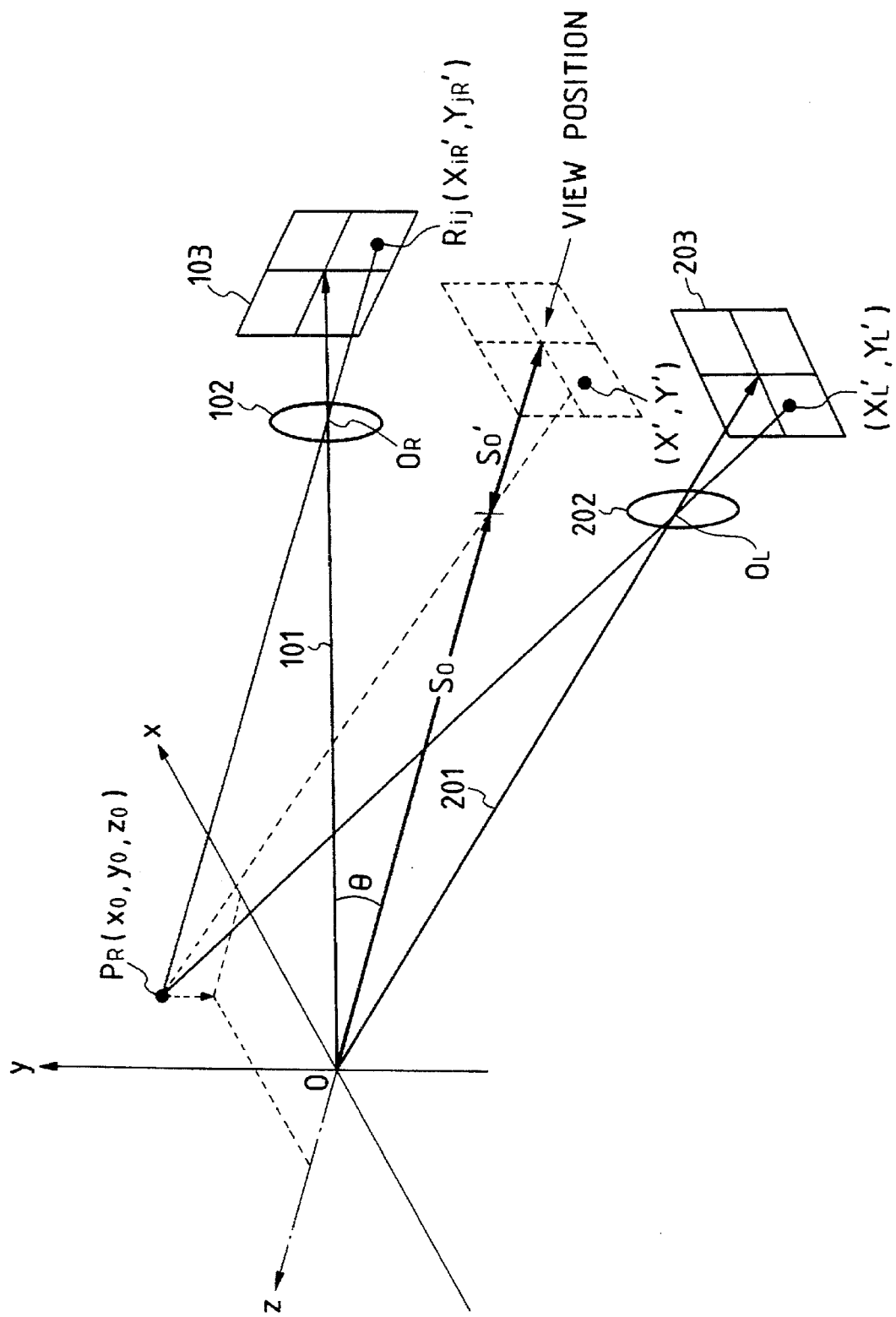
FIG. 56 is an explanatory view of an image correction process.

The correction process portion 14 executes a process on the basis of the coordinates $P_R$ and $P_L$ obtained by the above-mentioned process. In the correction process portion 14, a desired view position is input. At this time, when the view position is input, as shown in FIG. 56, image points (x', y') corresponding to the coordinate values can be obtained as follows using the above-mentioned imaging conditions $S_0$ and $S_0'$ and the coordinates $P_{R(L)}$ ($x_0$, $y_0$, $z_0$) on the object surface:

$$x' = x_0 S_0'/(S_0 + z_0) \quad (6\text{-a})$$

$$y' = y_0 S_0'/(S_0 + z_0) \quad (6\text{-b})$$

The coordinates ($x_{iR(L)}'$, $y_{iR(L)}'$) on each image memory are coordinate-converted by a calculation process on the basis of equations (6-a) and (6-b), and the converted data are written in a image memory 15. The mis-registration amounts have been removed from the image data stored in the image memory 15, and the image data is ideally twice image data output from the image sensors 103 and 203. As a result, a high-fine output image can be obtained.

The embodiment described above with reference to FIG. 49 and subsequent drawings can be applied to a panoramic image and images having various aspect ratios. In this case, since an operation for extracting corresponding points on at least partial regions of a plurality of images is required, the images must partially overlap each other. A plurality of imaging optical systems of every embodiment does not always lie in the same mode. For a different purpose, a different mode imaging optical system is sometimes used.

With the above-mentioned arrangements of the present invention, the following effects can be expected.

Even when images obtained by imaging systems suffer from keystone distortions, the keystone distortions can be removed, and the images can be converted into desired images, thus obtaining a high-fine image free from keystone distortions.

Since at least one of a mechanism system or image process system is controlled so as to correct a mis-registration amount detected by a detecting means to be equal to or smaller than a predetermined value, images obtained by imaging systems can be registered and synthesized. For this reason, an apparatus which can obtain a high-fine image by picking up an image of a common object using a plurality of imaging systems can be provided.

Also, an apparatus capable of obtaining an image having very high image quality and a desired aspect ratio, and an apparatus capable of obtaining a panoramic image free from a conspicuous boundary line can be provided.

When a multi-lens imaging apparatus of the present invention is connected to a display device such as a CRT via an image process apparatus, it can be utilized as a high-performance panoramic TV system, a 3D TV system, an HDTV system, and the like. Similarly, when the apparatus of the present invention is connected to a recording apparatus via the image process apparatus, it can be utilized as a high-performance recording system.

What is claimed is:

1. A multi-lens imaging apparatus comprising:

a plurality of imaging optical systems;

image sensing means for sensing images of an object via said plurality of imaging optical systems;

detection means for detecting mis-registration amounts of said images, said detection means comprising:

convergence angle detection means for detecting an angle defined between optical axes of said plurality of imaging optical systems;

zoom encoders for detecting focal lengths of said imaging optical systems; and focus encoders for detecting object distances to said imaging optical systems;

correction means for correcting said mis-registration amounts of said images to be less than a predetermined value according to a detection signal from said detection means; and synthesizing means for synthesizing said images as said mis-registration amounts are corrected.

2. An apparatus according to claim 1, wherein said image sensing means comprise camera tubes, and said correction means comprises:

correction signal generation means for generating a correction signal of the mis-registration amounts of said images on the basis of output signals from said convergence angle detection means, said zoom encoders, and said focus encoders; and camera tube electron beam scanning locus control drivers for controlling electron beams of said camera tubes on the basis of said correction signal.

3. An apparatus according to claim 1, wherein said image sensing means comprise solid-state image pickup elements, and said correction means comprises:

image memories for storing a plurality of image data from said solid-state image pickup elements; and correction conversion means for obtaining the mis-registration amounts of the plurality of image data, and executing coordinate conversion of the image data to cancel the mis-registration amounts;

and wherein said synthesizing means synthesizes the plurality of image data as said mis-registration amounts are cancelled.

4. An apparatus according to claim 1, wherein optical axes of said plurality of image pickup optical systems are not parallel to each other, and said mis-registration amounts are caused by keystone distortions of said images.

5. An apparatus according to claim 1, wherein said mis-registration amounts are caused by a difference in image formation magnifications between each of said plurality of imaging optical systems, and said correction means comprises a calculation means for correcting said mis-registration.

6. An apparatus according to claim 5, wherein said calculation means comprises a first calculation process portion and a second calculation process portion, wherein said first calculation process portion calculates positional deviations associated with differences in distances between a center of an object surface frame and corresponding image positions on a plurality of frames on said image sensing means, and inputs a constant to said second calculation process portion for correcting said positional deviations.

7. An apparatus according to claim 6, wherein said first calculation process portion executes a correlation calculation using image signals corresponding to a partial region of said object surface frame, where the center of said object surface frame is defined as a line on said object surface which is midway between vertical edges of said object surface frame, and which is perpendicular to a plane on which the optical axes of a plurality of said imaging optical systems lie.

8. A multi-lens imaging apparatus comprising:

a plurality of imaging optical systems whose optical axes are not parallel to each other;

image sensing means for sensing images of an object via said plurality of imaging optical systems;

keystone distortion correction means for correcting a keystone distortion generated in at least one image obtained through said image sensing means;

said keystone distortion correction means having a convergence angle detecting apparatus for detecting an angle mutually made by optical axes of said imaging optical systems, a focal length detecting apparatus for respectively detecting focal lengths of said imaging optical systems, and an object distance detecting apparatus for detecting values relating to distances of from each of said imaging optical systems to said object;

said keystone distortion correction means using focal lengths, image formation magnifications, and inclination angles of the optical axes, with respect to said object surface imaged via said plurality of imaging optical systems to correct said keystone distortion; and synthesizing means for synthesizing the plurality of images as said keystone distortion is corrected.

9. An apparatus according to claim 8, wherein said keystone distortion correction means executes a conversion process of images obtained by said plurality of imaging optical systems on the basis of focal lengths and image formation magnifications of said plurality of imaging optical systems using an arbitrary conversion variable so as to obtain a difference between images obtained by said plurality of imaging optical systems and a required image, and corrects the keystone distortion using the conversion variable to minimize said difference.

10. An apparatus according to claim 8, wherein said keystone distortion correction means detects a distortion amount of the keystone distortion using, as parameters which are focal lengths, image formation magnifications, and inclination angles of the optical axes with respect to said object surface of said plurality of imaging optical systems, calculates a difference between an image from which the keystone distortion is corrected according to the detected distortion amount and a desired image, and sets up the inclination angles to minimize the difference, thereby correcting the keystone distortion.

11. An apparatus according to claim 8, wherein said image sensing means comprise camera tubes.

12. An apparatus according to claim 8, wherein said image sensing means comprise solid-state imaging device.

13. A multi-lens imaging apparatus comprising:

a plurality of imaging optical systems;

means for detecting image pickup conditions of said plurality of imaging optical systems, said means for detecting image pickup conditions having a detector for detecting a convergence angle between said plurality of image pickup optical systems, a detector for detecting a focal length set for each of said plurality of image pickup optical systems and a detector for detecting an object distance set for each of said plurality of image pickup optical systems;

a first image sensing means for taking an image of an object by way of one of said plurality of imaging optical systems;

a second image sensing means for taking an image of said object by way of the other one of said plurality of imaging optical systems;

means for detecting corresponding points of an image signal obtained by said first image sensing means and an image signal obtained by said second image sensing means;

means for detecting object distances of from each of said plurality of imaging optical systems to said object based on said image pickup conditions and information of said detected corresponding points; and synthesizing means for synthesizing said image signals obtained by said first and second image sensing means based on said image pickup conditions and said distance information.

14. An apparatus according to claim 13, wherein said image synthesizing means forms a synthesized image with reference to a predetermined view position.

15. An apparatus according to claim 13 further comprising means for making image pickup conditions of said plurality of image pickup optical systems mutually consistent based on output of said means for detecting image pickup conditions.

16. A multi-lens imaging apparatus for picking up an image of a common object with a plurality of image pickup optical systems, comprising:

means for detecting image pickup conditions of said plurality of image pickup optical system, said means for detecting image pickup conditions having a detector for detecting a convergence angle between said plurality of image pickup systems, a detector for detecting a focal length set for each of said plurality of image pickup optical systems and a detector for detecting an object distance set for each of said plurality of image pickup optical systems;

a first image sensing means for taking an image of said object by way of one of said plurality of image pickup optical systems;

a second image sensing means for taking an image of said object by way of the other one of said plurality of imaging optical systems;

means for detecting corresponding points of an image signal obtained by said first image sensing means and an image signal obtained by said second image sensing means;

means for detecting a three dimensionally positional information indicating relative positions with respect to said imaging optical system of a plurality of points in said object side based on said image pickup conditions and an information of said detected corresponding points, by each point of said plurality of points, wherein said each point is included in each of the object image indicated by said image signal taken by said first image sensing means and the object image indicated by said image signal taken by said second image sensing means; and synthesizing means for synthesizing said image signals obtained by said first and second image sensing means based on said three dimensional positional information.

17. An apparatus according to claim 16 further comprising means for making image pickup conditions of said plurality of image pickup optical systems mutually consistent based on output of said means for detecting image pickup conditions.

18. An image recording system comprising:

a multi-lens imaging apparatus; and a recording apparatus for executing an image process of an image signal from said multi-lens imaging apparatus, and recording the processed image signal, wherein said multi-lens imaging apparatus includes:

a plurality of imaging optical systems;

image sensing means for sensing images of an object via said plurality of imaging optical systems;

detection means for detecting displacement amounts of registration of said images, said detection means comprising:

convergence angle detection means for detecting an angle defined between optical axes of said plurality of imaging optical systems;

zoom encoders for detecting focal lengths of said imaging optical systems; and focus encoders for detecting object distances to said imaging optical systems;

correction means for correcting the displacement amounts of registration of said images to be less than a predetermined value according to a detection signal from said detection means; and synthesizing means for synthesizing the images of the object as said displacement amounts of registration are corrected.

19. A TV system comprising:

a multi-lens imaging apparatus; and a display apparatus for displaying an image according to an image signal from said multi-lens imaging apparatus, said multi-lens imaging apparatus comprising:

a plurality of imaging optical systems;

image sensing means for sensing images of an object via said plurality of imaging optical systems;

detection means for detecting mis-registration amounts of said images, said detection means comprising:

convergence angle detection means for detecting an angle defined between optical axes of said plurality of imaging optical systems;

zoom encoders for detecting focal lengths of said imaging optical systems; and focus encoders for detecting object distances to said imaging optical systems;

correction means for correcting the displacement amounts of registration of said images to be less than a predetermined value according to a detection signal from said detection means; and synthesizing means for synthesizing the images of the object as said displacement amounts of registration are corrected.

20. A multi-lens imaging apparatus comprising:

a plurality of image taking optical systems;

a first image taking means for taking an image via one of said plurality of image taking optical systems;

a second image taking means for taking an image via the other one of said plurality of image taking optical systems;

means for adjusting a focal length of at least one of said plurality of image taking optical systems so that focal lengths of said image taking optical systems are mutually consistent;

means for setting an object distance of at least one of said image taking optical systems so that object distances set respectively for said plurality of image taking optical systems are consistent;

means for changing a convergence angle between said plurality of image taking optical systems;

means for detecting at least a value changed according to said convergence angle, wherein said value is different from a value generated bases on said image; and correcting means for correcting a displacement of registration between images taken by each of said first image taking means and said second image taking means based on said detected value;

wherein said means for changing have a convergence angle motor for rotating at least one of said plurality of image taking optical systems relative to the other one of said plurality of image taking optical systems; and wherein said detecting means have a detector for detecting a value corresponding to a position of rotation of said at least one of said plurality of image taking optical systems relative to said the other one of said plurality of image taking optical systems.

21. An apparatus according to claim 20, wherein said detecting means detect said value only in a case where said convergence angle is changed.

22. A multi-lens imaging apparatus comprising:

a plurality of image taking optical systems;

means for adjusting a focal length of at least one of said plurality of image taking optical systems so that focal lengths of said image taking optical systems are mutually consistent;

means for setting an object distance of at least one of said image taking optical systems so that object distances set for each of said plurality of image taking optical systems are consistent;

means for relatively rotating at least one said plurality of image taking optical systems with respect to the other one of said plurality of image taking optical systems in order to change a convergence angle between said plurality of image taking optical systems;

means for generating a signal according to said convergence angle, wherein said signal is different from a signal generated based on said image; and correcting means for correcting a displacement of registration between images taken via each of said image taking optical systems based on said signal;

wherein said plurality of image taking optical systems are capable of changing an image forming magnification and a focal length, and wherein at least one of a signal corresponding to said image forming magnification and a signal corresponding to said focal length are used by said correcting means to correct said displacement of said registration.

23. An apparatus according to claim 22, wherein said signal generating means generate said signal only in a case where said convergence angle is changed.

* * * * *